United States Patent
Cheng et al.

(10) Patent No.: US 9,725,530 B2
(45) Date of Patent: Aug. 8, 2017

(54) SUPPORTED METAL OXIDE DOUBLE ACTIVE CENTER POLYETHYLENE CATALYST, PROCESS FOR PREPARING THE SAME AND USE THEREOF

(71) Applicant: EAST CHINA UNIVERSITY OF SCIENCE AND TECHNOLOGY, Shanghai (CN)

(72) Inventors: Ruihua Cheng, Shanghai (CN); Boping Liu, Shanghai (CN); Xin Xue, Shanghai (CN); Yun He, Shanghai (CN); Xuan Dong, Shanghai (CN); Xuelian He, Shanghai (CN); Zhen Liu, Shanghai (CN); Weiwei Liu, Shanghai (CN); Lisong Wang, Shanghai (CN); Qiaoqiao Sun, Shanghai (CN)

(73) Assignee: EAST CHINA UNIVERSITY OF SCIENCE AND TECHNOLOGY, Shanghai (CN)

( * ) Notice: Subject to any disclaimer, the term of this patent is extended or adjusted under 35 U.S.C. 154(b) by 0 days.

(21) Appl. No.: 14/395,487

(22) PCT Filed: Apr. 19, 2013

(86) PCT No.: PCT/CN2013/074428
§ 371 (c)(1),
(2) Date: Nov. 13, 2014

(87) PCT Pub. No.: WO2013/155982
PCT Pub. Date: Oct. 24, 2013

(65) Prior Publication Data
US 2015/0065667 A1   Mar. 5, 2015

(30) Foreign Application Priority Data

| Apr. 20, 2012 | (CN) | 2012 1 0118427 |
| May 3, 2012 | (CN) | 2012 1 0134632 |
| Jul. 9, 2012 | (CN) | 2012 1 0235852 |

(51) Int. Cl.
C08F 4/22 (2006.01)
C08F 10/02 (2006.01)
(Continued)

(52) U.S. Cl.
CPC ............. *C08F 4/22* (2013.01); *C08F 4/025* (2013.01); *C08F 4/69* (2013.01); *C08F 10/02* (2013.01); *Y02P 20/52* (2015.11)

(58) Field of Classification Search
None
See application file for complete search history.

(56) References Cited

U.S. PATENT DOCUMENTS

| 4,458,028 A * | 7/1984 | van de Leemput | C08F 10/00 502/104 |
| 7,851,400 B2 * | 12/2010 | Bodart | C08F 10/02 502/103 |

OTHER PUBLICATIONS

"Metalorganic Catalysts for Synthesis and Polymerization: Recent Results by Ziegler-Natta and Metallocene Investigations," Kaminsky (ed.), p. 308 (2009).*

* cited by examiner

*Primary Examiner* — Catherine S Branch
(74) *Attorney, Agent, or Firm* — Global IP Services; Tianhua Gu

(57) ABSTRACT

The present invention relates to a supported hybrid vanadium-chromium-based catalyst, characterized in the catalyst is supported on a porous inorganic carrier and a V active site and a inorganic Cr active site are present on the porous inorganic carrier at the same time. The present invention further relates to a process for producing a supported hybrid vanadium-chromium-based catalyst. The invention also provides the preparation method of the catalyst, titanium or
(Continued)

fluorine compounds, vanadium salt and chromium salt according to the proportion, different methods of sequence and load on the inorganic carrier, after high temperature roasting, still can further add organic metal catalyst promoter prereduction activation treatment on it. The catalyst of the present invention can be used for producing ethylene homopolymers and ethylene/α-olefin copolymers. The hybrid vanadium-chromium-based catalyst can have high activity and produce polyethylene polymers having the properties of broad molecular weight distribution (Part of the products are bimodal distribution) and excellent α-olefin copolymerization characteristic.

16 Claims, 4 Drawing Sheets

(51) Int. Cl.
*C08F 4/69* (2006.01)
*C08F 4/02* (2006.01)

SUPPORTED METAL OXIDE DOUBLE ACTIVE CENTER POLYETHYLENE CATALYST, PROCESS FOR PREPARING THE SAME AND USE THEREOF

CROSS REFERENCE TO RELATED PATENT APPLICATION

The present application is the US national stage of PCT/CN2013/074428 filed on Apr. 19, 2013, which claims the priorities of the Chinese patent applications No. 201210118427.2 filed on Apr. 20, 2012, No. 201210134632.8 filed on May 3, 2012, No. 201210235852.X filed on Jul. 9, 2012, which applications are incorporated herein by reference.

FIELD OF THE INVENTION

The present invention relates to the polyolefin catalyst field, and specifically relates to a supported metal oxide double active center polyethylene catalyst, process for preparing the same and use thereof.

BACKGROUND OF THE INVENTION

Polyethylene (PE) as a kind of common plastics with excellent mechanical properties, electrical insulation, chemical corrosion resistance and low temperature resistance, widely used in industry, agriculture, automotive, communications and all areas of daily life. These excellent performances of polyethylene have close relation with the products and the catalyst. Phillips chromium catalyst, with producing about 40% high density polyethylene in the world, due to its product chain with a small amount of long branches, thus has unique rheology and processing performance, especially suitable for processing large hollow container, long-term static pressure gas pipe and resistance to water pipe, tank car, etc., and these products are still cannot be produce by Ziegler-Natta catalyst, after new metallocene catalyst and transition metal catalyst of polyolefin products. Phillips catalyst already has a very important position in the industrial production of polyolefin.

Phillips catalyst was first made by Phillips petroleum company's J. Hogan and R. L. Bank two researchers reported in the U.S. Pat. No. 2,825,721. The patent with chrome oxide as raw materials, under different conditions is studied, including polymerization temperature, polymerization time, monomer concentration, and the ratio of the catalyst, the chromium load of the catalyst, the carrier of modified, catalyst preparation conditions, such as effect on the properties of Phillips catalyst in olefin polymerization. Later, U.S. Pat. No. 4,295,997, U.S. Pat. No. 4,528,338, U.S. Pat. No. 5,401,820 developed Phillips catalysts, such as the low toxicity of chromic salt as raw materials, to avoid the use of high toxic $CrO_3$ raw material.

Traditional department of vanadium catalysts used in homogeneous Ziegler-Natta catalyst for ethylene polymerization system, mainly used for adjusting the Ziegler-Natta catalyst product molecular weight distribution and the distribution of copolymerization monomer, to improve product performance, displays in: the production of polymer molecular weight distribution is narrow and high molecular weight; Production of ethylene/a-olefin copolymer, and copolymerization monomer insertion is more; Also can synthesize syndiotactic polypropylene, etc. Zakharov, examines the preparation of catalyst $VCl_4$ load on $MgCl_2$ carrier aggregation performance, found that the catalyst can produce wide molecular weight distribution of polyethylene, and response to hydrogen has a high value, can see literature Chinese Journal of Polymer Science, 2008, 26, 553-559. U.S. Pat. No. 4,199,475 reported four ethyl ester titanate and vanadium oxychloride load on the silica gel preparation of catalyst, has the very high activity of ethylene polymerization.

Due to Phillips catalysts are highly sensitive to changes in carrier form, so by changing the carrier or carrier of type, in the production of liquid oligomer and low molecular weight wax or ultra-high molecular weight polyethylene (UHMWPE), the molecular weight distribution of their products can be control in large scope. Two common characteristics of the second generation of Phillips catalyst is: 1) based on the carrier surface modification to the preparation of catalyst and polyethylene products with a new performance; 2) and chrome is the only active component of modified Phillips catalysts. The second generation of Phillips catalyst carrier of modification methods include: titanium dioxide modified, magnesium hydroxide, fluorine modification, modification, alkali modification, boron modified alumina, etc. At present, the second generation of modified Phillips catalyst has been used to produce all kinds of commercial use of different levels of polymer.

Among them, the carrier of catalyst after modified titanium dioxide, can significantly enhance the activity of chromium, shorten the induction time, improve the activity of catalyst polymerization and chain termination rate, reduce the average molecular weight of polymer, it is often beneficial for polymerization. Phillips Company R.D ietz (U.S. Pat. No. 3,887,494), b. Horvath (U.S. Pat. No. 3,622,521) and Chemplex Company of t. Pullukat (U.S. Pat. No. 378,001) conducted the research, the carrier used in the two companies respectively the Grace Davison series and now the PQ Company production of polyolefin special silica gel carrier. Introduction of titanium dioxide means there are two main types, one is titanium and silicon in the form of total gel (co-gel) deposition after forming, Ti content on the surface of the vehicle body and fairly; Is a kind of titanium dioxide coated on the molded silicone carrier, the titanium dioxide are mainly distributed in the surface of the carrier. Literature can see Journal of Catalysis, 1983, 118-126.

Among them, the fluorine modified with surface fluorine modified agent such as six ammonium fluosilicate reaction with silicon hydroxyl groups on the surface of the release of water, at the same time in the silicone surface Si—F keys. Modified silica gel on the surface of the electronegativity stronger F causes the surrounding atoms on the electron transfer, thereby weakening the silicon hydroxyl bond, thus increased the acid on the surface of the silica gel, literature can see Journal of Catalysis, 2 (2), 145, 1963. Rebenstrof and others without modification and after F the two Phillips catalysts of Fourier infrared spectrum characterization, found F modification of catalyst surface hydroxyl silicon stretching vibration peak (3746 cm-1) strength decreased obviously, show that F is helpful to remove silicon hydroxyl groups on the surface of the silica gel. In addition the author thinks that is still under 800° C. removal of OH groups on the linked Si atoms don't F atomic bonding, at the same time. Later, using the low temperature CO IR characterization, found that after six surface modification of ammonium fluosilicate, Cr atoms surrounding electron cloud density is reduced, at the same time, the distribution of the active center is improved, related literature can see Journal of Molecular Catalysis, 66 (1), 59, 1991.

Hogan points out an early patent Phillips catalysts of fluorine modification can adopt the following two ways: (1)

to have been dry Phillips catalysts in direct mixed with $(NH_4)_2SiF_6$; (2) the $(NH_4)_2SiF_6$ and $CrO_3$ solution were impregnated in the surface of silica gel. Aggregate results show that both ethylene homopolymerization reaction, or ethylene and propylene, 1-butylene, 1-octene, 1-pentene, alpha olefin copolymerization reaction, such as total impregnation method of fluorine modification of catalyst higher catalytic activity than powder mixing method. When using silica gel-fluoride as carrier, as the system of six ammonium fluosilicate join quantity from 0.5 wt. % higher to 3.5 wt. %, apparent polymerization activity showed a rising trend, and the introduction of fluorine on the regulation of the density of product has obvious effect, showed that fluoride can promote a monomer insertion reactions. Kallenbach (U.S. Pat. No. 3,445,367, 1969) using the direct dry mixing method to four different fluoride compounds $(NH_4)_2SiF_6$, $CuSiF_6$, $NH_4BF_6$ and $CuBF_6$ on modification, Phillips catalyst compared to the traditional Phillips catalyst, these F modified catalysts are able to produce relatively narrower molecular weight distribution of HDPE.

McDaniel the original silicone impregnated in $(NH_4)_2SiF_6$ solution, respectively in 420, 650 and 420° C. after three temperature roasting, treated with this kind of fluorinated silicone impregnated with $CrO_3CH_3CN$ solution, the final will be a catalyst for high temperature activation in the air. Researchers at different calcination temperature on different activation, F content in the catalyst samples found after fluorine modification of catalyst, the Cr(VI) of saturated load reduced. Under the same calcination temperature, Cr(VI) the biggest load with the increase of load F fell sharply, and the sample of the 870° C. fell the most, it shows that high temperature fluoride could accelerate sintering silica gel. Literature can see Journal of Catalysis, 76 (1), 37, 1982.

At present, there is no related load type vanadium oxide as olefin polymerization active center reported that no load type used as catalyst for the active component is introduced into Phillips chrome vanadium oxide reports; Also about modification of $TiO_2$ or no fluorine modified load type chrome vanadium metal oxide double polyethylene catalyst activity center, the present invention that the load type chrome vanadium metal oxide double polyethylene catalyst active sites on the basis of further introduce the modified titanium dioxide or fluorine components.

SUMMARY OF THE INVENTION

The purpose of present invention is to obtain a supported metal oxide double active center polyethylene catalyst. The novel catalyst not only ensures the produce polyethylene resins having the properties of broad molecular weight distribution, but also improves the content and distribution of comonomer. Decrease the content of comonomer in low molecule weight part, increase the content of comonomer in high molecule weight part. Thus easy to form more tie molecules, obtain higher performance polyethylene products, and catalyst also has highly active.

The technical scheme of the invention is as follows:

The invention provides a load type double active center ethylene polymerization catalysts, metal oxide catalyst composition including inorganic carrier and load of the two kinds of active component, described two kinds of active component including chromium oxide and vanadium oxides.

The present invention provides a load type metal oxide double ethylene polymerization catalyst activity center, include modified catalyst is described; Described in the modified group separation from one of the titanium dioxide and fluorine.

The present invention provides a load type double active center ethylene polymerization catalysts, metal oxide purpose is the preparation of a kind of chromium, vanadium oxide load on inorganic carriers of double ethylene polymerization catalyst active center. The present invention also provides the double active center load type chrome vanadium catalyst in ethylene homopolymerization and ethylene with a-application of olefin copolymerization.

The inorganic carrier used in the present invention may be any inorganic carrier generally used for preparing a catalyst for olefin polymerization. In one embodiment of the present invention, the inorganic carrier is selected from the group consisting of silica, alumina, titania, zirconia, magnesia, calcium oxide, inorganic clays, and combinations thereof. Said inorganic clays may include, e.g. montmorillonite and the like. In one embodiment of the present invention, the inorganic carrier is selected from the group consisting of unmodified or Ti-, Al- or F-modified silica gel, in particular amorphous porous silica gel. These supports are well known in the art, and are commercially available or can be synthesized by the known processes. As an example of the silica gel, Davison 955 may be mentioned.

According to the invention of an implementation plan, specific surface area of the inorganic carrier used usually in $50{\sim}500$ m$^2$/g, optimization of $100{\sim}300$ m$^2$/g, inorganic carrier pore volume is $0.1{\sim}5.0$ cm$^3$/g, optimizing $0.5{\sim}3.0$ cm$^3$/g. The present invention is used in inorganic carrier can be commonly used for olefin polymerization catalyst preparation of inorganic carrier.

In one embodiment of the present invention, the vanadium precursor is selected from the group consisting of water-soluble vanadium salts: vanadic nitrate, vanadic phosphate, vanadic sulfate, vanadic acetate and metavanadate salts. Such as ammonium hexafluorovanadate, vanadic acetate, vanadic nitrate, vanadyl oxalate, ammonium metavanadate, vanadyl sulfate, vanadium sulfate oxide hydrate, vanadic sulfate, vanadyl trichloride, sodium orthovanadate, sodium metavanadate, etc. And from the group consisting of water-insoluble vanadium salts: vanadyl bis(acetylacetone), vanadic triisopropoxide oxide, vanadic oxytripropoxide, vanadic acetylacetone, vanadic oxytriethoxide, vanadyl chloride, vanadic silicide, etc. And combinations thereof, preferably vanadic acetylacetone, ammonium metavanadate and ammonium hexafluorovanadate, etc. the chromium precursor is selected from chromium trioxide, nitric acid chromium, acetic acid chromium, chromium chloride, chromium acid ammonium sulfate, ammonium dichromate and alkali type chromium acetate etc.

In the catalyst of the present invention, the total chromium loading on the inorganic carrier is from 0.01 to 10 wt. %, preferably from 0.05 to 5 wt. %, based on the weight of chromium.

In one embodiment of present invention, the ratio of the vanadium loading to the chromium loading on the carrier is 10%-500% (based on the weight of chromium and vanadium). Preferably 20%-400%.

In one embodiment of the present invention, the titanium precursor is selected from acetylacetone titanium oxide, titanium trichloride, titanium tetrachloride, tertiary butanol titanium, tetra-n-butyl titanate, titanium oxide sulfate, titanium sulfate, Ammonium hexafluorotitanate, Titanium isopropoxide, tetraethyl titanate, and other appropriate soluble titanium salt as well as their combinations.

In the catalyst of the present invention, the total titanium loading on the inorganic carrier is from 0.01 to 30 wt %, preferably from 0.05 to 20 wt %, based on the weight of titanium.

In one embodiment of the present invention, the fluorine precursor is selected from optional hydrogen fluoride and fluorine gas, or ammonium fluoride, ammonium fluoride, ammonium fluoride boric acid and fluoboric acid copper, silver fluoboric acid and fluoboric acid gold, fluosilicic acid copper, fluosilicic acid copper, silver fluosilicate, ammonium fluosilicate gold, fluoboric acid and hexafluoride ammonium vanadate, six ammonium fluosilicate, fluoboric acid zinc, magnesium silicate fluoride, zinc fluoride silicate, sodium fluoboric acid, other suitable soluble fluoride salt as well as their combinations.

In the catalyst of the present invention, the total fluorine loading on the inorganic carrier is from 0.01 to 10 wt %, preferably from 0.5 to 5 wt %, based on the weight of titanium.

In one aspect of the present invention, the present invention provides a process for preparing a supported metal oxide double active center catalyst of the present invention, comprising steps of:

i) impregnating an inorganic carrier into an aqueous solution of vanadium precursor, drying and calcining at 300~900° C.; and ii) impregnating the product obtained in step i) into a solution of an inorganic chromium precursor, then drying and calcining at 300~900° C.

A preferred process for preparing a supported metal oxide double active center catalyst of the present invention comprises the steps of:

i) impregnating an inorganic carrier into an aqueous solution of a vanadium precursor, retaining at a temperature of 10~80 for 1~12 h, preferably at 20~70° C. for 4~8 h, then drying at 90~250° C. for 6~20 h preferably at 100~200 for 8~15 h, in this time, also can use the vacuum to speed up the drying. Then calcining in oxygen or air or inert gases at 300~900 for 1~10 h preferably at 400~800° C. for 4~6 h, and cooling, wherein gas is replaced with inert gases (such as nitrogen, argon, etc.) when it is cooled to 300~400;

ii) impregnating the catalyst obtained in step i) into an inorganic chromium precursor solution under inert atmosphere, retaining at a temperature of 10~80° C. for 1~12 h, preferably at 15~60° C. for 4~8 h, then drying at 90~250° C. for 6~20 h preferably at 100~150° C. for 8~15 h, in this time, also can use the vacuum to speed up the drying. Then calcining in oxygen or air or inert gases at 300~900° C. for 1~10 h preferably at 400~800° C. for 3~8 h, and cooling, wherein gas is replaced with inert gases (such as nitrogen, argon, etc.) when it is cooled to 300~400° C.

Generally, the present invention involves using an inorganic carrier as the carrier, firstly impregnating vanadium precursor thereon, calcining at high temperature to obtain a vanadium supported catalyst precursor; and then adding chromium precursor into a solution containing the above obtained catalyst precursor so as to prepare a hybrid vanadium-chromium catalyst.

Said step i) relates to a method of depositing a vanadium precursor onto the inorganic carrier (for example the inorganic carrier mentioned above), and such a method may be any method, known by those skilled in the art, capable of depositing vanadium onto a carrier. The vanadium precursor may be the vanadium precursor as stated above. In one embodiment of the present invention, the method of depositing a vanadium precursor onto the inorganic carrier comprises impregnating a porous inorganic carrier with an aqueous solution of vanadium precursor. In one embodiment, stirring, preferably continuous stirring, can be implemented during the impregnation. Generally, such stirring lasts from about 1 to 12 h, preferably from about 4 to 8 h at 10~80° C. preferably at 20~70° C. In one embodiment, the vanadium loading is at most 50 wt. % of the total weight of the catalyst, preferably from about 0.01 wt. % to 10 wt. %. Then the resultant vanadium-supporting carrier is dried, generally at a temperature of from about room temperature to 250, preferably from about 90 to 250, further preferably from about 100 to 200. In one embodiment, the drying is conducted at about 120, can use the vacuum to speed up the drying. The duration period for such drying is not specially limited, but such drying generally lasts from about 6 to 20 h, preferably from about 7 to 18 h, further preferably from about 8 to 15 h. After drying, the vanadium-supporting inorganic support is calcined. The calcining manner is not specifically limited, but it is preferably conducted within a fluidized bed. In one embodiment, such calcining is carried out by two stages, i.e. low temperature stage and high temperature stage. The low temperature stage is generally conducted at about 100 to 300, and the high temperature stage is generally conducted at about 300° C. to about 900. Without any theoretical limitation, it is believed that the mechanical water of the carrier is removed during the low temperature stage, and the hydroxyl radical on the inorganic carrier is removed during the high temperature stage. In one embodiment, the low temperature stage lasts from 1 to 10 h, preferably from 2 to 9 h, more preferably from 3 to 8 h. In another embodiment, the high temperature stage lasts from 1 to 10 h, preferably from 2 to 9 h, more preferably from 3 to 8 h. In one embodiment, the low temperature stage is carried out under an inert atmosphere or air atmosphere, preferably under an inert atmosphere, wherein the inert gas is selected from, e.g. the inert gases as stated above. In one embodiment, the calcining is carried out in oxygen or air, preferable in air. After calcining, the resultant inorganic carrier supporting inorganic oxide V is cooled from the high temperature stage. In one embodiment, when the temperature is decreased to 300~400, the atmosphere can be changed, e.g. from air to an inert gas, such as nitrogen gas, argon gas, etc. In one embodiment, such cooling is a natural falling of temperature.

Said step (ii) is a method for depositing an inorganic chromium precursor onto the catalyst precursor. Such a method is well known by those skilled in the art, and said inorganic chromium precursor may be the inorganic chromium precursors as stated above. Generally, the deposition of the inorganic chromium precursor is carried out after the deposition of the vanadium precursor. In one embodiment, an inorganic carrier (e.g. the inorganic carrier prepared above) supporting V in an inorganic oxide form is placed in a solvent, and an inorganic chromium precursor is added for depositing the inorganic vanadium precursor. The solvent can be any solvent capable of depositing the inorganic chromium precursor onto the inorganic carrier, for example the solvent conventionally used in the preparation of Phillips catalysts. In one embodiment, stirring, preferably continuous stirring, can be implemented during the impregnation. Generally, such stirring lasts from about 1 to 12 h, preferably from about 4 to 8 h at 10~80° C. preferably at 20~70° C. In one embodiment, the chromium loading is at most 50 wt. % of the total weight of the catalyst, preferably from about 0.01 wt. % to 10 wt. %. Then the resultant chromium-vanadium-supporting carrier is dried, generally at a temperature of from about room temperature to 250° C., preferably from about 90° C. to 250° C., further preferably from about 100°

C. to 200° C. In one embodiment, the drying is conducted at about 120° C., can use the vacuum to speed up the drying. The duration period for such drying is not specially limited, but such drying generally lasts from about 6 to 20 h, preferably from about 7 to 18 h, further preferably from about 8 to 15 h. After drying, the chromium-vanadium-supporting inorganic carrier is calcined. The calcining manner is not specifically limited, but it is preferably conducted within a fluidized bed. In one embodiment, such calcining is carried out by two stages, i.e. low temperature stage and high temperature stage. The low temperature stage is generally conducted at about 100° C. to 300° C., and the high temperature stage is generally conducted at about 300° C. to about 900° C. Without any theoretical limitation, it is believed that the mechanical water of the carrier is removed during the low temperature stage, and the hydroxyl radical on the inorganic carrier is removed during the high temperature stage. In one embodiment, the low temperature stage lasts from 1 to 10 h, preferably from 2 to 9 h, more preferably from 3 to 8 h. In another embodiment, the high temperature stage lasts from 1 to 10 h, preferably from 2 to 9 h, more preferably from 3 to 8 h. In one embodiment, the low temperature stage is carried out under an inert atmosphere or air atmosphere, preferably under an inert atmosphere, wherein the inert gas is selected from, e.g. the inert gases as stated above. In one embodiment, the calcining is carried out in oxygen or air, preferable in air. After calcining, the catalyst is cooled from the high temperature stage. In one embodiment, when the temperature is decreased to 300~400° C., the atmosphere can be changed, e.g. from air to an inert gas, such as nitrogen gas, argon gas, etc. In one embodiment, such cooling is a natural falling of temperature. The resultant catalyst is stored under an inert gas atmosphere.

As an example, the specific operations for preparing the catalyst of the present invention include:

A porous amorphous silica gel is impregnated in an aqueous solution of vanadium precursor of a certain concentration, wherein the vanadium precursor concentration enables the vanadium loading to satisfy the requirement in the present application relative to the total weight of the catalyst (e.g. 0.1~2%, based on the weight of vanadium). After being continuously stirred for a certain period of time (e.g. 3~8 h), heated and dried, the silica gel support supporting the vanadium precursor is high-temperature calcined in a fluidized bed, wherein at the low temperature stage (e.g. 100~300), the mechanical water of the carrier is removed and at the high temperature stage (e.g. 300~900), hydroxyl group on the surface of the silica gel is removed. The high temperature stage lasts a certain period of time (e.g. 3~8 h). Finally, the silica gel was naturally cooled down under the protection of nitrogen gas to obtain a vanadium supported catalyst precursor. Then, the vanadium supported catalyst precursor is impregnated in an aqueous solution of chromium precursor of a certain concentration, wherein the chromium precursor concentration enables the chromium loading to satisfy the requirement in the present application relative to the total weight of the catalyst (e.g. 0.1~10%, based on the weight of chromium). After being continuously stirred for a certain period of time (e.g. 4~8 h), heated and dried, the silica gel support supporting the vanadium-chromium precursor is high-temperature calcined in a fluidized bed, wherein at the low temperature stage (e.g. 100~300° C.), the mechanical water of the carrier is removed and at the high temperature stage (e.g. 300~900° C.), hydroxyl group on the surface of the silica gel is removed. The high temperature stage lasts a certain period of time (e.g. 3~8 h). Finally, the silica gel was naturally cooled down under the protection of nitrogen gas to obtain a supported Cr—V catalyst.

In one aspect of the present invention, the present invention provides a process for preparing a supported metal oxide double active center catalyst of the present invention, comprising the steps of:

i) impregnating an inorganic carrier into an aqueous solution of vanadium and chromium precursor and drying;

ii) calcining the product obtained in step i) at 300~900° C.

A preferred process for preparing a supported metal oxide double active center catalyst of the present invention comprises the steps of:

i) impregnating an inorganic carrier into an mix aqueous solution of vanadium and chromium precursor, retaining at a temperature of 10~80° C. for 1~12 h, preferably at 20~70° C. for 4~8 h, then drying at 90~250° C. for 6~20 h preferably at 100~200° C. for 8~15 h, in this time, also can use the vacuum to speed up the drying.

ii) calcining in oxygen or air or inert gases at 300~900° C. for 1~10 h preferably at 400~800° C. for 3~8 h, and cooling, wherein gas is replaced with inert gases (such as nitrogen, argon, etc.) when it is cooled to 300~400° C.

Said step i) relates to a method of depositing vanadium and chromium precursors onto the inorganic carrier (for example the inorganic carrier mentioned above) together, and such a method may be any method, known by those skilled in the art, capable of depositing vanadium and chromium onto a carrier. The vanadium and chromium precursor may be the vanadium and chromium precursors as stated above. In one embodiment of the present invention, the method of depositing a vanadium and chromium precursor onto the inorganic carrier comprises impregnating a porous inorganic carrier with an aqueous solution of vanadium and chromium precursors. In one embodiment, stirring, preferably continuous stirring, can be implemented during the impregnation. Generally, such stirring lasts from about 1 to 12 h, preferably from about 4 to 8 h at 10~80° C. preferably at 20~70° C. In one embodiment, the vanadium loading is at most 50 wt. % of the total weight of the catalyst, preferably from about 0.01 wt. % to 10 wt. %. Then the resultant vanadium-supporting support is dried, generally at a temperature of from about room temperature to 250° C., preferably from about 90° C. to 250° C., further preferably from about 100° C. to 200° C. In one embodiment, the drying is conducted at about 120° C., can use the vacuum to speed up the drying. The duration period for such drying is not specially limited, but such drying generally lasts from about 6 to 20 h, preferably from about 7 to 18 h, further preferably from about 8 to 15 h.

Said step (ii) after drying, the chromium-vanadium-supporting inorganic carrier is calcined. The calcining manner is not specifically limited, but it is preferably conducted within a fluidized bed. In one embodiment, such calcining is carried out by two stages, i.e. low temperature stage and high temperature stage. The low temperature stage is generally conducted at about 100° C. to 300° C., and the high temperature stage is generally conducted at about 300° C. to about 900° C. Without any theoretical limitation, it is believed that the mechanical water of the carrier is removed during the low temperature stage, and the hydroxyl radical on the inorganic carrier is removed during the high temperature stage. In one embodiment, the low temperature stage lasts from 1 to 10 h, preferably from 2 to 9 h, more preferably from 3 to 8 h. In another embodiment, the high temperature stage lasts from 1 to 10 h, preferably from 2 to 9 h, more preferably from 3 to 8 h. In one embodiment, the low temperature stage is carried out under an inert atmosphere or air atmosphere, preferably under an inert atmosphere, wherein the inert gas is selected from, e.g. the inert gases as stated above. In one embodiment, the calcining is carried out in oxygen or air, preferable in air. After calcining, the catalyst is cooled from the high temperature stage. In one embodiment, when the temperature is decreased to 300~400° C., the atmosphere can be changed, e.g. from air to an inert gas, such as nitrogen gas, argon gas, etc. In one embodiment, such cooling is a natural falling of temperature. The resultant catalyst is stored under an inert gas atmosphere.

As an example, the specific operations for preparing the catalyst of the present invention include:

A porous amorphous silica gel is impregnated in an aqueous solution of vanadium and chromium precursor of a certain concentration, wherein the vanadium precursor concentration enables the vanadium loading to satisfy the requirement in the present application relative to the total weight of the catalyst (e.g. vanadium 0.1~10%, chromium 0.1~2%). After being continuously stirred for a certain period of time (e.g. 4~8 h), heated and dried, the silica gel support supporting the vanadium precursor is high-temperature calcined in a fluidized bed, wherein at the low temperature stage (e.g. 100~300° C.), the mechanical water of the carrier is removed and at the high temperature stage (e.g. 300~900° C.), hydroxyl group on the surface of the silica gel is removed. The high temperature stage lasts a certain period of time (e.g. 3~8 h). Finally, the silica gel was naturally cooled down under the protection of nitrogen gas to obtain a supported Cr—V catalyst.

In one aspect of the present invention, the present invention provides a process for preparing a supported metal oxide double active center catalyst of the present invention, comprising the steps of:

i) impregnating an inorganic carrier into an aqueous solution of chromium precursor, drying and calcining at 300~900° C.; and ii) impregnating the product obtained in step i) into a solution of an inorganic vanadium precursor, then drying and calcining at 300~900° C.

A preferred process for preparing a supported metal oxide double active center catalyst of the present invention comprises the steps of:

i) impregnating an inorganic carrier into an aqueous solution of a chromium precursor, retaining at a temperature of 10~80° C. for 1~12 h, preferably at 20~70° C. for 4~8 h, then drying at 90~250° C. for 6~20 h preferably at 100~200° C. for 8~15 h, in this time, also can use the vacuum to speed up the drying. Then calcining in oxygen or air or inert gases at 300~900° C. for 1~10 h preferably at 400~800° C. for 4~6 h, and cooling, wherein gas is replaced with inert gases (such as nitrogen, argon, etc.) when it is cooled to 300~400° C.;

ii) impregnating the catalyst obtained in step i) into an inorganic vanadium precursor solution under inert atmosphere, retaining at a temperature of 10~80° C. for 1~12 h, preferably at 15~60° C. for 4~8 h, then drying at 90~250° C. for 6~20 h preferably at 100~150° C. for 8~15 h, in this time, also can use the vacuum to speed up the drying. Then calcining in oxygen or air or inert gases at 300~900° C. for 1~10 h preferably at 400~800° C. for 3~8 h, and cooling, wherein gas is replaced with inert gases (such as nitrogen, argon, etc.) when it is cooled to 300~400° C.

Generally, the present invention involves using an inorganic carrier as the carrier, firstly impregnating chromium precursor thereon, calcining at high temperature to obtain a chromium supported catalyst precursor; and then adding vanadium precursor into a solution containing the above obtained catalyst precursor so as to prepare a hybrid vanadium-chromium catalyst.

Said step i) relates to a method of depositing a chromium precursor onto the inorganic carrier (for example the inorganic carrier mentioned above), and such a method may be any method, known by those skilled in the art, capable of depositing chromium onto a carrier. The chromium precursor may be the chromium precursor as stated above. In one embodiment of the present invention, the method of depositing a chromium precursor onto the inorganic carrier comprises impregnating a porous inorganic carrier with an aqueous solution of chromium precursor. In one embodiment, stirring, preferably continuous stirring, can be implemented during the impregnation. Generally, such stirring lasts from about 1 to 12 h, preferably from about 4 to 8 h at 10~80° C. preferably at 20~70° C. In one embodiment, the chromium loading is at most 50 wt. % of the total weight of the catalyst, preferably from about 0.01 wt. % to 10 wt. %. Then the resultant chromium-supporting support is dried, generally at a temperature of from about room temperature to 250° C., preferably from about 90° C. to 250° C., further preferably from about 100° C. to 200° C. In one embodiment, the drying is conducted at about 120° C., can use the vacuum to speed up the drying. The duration period for such drying is not specially limited, but such drying generally lasts from about 6 to 20 h, preferably from about 7 to 18 h, further preferably from about 8 to 15 h. After drying, the chromium-supporting inorganic carrier is calcined. The calcining manner is not specifically limited, but it is preferably conducted within a fluidized bed. In one embodiment, such calcining is carried out by two stages, i.e. low temperature stage and high temperature stage. The low temperature stage is generally conducted at about 100° C. to 300° C., and the high temperature stage is generally conducted at about 300° C. to about 900° C. Without any theoretical limitation, it is believed that the mechanical water of the carrier is removed during the low temperature stage, and the hydroxyl radical on the inorganic carrier is removed during the high temperature stage. In one embodiment, the low temperature stage lasts from 1 to 10 h, preferably from 2 to 9 h, more preferably from 3 to 8 h. In another embodiment, the high temperature stage lasts from 1 to 10 h, preferably from 2 to 9 h, more preferably from 3 to 8 h. In one embodiment, the low temperature stage is carried out under an inert atmosphere or air atmosphere, preferably under an inert atmosphere, wherein the inert gas is selected from, e.g. the inert gases as stated above. In one embodiment, the calcining is carried out in oxygen or air, preferable in air. After calcining, the resultant inorganic carrier supporting inorganic oxide chromium is cooled from the high temperature stage. In one embodiment, when the temperature is decreased to 300~400° C., the atmosphere can be changed, e.g. from air to an inert gas, such as nitrogen gas, argon gas, etc. In one embodiment, such cooling is a natural falling of temperature.

Said step (ii) is a method for depositing an inorganic vanadium precursor onto the catalyst precursor. Such a method is well known by those skilled in the art, and said inorganic vanadium precursor may be the inorganic vanadium precursors as stated above. Generally, the deposition of the inorganic chromium precursor is carried out after the deposition of the chromium precursor. In one embodiment, an inorganic carrier (e.g. the inorganic carrier prepared above) supporting Cr in an inorganic oxide form is placed in a solvent, and an inorganic vanadium precursor is added for depositing the inorganic chromium precursor. The solvent can be any solvent capable of depositing the inorganic vanadium precursor onto the inorganic carrier, for example the solvent conventionally used in the preparation of Phillips catalysts. In one embodiment, stirring, preferably continuous stirring, can be implemented during the impregnation. Generally, such stirring lasts from about 1 to 12 h, preferably from about 4 to 8 h at 10~80° C. preferably at 20~70° C. In one embodiment, the chromium loading is at most 50 wt. % of the total weight of the catalyst, preferably from about 0.01 wt. % to 10 wt. %. Then the resultant chromium-vanadium-supporting carrier is dried, generally at a temperature of from about room temperature to 250° C., preferably from about 90° C. to 250° C., further preferably from about 100° C. to 200° C. In one embodiment, the drying is conducted at about 120° C., can use the vacuum to speed up the drying. The duration period for such drying is not specially limited, but such drying generally lasts from about 6 to 20 h, preferably from about 7 to 18 h, further preferably from about 8 to 15 h. After drying, the chromium-vanadium-supporting inorganic carrier is calcined. The calcining manner is not specifically limited, but it is preferably conducted within a fluidized bed. In one embodiment, such calcining is carried out by two stages, i.e. low temperature stage and high temperature stage. The low temperature stage is generally conducted at about 100° C. to 300° C., and the high temperature stage is generally conducted at about 300° C. to about 900° C. Without any theoretical limitation, it is believed that the mechanical water of the carrier is removed during the low temperature stage, and the hydroxyl radical on the inorganic carrier is removed during the high temperature stage. In one embodiment, the low temperature stage lasts from 1 to 10 h, preferably from 2 to 9 h, more preferably from 3 to 8 h. In another embodiment, the high temperature stage lasts from 1 to 10 h, preferably from 2 to 9 h, more preferably from 3 to 8 h. In one embodiment, the low temperature stage is carried out under an inert atmosphere or air atmosphere, preferably under an inert atmosphere, wherein the inert gas is selected from, e.g. the inert gases as stated above. In one embodiment, the calcining is carried out in oxygen or air, preferable in air. After calcining, the catalyst is cooled from the high temperature stage. In one embodiment, when the temperature is decreased to 300~400° C., the atmosphere can be changed, e.g. from air to an inert gas, such as nitrogen gas, argon gas, etc. In one embodiment, such cooling is a natural falling of temperature. The resultant catalyst is stored under an inert gas atmosphere.

As an example, the specific operations for preparing the catalyst of the present invention include:

A porous amorphous silica gel is impregnated in an aqueous solution of chromium precursor of a certain concentration, wherein the chromium precursor concentration enables the chromium loading to satisfy the requirement in the present application relative to the total weight of the catalyst (e.g. 0.1~2%, based on the weight of chromium). After being continuously stirred for a certain period of time (e.g. 3~8 h), heated and dried, the silica gel support supporting the chromium precursor is high-temperature calcined in a fluidized bed, wherein at the low temperature stage (e.g. 100~300° C.), the mechanical water of the support is removed and at the high temperature stage (e.g. 300~900° C.), hydroxyl group on the surface of the silica gel is removed. The high temperature stage lasts a certain period of time (e.g. 3~8 h). Finally, the silica gel was naturally cooled down under the protection of nitrogen gas to obtain a chromium supported catalyst precursor. Then, the chromium supported catalyst precursor is impregnated in an aqueous solution of vanadium precursor of a certain concentration, wherein the vanadium precursor concentration enables the vanadium loading to satisfy the requirement in the present application relative to the total weight of the catalyst (e.g. 0.1~10%, based on the weight of vanadium). After being continuously stirred for a certain period of time (e.g. 4~8 h), heated and dried, the silica gel support supporting the vanadium-chromium precursor is high-temperature calcined in a fluidized bed, wherein at the low temperature stage (e.g. 100~300° C.), the mechanical water of the support is removed and at the high temperature stage (e.g. 300~900° C.), hydroxyl group on the surface of the silica gel is removed. The high temperature stage lasts a certain period of time (e.g. 3~8 h). Finally, the silica gel was naturally cooled down under the protection of nitrogen gas to obtain a supported Cr—V catalyst.

In one aspect of the present invention, the present invention provides a process for preparing a supported metal oxide double active center catalyst of the present invention, comprising the steps of:

i) using any three methods which mentions above;

ii) after the preparation of any catalyst mentions above, using organometallic co-catalysts to pre-reduction the catalyst. then drying and stored.

A preferred process for preparing a supported metal oxide double active center catalyst of the present invention comprises the steps of:

i) preparation of any catalyst mentions above.

ii) impregnating the catalyst obtained in step i) into organometallic co-catalysts to pre-reduction the catalyst precursor. Finally drying at 60~120° C. for 2~8 h, in this time, also can use the vacuum to speed up the drying. The resultant catalyst is stored under an inert gas atmosphere.

Generally, the co-catalyst above comprises organic aluminum compounds, organic lithium compounds and organic boron compounds, etc. alone, or in combinations of two or more. The co-catalyst are well known for those skilled in the art. In one aspect of the present invention, the aluminum compounds may comprise trialkylaluminum $AlR_3$, dialkyl-alkoxyaluminum $AlR_2OR$, dialkyl aluminum halide $AlR_2X$, aluminoxanes, triethyldialuminium trichloride and the like, wherein R is an alkyl radical, e.g. having from 1 to 12 carbon atoms, such as methyl, ethyl, n-propyl, iso-propyl, n-butyl, iso-butyl, n-amyl, n-hexyl, n-heptyl, n-octyl, n-nonyl, n-decyl and the like; X is halogen, such as fluorine, chlorine, bromine and iodine, preferably chlorine. Said aluminoxane may comprise methylaluminoxane (MAO). Said aluminum compounds as the co-catalyst can be used alone, or in combinations of two or more. As specific examples, triethylaluminum (TEA), triisobutylaluminum (TIBA), Diethylaluminum chloride (DEAC), Diethylaluminum ethoxide and methylaluminoxane (MAO) can be used as the aluminum compounds. In one aspect of the present invention, using organometallic co-catalysts to pre-reduction the vanadium-chromium catalyst, the aluminum compound is generally used in an amount of, based on aluminum, from 0 to 1,000 mol/mol, preferably from 0 to 100 mol/mol, more preferably from 0 to 50 mol/mol, relative to each mole of Cr. Reduction treatment at a temperature of from about room temperature to 100° C., preferably from room temperature to 60° C. Stirring, preferably continuous stirring, such stirring lasts from about 0.5 to 20 h, preferably from about 0.5 to 10 h. Then drying at 60~120° C. for 2~8 h, under an inert gas atmosphere, (e.g. atmosphere of nitrogen, helium, argon and the like). In this time, also can use the vacuum to speed up the drying. The resultant catalyst is stored under an inert gas atmosphere.

As an example, the specific operations for preparing the catalyst of the present invention include:

A porous amorphous silica gel is impregnated in an aqueous solution of vanadium precursor of a certain concentration, wherein the vanadium precursor concentration enables the vanadium loading to satisfy the requirement in the present application relative to the total weight of the catalyst (e.g. 0.1~2%, based on the weight of vanadium). After being continuously stirred for a certain period of time (e.g. 3~8 h), heated and dried, the silica gel support supporting the vanadium precursor is high-temperature calcined in a fluidized bed, wherein at the low temperature stage (e.g. 100~300° C.), the mechanical water of the support is removed and at the high temperature stage (e.g. 300~900° C.), hydroxyl group on the surface of the silica gel is removed. The high temperature stage lasts a certain period of time (e.g. 3~8 h). Finally, the silica gel was naturally cooled down under the protection of nitrogen gas to obtain a vanadium supported catalyst precursor. Then, the vanadium supported catalyst precursor is impregnated in an aqueous solution of chromium precursor of a certain concentration, wherein the chromium precursor concentration enables the chromium loading to satisfy the requirement in the present application relative to the total weight of the catalyst (e.g. 0.1~10%, based on the weight of chromium). After being continuously stirred for a certain period of time (e.g. 4~8 h), heated and dried, the silica gel support supporting the vanadium-chromium precursor is high-temperature calcined in a fluidized bed, wherein at the low temperature stage (e.g. 100~300° C.), the mechanical water of the support is removed and at the high temperature stage (e.g. 300~900° C.), hydroxyl group on the surface of the silica gel is removed. The high temperature stage lasts a certain period of time (e.g. 3~8 h). The silica gel was naturally cooled down under the protection of nitrogen gas to obtain a supported Cr—V catalyst. Then using organometallic co-catalysts (e.g. TEA, TIBA, DEAC, Diethylaluminum ethoxide, MAO, etc.) to pre-reduction the catalyst precursor. Finally drying at 60~120° C. for 2~8 h, the drying is conducted under an inert gas atmosphere, also can use the vacuum to speed up the drying. Then the resultant catalyst is stored under an inert gas atmosphere.

In one aspect of the present invention, the preparation of titanium dioxide modified inorganic carrier, and then load of chromium and vanadium catalyst active component, wherein the available immersion method of titanium dioxide modified inorganic carrier include impregnation method, coprecipitation method and sol-gel method, one of the preparation method is as follows:

i) impregnating an inorganic carrier into an aqueous solution of titanium precursor, drying ii) calcining the product obtained in step i) at 300~900° C.

A preferred process for preparing titanium modified inorganic carrier of the present invention comprises the steps of:

i) impregnating an inorganic carrier into an aqueous solution of titanium precursor, retaining at a temperature of 10~80° C. for 1~12 h, preferably at 20~70° C. for 4~8 h, then drying at 50~220° C. for 6~20 h preferably at 70~150° C. for 8~15 h, in this time, also can use the vacuum to speed up the drying.

ii) calcining the product obtained in step i) in oxygen or air or inert gases at 300~900° C. for 1~10 h preferably at 400~800° C. for 3~8 h, and cooling, wherein gas is replaced with inert gases (such as nitrogen, argon, etc.) when it is cooled to 300~400° C.

Said step i) relates to a method of depositing a titanium precursor onto the inorganic carrier (for example the inorganic carrier mentioned above), and such a method may be any method, known by those skilled in the art, capable of depositing titanium onto a carrier. The titanium precursor may be the Ti precursor as stated above. In one embodiment of the present invention, the method of depositing a titanium precursor onto the inorganic carrier comprises impregnating a porous inorganic carrier with an aqueous solution of titanium precursor. In one embodiment, stirring, preferably continuous stirring, can be implemented during the impregnation. Generally, such stirring lasts from about 1 to 12 h, preferably from about 4 to 8 h at 10~80° C. preferably at 20~70° C. In one embodiment, the Ti loading is about 0.01 wt. % to 30 wt. % of the total weight of the catalyst, preferably from about 0.05 wt. % to 20 wt. %. Then the resultant titanium-supporting support is dried, generally at a temperature of from about room temperature to 250° C., preferably from about 90° C. to 250° C., further preferably from about 100° C. to 200° C. In one embodiment, the drying is conducted at about 120° C., can use the vacuum to speed up the drying. The duration period for such drying is not specially limited, but such drying generally lasts from about 6 to 20 h, preferably from about 7 to 18 h, further preferably from about 8 to 15 h.

Said step (ii) is a method for calcining the Ti modified support, The calcining manner is not specifically limited, but it is preferably conducted within a fluidized bed. In one embodiment, such calcining is carried out by two stages, i.e. low temperature stage and high temperature stage. The low temperature stage is generally conducted at about 100° C. to 300° C., and the high temperature stage is generally conducted at about 300° C. to about 900° C. Without any theoretical limitation, it is believed that the mechanical water of the carrier is removed during the low temperature stage, and the hydroxyl radical on the inorganic carrier is removed during the high temperature stage. In one embodiment, the low temperature stage lasts from 1 to 10 h, preferably from 2 to 9 h, more preferably from 3 to 8 h. In another embodiment, the high temperature stage lasts from 1 to 10 h, preferably from 2 to 9 h, more preferably from 3 to 8 h. In one embodiment, the low temperature stage is carried out under an inert atmosphere or air atmosphere, preferably under an inert atmosphere, wherein the inert gas is selected from, e.g. the inert gases as stated above. In one embodiment, the calcining is carried out in oxygen or air, preferable in air. After calcining, the modified carrier is cooled from the high temperature stage. In one embodiment, when the temperature is decreased to 300~400° C., the atmosphere can be changed, e.g. from air to an inert gas, such as nitrogen gas, argon gas, etc. In one embodiment, such cooling is a natural falling of temperature.

As an example, the specific operations for preparing the Ti modified carrier of the present invention include:

A porous amorphous silica gel is impregnated in a hexane solution of tetra-n-butyl titanate of a certain concentration, wherein the Ti concentration enables the Ti loading to satisfy the requirement in the present application relative to the total weight of the catalyst (e.g. 0.05~20%, based on the weight of titanium). After being continuously stirred for a certain period of time (e.g. 3~8 h), heated and dried, the silica gel carrier supporting the chromium precursor is high-temperature calcined in a fluidized bed, wherein at the low temperature stage (e.g. 100~300° C.), the mechanical water of the support is removed and at the high temperature stage (e.g. 300~900° C.), hydroxyl group on the surface of the silica gel is removed. The high temperature stage lasts a certain period of time (e.g. 3~8 h). Finally, the Ti modified silica gel was naturally cooled down under the protection of nitrogen gas.

In one aspect of the present invention, the present invention provides a process for preparing a supported metal oxide double active center catalyst of the present invention, comprising the steps of:

i) using any method above to prepare the titanium dioxide modified inorganic carrier, include impregnation method, coprecipitation method and sol-gel method.

ii) using any method above to deposit the V and Cr onto the titanium dioxide modified inorganic carrier, include first V then Cr, first Cr then V and together of Cr and V.

iii) if possible, using any method above to pre-reduction the catalyst precursor.

A preferred process for preparing supported metal oxide double active center catalyst of the present invention comprises the steps of:

i) impregnating an inorganic carrier into an aqueous solution of titanium precursor, retaining at a temperature of 10~80° C. for 1~12 h, preferably at 20~70° C. for 4~8 h, then drying at 50~220° C. for 6~20 h preferably at 70~150° C. for 8~15 h, in this time, also can use the vacuum to speed up the drying. Then calcining the product in oxygen or air or inert gases at 300~900° C. for 1~10 h preferably at 400~800° C. for 3~8 h, and cooling, wherein gas is replaced with inert gases (such as nitrogen, argon, etc.) when it is cooled to 300~400° C.

ii) impregnating the modified support obtained from step i) into an aqueous solution of vanadium and chromium precursor, retaining at a temperature of 10~80° C. for 1~12 h, preferably at 20~70° C. for 4~8 h, then drying at 50~220° C. for 6~20 h preferably at 70~150° C. for 8~15 h, in this time, also can use the vacuum to speed up the drying. Then calcining the product in oxygen or air or inert gases at 300~900° C. for 1~10 h preferably at 400~800° C. for 3~8 h, and cooling, wherein gas is replaced with inert gases (such as nitrogen, argon, etc.) when it is cooled to 300~400° C.

iii) impregnating the catalyst obtained in step ii) into organometallic co-catalysts to pre-reduction the catalyst precursor. Finally drying at 60~120° C. for 2~8 h, in this time, also can use the vacuum to speed up the drying. The resultant catalyst is stored under an inert gas atmosphere.

As an example, the specific operations for preparing the Ti modified carrier of the present invention include:

A porous amorphous silica gel is impregnated in a hexane solution of tetra-n-butyl titanate of a certain concentration, wherein the Ti concentration enables the Ti loading to satisfy the requirement in the present application relative to the total weight of the catalyst (e.g. 0.05~20%, based on the weight of titanium). After being continuously stirred for a certain period of time (e.g. 3~8 h), heated and dried, the silica gel carrier supporting the chromium precursor is high-temperature calcined in a fluidized bed, wherein at the low temperature stage (e.g. 100~300° C.), the mechanical water of the support is removed and at the high temperature stage (e.g. 300~900° C.), hydroxyl group on the surface of the silica gel is removed. The high temperature stage lasts a certain period of time (e.g. 3~8 h). Finally, the Ti modified silica gel was naturally cooled down under the protection of nitrogen gas. Then the Ti modified silica gel is impregnated in an aqueous solution of vanadium precursor of a certain concentration, wherein the vanadium precursor concentration enables the vanadium loading to satisfy the requirement in the present application relative to the total weight of the catalyst (e.g. 0.1~2%, based on the weight of vanadium). After being continuously stirred for a certain period of time (e.g. 3~8 h), heated and dried, the Ti modified silica gel carrier supporting the vanadium precursor is high-temperature calcined in a fluidized bed, wherein at the low temperature stage (e.g. 100~300° C.), the mechanical water of the carrier is removed and at the high temperature stage (e.g. 300~900° C.), hydroxyl group on the surface of the silica gel is removed. The high temperature stage lasts a certain period of time (e.g. 3~8 h). Finally, the Ti modified silica gel was naturally cooled down under the protection of nitrogen gas to obtain a vanadium supported catalyst precursor. Then, the vanadium supported catalyst precursor is impregnated in an aqueous solution of chromium precursor of a certain concentration, wherein the chromium precursor concentration enables the chromium loading to satisfy the requirement in the present application relative to the total weight of the catalyst (e.g. 0.1~10%, based on the weight of chromium). After being continuously stirred for a certain period of time (e.g. 4~8 h), heated and dried, the Ti modified silica gel support supporting the vanadium-chromium precursor is high-temperature calcined in a fluidized bed, wherein at the low temperature stage (e.g. 100~300° C.), the mechanical water of the support is removed and at the high temperature stage (e.g. 300~900° C.), hydroxyl group on the surface of the Ti modified silica gel is removed. The high temperature stage lasts a certain period of time (e.g. 3~8 h). The silica gel was naturally cooled down under the protection of nitrogen gas to obtain a Ti modified supported Cr—V catalyst. Then using organometallic co-catalysts (e.g. TEA, TIBA, DEAC, Diethylaluminum ethoxide, MAO, etc.) to pre-reduction the catalyst precursor. Finally drying at 60~120° C. for 2~8 h, the drying is conducted under an inert gas atmosphere, also can use the vacuum to speed up the drying. Then the resultant catalyst is stored under an inert gas atmosphere.

In one aspect of the present invention, the preparation of fluorine modified inorganic carrier, and then load of chromium and vanadium catalyst active component, wherein the available immersion method of fluorine modified inorganic carrier is impregnation method, which is as follows:

i) impregnating an inorganic carrier into an aqueous solution of fluorine precursor, drying ii) calcining the product obtained in step i) at 300~900° C.

A preferred process for preparing fluorine modified inorganic carrier of the present invention comprises the steps of:

i) impregnating an inorganic carrier into an aqueous solution of fluorine precursor, retaining at a temperature of 10~80° C. for 1~12 h, preferably at 20~70° C. for 4~8 h, then drying at 50~220° C. for 6~20 h preferably at 70~150° C. for 8~15 h, in this time, also can use the vacuum to speed up the drying.

ii) calcining the product obtained in step i) in oxygen or air or inert gases at 300~900° C. for 1~10 h preferably at 400~800° C. for 3~8 h, and cooling, wherein gas is replaced with inert gases (such as nitrogen, argon, etc.) when it is cooled to 300~400° C.

Said step i) relates to a method of depositing a fluorine precursor onto the inorganic carrier (for example the inorganic carrier mentioned above), and such a method may be any method, known by those skilled in the art, capable of depositing fluorine onto a carrier. The fluorine precursor may be the F precursor as stated above. In one embodiment of the present invention, the method of depositing a fluorine precursor onto the inorganic carrier comprises impregnating a porous inorganic carrier with an aqueous solution of titanium precursor. In one embodiment, stirring, preferably continuous stirring, can be implemented during the impregnation. Generally, such stirring lasts from about 1 to 12 h, preferably from about 4 to 8 h at 10~80° C. preferably at 20~70° C. In one embodiment, the F loading is about 0.01 wt. % to 30 wt. % of the total weight of the catalyst, preferably from about 0.05 wt. % to 20 wt. %. Then the resultant titanium-supporting carrier is dried, generally at a temperature of from about room temperature to 250° C., preferably from about 90° C. to 250° C., further preferably from about 100° C. to 200° C. In one embodiment, the drying is conducted at about 120° C., can use the vacuum to speed up the drying. The duration period for such drying is not specially limited, but such drying generally lasts from about 6 to 20 h, preferably from about 7 to 18 h, further preferably from about 8 to 15 h.

Said step (ii) is a method for calcining the F modified support, The calcining manner is not specifically limited, but it is preferably conducted within a fluidized bed. In one embodiment, such calcining is carried out by two stages, i.e. low temperature stage and high temperature stage. The low temperature stage is generally conducted at about 100° C. to 300° C., and the high temperature stage is generally conducted at about 300° C. to about 900° C. Without any theoretical limitation, it is believed that the mechanical water of the support is removed during the low temperature stage, and the hydroxyl radical on the inorganic carrier is removed during the high temperature stage. In one embodiment, the low temperature stage lasts from 1 to 10 h, preferably from 2 to 9 h, more preferably from 3 to 8 h. In another embodiment, the high temperature stage lasts from 1 to 10 h, preferably from 2 to 9 h, more preferably from 3 to 8 h. In one embodiment, the low temperature stage is carried out under an inert atmosphere or air atmosphere, preferably under an inert atmosphere, wherein the inert gas is selected from, e.g. the inert gases as stated above. In one embodiment, the calcining is carried out in oxygen or air, preferable in air. After calcining, the modified support is cooled from the high temperature stage. In one embodiment, when the temperature is decreased to 300~400° C., the atmosphere can be changed, e.g. from air to an inert gas, such as nitrogen gas, argon gas, etc. In one embodiment, such cooling is a natural falling of temperature.

As an example, the specific operations for preparing the F modified support of the present invention include:

A porous amorphous silica gel is impregnated in a hexane solution of ammonium fluorosilicate of a certain concentration, wherein the F concentration enables the F loading to satisfy the requirement in the present application relative to the total weight of the catalyst (e.g. 0.05~20%, based on the weight of titanium). After being continuously stirred for a certain period of time (e.g. 3~8 h), heated and dried, the silica gel support supporting the chromium precursor is high-temperature calcined in a fluidized bed, wherein at the low temperature stage (e.g. 100~300° C.), the mechanical water of the carrier is removed and at the high temperature stage (e.g. 300~900° C.), hydroxyl group on the surface of the silica gel is removed. The high temperature stage lasts a certain period of time (e.g. 3~8 h). Finally, the F modified silica gel was naturally cooled down under the protection of nitrogen gas.

In one aspect of the present invention, the present invention provides a process for preparing a supported metal oxide double active center catalyst of the present invention, comprising the steps of:

i) using any method above to prepare the titanium dioxide modified inorganic carrier, include impregnation method, coprecipitation method and sol-gel method.

ii) using any method above to deposit the V and Cr onto the titanium dioxide modified inorganic carrier, include first V then Cr, first Cr then V and together of Cr and V.

iii) if possible, using any method above to pre-reduction the catalyst precursor.

A preferred process for preparing supported metal oxide double active center catalyst of the present invention comprises the steps of:

i) impregnating an inorganic carrier into an aqueous solution of titanium precursor, retaining at a temperature of 10~80° C. for 1~12 h, preferably at 20~70° C. for 4~8 h, then drying at 50~220° C. for 6~20 h preferably at 70~150° C. for 8~15 h, in this time, also can use the vacuum to speed up the drying. Then calcining the product in oxygen or air or inert gases at 300~900° C. for 1~10 h preferably at 400~800° C. for 3~8 h, and cooling, wherein gas is replaced with inert gases (such as nitrogen, argon, etc.) when it is cooled to 300~400° C.

ii) impregnating the modified support obtained from step i) into an aqueous solution of vanadium and chromium precursor, retaining at a temperature of 10~80° C. for 1~12 h, preferably at 20~70° C. for 4~8 h, then drying at 50~220° C. for 6~20 h preferably at 70~150° C. for 8~15 h, in this time, also can use the vacuum to speed up the drying. Then calcining the product in oxygen or air or inert gases at 300~900° C. for 1~10 h preferably at 400~800° C. for 3~8 h, and cooling, wherein gas is replaced with inert gases (such as nitrogen, argon, etc.) when it is cooled to 300~400° C.

iii) impregnating the catalyst obtained in step ii) into organometallic co-catalysts to pre-reduction the catalyst precursor. Finally drying at 60~120° C. for 2~8 h, in this time, also can use the vacuum to speed up the drying. The resultant catalyst is stored under an inert gas atmosphere.

As an example, the specific operations for preparing the F modified support of the present invention include:

A porous amorphous silica gel is impregnated in a hexane solution of ammonium fluorosilicate of a certain concentration, wherein the F concentration enables the F loading to satisfy the requirement in the present application relative to the total weight of the catalyst (e.g. 0.05~20%, based on the weight of titanium). After being continuously stirred for a certain period of time (e.g. 3~8 h), heated and dried, the silica gel support supporting the chromium precursor is high-temperature calcined in a fluidized bed, wherein at the low temperature stage (e.g. 100~300° C.), the mechanical water of the support is removed and at the high temperature stage (e.g. 300~900° C.), hydroxyl group on the surface of the silica gel is removed. The high temperature stage lasts a certain period of time (e.g. 3~8 h). Finally, the F modified silica gel was naturally cooled down under the protection of nitrogen gas. Then the F modified silica gel is impregnated in an aqueous solution of vanadium precursor of a certain concentration, wherein the vanadium precursor concentration enables the vanadium loading to satisfy the requirement in the present application relative to the total weight of the catalyst (e.g. 0.1~2%, based on the weight of vanadium). After being continuously stirred for a certain period of time (e.g. 3~8 h), heated and dried, the F modified silica gel support supporting the vanadium precursor is high-temperature calcined in a fluidized bed, wherein at the low temperature stage (e.g. 100~300° C.), the mechanical water of the support is removed and at the high temperature stage (e.g. 300~900° C.), hydroxyl group on the surface of the silica gel is removed. The high temperature stage lasts a certain period of time (e.g. 3~8 h). Finally, the F modified silica gel was naturally cooled down under the protection of nitrogen gas to obtain a vanadium supported catalyst precursor. Then, the vanadium supported catalyst precursor is impregnated in an aqueous solution of chromium precursor of a certain concentration, wherein the chromium precursor concentration enables the chromium loading to satisfy the requirement in the present application relative to the total weight of the catalyst (e.g. 0.1~10%, based on the weight of chromium). After being continuously stirred for a certain period of time (e.g. 4~8 h), heated and dried, the F modified silica gel support supporting the vanadium-chromium precursor is high-temperature calcined in a fluidized bed, wherein at the low temperature stage (e.g. 100~300° C.), the mechanical water of the support is removed and at the high temperature stage (e.g. 300~900° C.), hydroxyl group on the surface of the F modified silica gel is removed. The high temperature stage lasts a certain period of time (e.g. 3~8 h). The silica gel was naturally cooled down under the protection of nitrogen gas to obtain a F modified supported Cr—V catalyst. Then using organometallic co-catalysts (e.g. TEA, TIBA, DEAC, Diethylaluminum ethoxide, MAO, etc.) to pre-reduction the catalyst precursor. Finally drying at 60~120° C. for 2~8 h, the drying is conducted under an inert gas atmosphere, also can use the vacuum to speed up the drying. Then the resultant catalyst is stored under an inert gas atmosphere.

The supported hybrid vanadium-chromium-based catalyst (include using organometallic co-catalysts pre-reduction catalyst) of the present invention can be used for producing ethylene homopolymer and ethylene/α-olefin copolymer. According to requirement, The polymerization process may use organometallic co-catalysts, hydrogen, etc.

In another aspect, the present invention provides a process for producing an ethylene homopolymer and ethylene/α-olefin copolymer by using the supported hybrid vanadium-chromium-based catalyst of the present invention, in particular a process for producing an olefin polymer having a broad molecular weight distribution.

As for the process above, the olefin(s) used for polymerization generally comprises ethylene as the polymerization monomer. In one embodiment, the olefin used for polymerization further comprises a comonomer. The comonomer may be an α-olefin having from 3 to 20 carbon atoms, e.g. propylene, 1-butene, 1-pentene, 1-hexene, 1-heptene, 1-octene, 1-nonene, 1-decene, 1-dodecylene, 4-methyl-1-pentene, 4-methyl-1-hexene and the like, which can be used alone or in combinations of two or more. The comonomer is preferably selected from the group consisting of 1-hexene, 1-octene and 1-decene. When the comonomer exits, the amount thereof generally ranges from 0 to 30 vol. % based on the solvent used during the polymerization.

According to requirement, the polymerization process may use organometallic co-catalysts (for example the organometallic co-catalysts mentioned above). In one embodiment, said organometallic cocatalysts may mention organic aluminum compounds. As an organic aluminum compounds example, TEA, TIBA, DEAC, Diethylaluminum ethoxide, MAO, etc. may be mentioned. The aluminum compound is generally used in an amount of, based on aluminum, from 0 to 1000 mol/mol, preferably from 0 to 70 mol/mol, more preferably from 0 to 50 mol/mol, relative to each mole of Cr.

The polymerization may use a molecular weight regulator, such as hydrogen as an example.

As for the aforesaid process for preparing polymers, there is no special limitation to the polymerization process. The processes for preparing olefin polymers by using the hybrid catalyst of the present invention can include gas phase polymerization, slurry polymerization, suspension polymerization, bulk polymerization, solution polymerization and the like. As understood by those skilled in the art, there is no special limitation to the process for preparing olefin polymers by using the hybrid catalyst of the present invention, and the process can be carried out by using the conventional implementation solutions and polymerization conditions of gas phase polymerization, slurry polymerization, suspension polymerization, bulk polymerization and solution polymerization known in the art.

In one embodiment, the slurry polymerization is used, comprising adding into the reaction kettle ethylene, and then adding a solvent and a co-catalyst (an aluminum compound), and optionally adding hydrogen and comonomer(s), and finally adding the hybrid catalyst of the present invention to start the polymerization.

As for the solvent for aforesaid slurry polymerization is also well known by those skilled in the art. May be an alkane having from 3 to 20 carbon atoms, e.g. propane, n-butane, iso-butane, n-pentane, iso-pentane, neopentane, n-hexane, cyclohexane, n-heptane, n-octane and the like, which can be used alone or in combinations of two or more. Preferably iso-butane, iso-pentane, n-hexane, cyclohexane, n-heptane, etc.

More specifically, in one embodiment the polymerization is carried out by the conventional slurry polymerization, and the specific operations are as follows:

The polymerization reaction kettle is firstly heated (100° C.) under vacuum, and then replaced with highly pure nitrogen, which is repeated for three times. A small amount of monomeric ethylene is further used to replace once. Finally, the reaction kettle is filled with ethylene to a slightly positive pressure (0.12 MPa). Into the reaction kettle are added a refined solvent treated by dehydration and deoxidation and a certain amount of alkylaluminium as the co-catalyst. It is also required in the hydrogen regulation and copolymerization experiments to respectively add a certain amount of hydrogen and comonomer(s). Finally, the catalyst of present invention is added to start the polymerization. The instantaneous consumption of monomeric ethylene is on-line collected (by a high-precision ethylene mass flow meter connecting with a computer) during the reaction and recorded by the computer. After the reaction is conducted at a certain temperature (e.g. 35~90) for a certain period of time (e.g. 1 h), a mixed solution of hydrochloric acid/ethanol is added to terminate the reaction, and the polymer is washed, vacuum dried, weighed and analyzed.

The catalyst of the present invention can produce ethylene homopolymers and ethylene-α-olefin copolymers having a broad molecular weight distribution (MWD=10~60) in a single reactor. Using the hybrid catalyst of the present invention, by changing factors such as the amount of co-catalyst, polymerization temperature, molecular weight regulator and the like, the molecular weight and molecular weight distribution of ethylene homopolymers and ethylene-α-olefin copolymers can be conveniently and readily regulated, so as to conveniently and readily obtain polymers having the required properties.

DESCRIPTION OF THE PREFERRED EMBODIMENTS OF THE INVENTION

The present invention is more detailedly illustrated by reference to the following examples, but is not limited by these examples.

The silica gel used in the examples is Davison 955 or 948.

Cases of various polymer properties according to the following method:

High temperature and gel chromatography (HT-GPC)

Weight average molecular weight and molecular weight distribution with high temperature and gel chromatography determination: this experiment adopts the PL-220 type high temperature gel permeation chromatograph (Polymer Laboratories company) to determine polyethylene molecular weight and molecular weight distribution. Experiment 1,2, 4-trichlorobenzene as solvent, the determination of under 160° C. A narrow distribution polystyrene as the prototype of the universal correction method of data processing.

Differential Scanning Calorimetry (DSC)

Test of polymer melting point: this experiment adopts the TA Q200 type under nitrogen protection differential scanning calorimeter test. Sample first with 10° C./min speed from room temperature to heat up to 150° C., and constant temperature for 5 min, then down to room temperature naturally. Then heat up with 10° C./min speed scan (at room temperature to 150° C.), DSC curve.

Example 1

Figure 1:
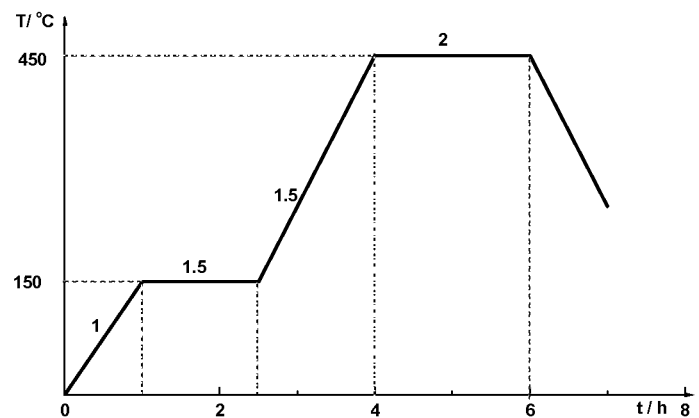
FIG. 1 represents the process of treating the silica gel support or the catalyst precursor.
Figure 2:
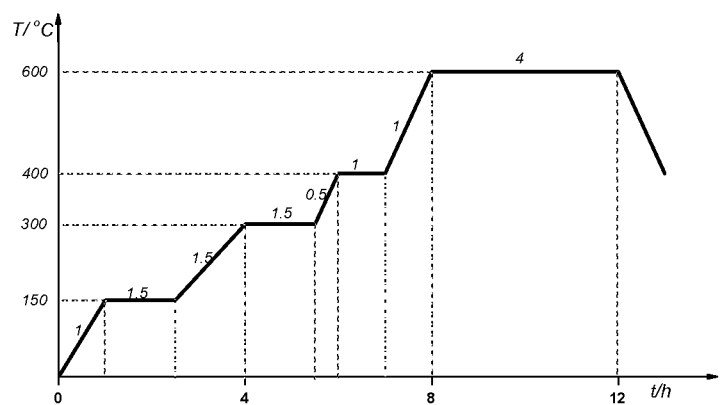
FIG. 2 represents the process of treating the silica gel support or the catalyst precursor.

10 g of silica gel (having a pore volume of 1.5~1.7 cm$^3$/g and a surface area of 250~300 m$^2$/g) was impregnated in an aqueous solution of vanadyl oxalate at 40° C., enabled the vanadium loading (based on the mass of V) to be 0.48%. After being continuously stirred for 5 h, heated to 120° C. and dried in air for 5 h, the silica gel support supporting the vanadyl oxalate was high-temperature calcined in a fluidized bed. Finally, the silica gel was naturally cooled down under the protection of nitrogen gas to obtain a vanadium supported catalyst precursor. The high temperature calcining and then cooling processes above are shown in FIG. 1. Then it was impregnated in an aqueous solution of alkali type chromium acetate, enabled the chromium loading (based on the mass of Cr) to be 0.5%. After being continuously stirred for 4 h, heated to 120° C. and dried in air for 4 h, it was high-temperature calcined in a fluidized bed. Finally, it was naturally cooled down under the protection of nitrogen gas.

Example 2

10 g of silica gel (having a pore volume of 1.5~1.7 cm$^3$/g and a surface area of 250~300 m$^2$/g) was impregnated in an aqueous solution of alkali type chromium acetate and ammonium metavanadate at 40° C., enabled the vanadium and chromium loading (based on the mass of V and Cr) to be 0.48% and 0.5%. After being continuously stirred for 4 h, heated to 120° C. and dried in air for 4 h, it was high-temperature calcined in a fluidized bed. Finally, it was naturally cooled down under the protection of nitrogen gas.

Example 3

10 g of silica gel (having a pore volume of 1.5~1.7 cm$^3$/g and a surface area of 250~300 m$^2$/g) was impregnated in an aqueous solution of vanadyl sulfate at 40° C., enabled the vanadium loading (based on the mass of V) to be 0.16%. After being continuously stirred for 5 h, heated to 120° C. and dried in air for 6 h, it was high-temperature calcined in a fluidized bed. Finally, it was naturally cooled down under the protection of nitrogen gas to obtain a vanadium supported catalyst precursor. The high temperature calcining and then cooling processes above are shown in FIG. 1. Then it was impregnated in an aqueous solution of alkali type chromium acetate, enabled the chromium loading (based on the mass of Cr) to be 0.5%. After being continuously stirred for 4 h, heated to 120° C. and dried in air for 4 h, it was high-temperature calcined in a fluidized bed. Finally, it was naturally cooled down under the protection of nitrogen gas.

Example 4

10 g of silica gel (having a pore volume of 1.5~1.7 cm$^3$/g and a surface area of 250~300 m$^2$/g) was impregnated in an aqueous solution of ammonium metavanadate at 40° C., enabled the vanadium loading (based on the mass of V) to be 0.24%. After being continuously stirred for 5 h, heated to 120° C. and dried in air for 6 h, it was high-temperature calcined in a fluidized bed in 450° C. Finally, it was naturally cooled down under the protection of nitrogen gas to obtain a vanadium supported catalyst precursor. The high temperature calcining and then cooling processes above are shown in FIG. 1. Then it was impregnated in an aqueous solution of alkali type chromium acetate, enabled the chromium loading (based on the mass of Cr) to be 0.5%. After being continuously stirred for 4 h, heated to 120° C. and dried in air for 4 h, it was high-temperature calcined in a fluidized bed. Finally, it was naturally cooled down under the protection of nitrogen gas.

Example 5

10 g of silica gel (having a pore volume of 1.5~1.7 cm$^3$/g and a surface area of 250~300 m$^2$/g) was impregnated in an alcohol solution of Diacetyl acetone vanadium oxide at 40° C., enabled the vanadium loading (based on the mass of V) to be 0.24%. After being continuously stirred for 5 h, heated to 120° C. and dried in air for 6 h, it was high-temperature calcined in a fluidized bed. Finally, it was naturally cooled down under the protection of nitrogen gas to obtain a vanadium supported catalyst precursor. The high temperature calcining and then cooling processes above are shown in FIG. 1. Then it was impregnated in an aqueous solution of alkali type chromium acetate, enabled the chromium loading (based on the mass of Cr) to be 0.5%. After being continuously stirred for 4 h, heated to 120° C. and dried in air for 4 h, it was high-temperature calcined in a fluidized bed. Finally, it was naturally cooled down under the protection of nitrogen gas.

Example 6

10 g of silica gel (having a pore volume of 1.5~1.7 cm$^3$/g and a surface area of 250~300 m$^2$/g) was impregnated in an aqueous solution of alkali type chromium acetate, enabled the Cr loading (based on the mass of Cr) to be 0.24%. After being continuously stirred for 5 h, heated to 120° C. and dried in air for 6 h, it was high-temperature calcined in a fluidized bed. Finally, it was naturally cooled down under the protection of nitrogen gas to obtain a vanadium supported catalyst precursor. The high temperature calcining and then cooling processes above are shown in FIG. 1. Then it was impregnated in an aqueous solution of sodium metavanadate at 40° C., enabled the V loading (based on the mass of V) to be 0.5%. After being continuously stirred for 4 h, heated to 120° C. and dried in air for 4 h, it was high-temperature calcined in a fluidized bed. Finally, it was naturally cooled down under the protection of nitrogen gas.

Example 7

10 g of silica gel (having a pore volume of 1.5~1.7 cm$^3$/g and a surface area of 250~300 m$^2$/g) was impregnated in an aqueous solution of ammonium metavanadate at 40° C., enabled the vanadium loading (based on the mass of V) to be 0.24%. After being continuously stirred for 5 h, heated to 120° C. and dried in air for 6 h, it was high-temperature calcined in a fluidized bed in 450° C. Finally, it was naturally cooled down under the protection of nitrogen gas to obtain a vanadium supported catalyst precursor. The high temperature calcining and then cooling processes above are shown in FIG. 1. Then it was impregnated in an aqueous solution of alkali type chromium acetate, enabled the chromium loading (based on the mass of Cr) to be 0.5%. After being continuously stirred for 4 h, heated to 120° C. and dried in air for 4 h, it was high-temperature calcined in a fluidized bed. Finally, it was naturally cooled down under the protection of nitrogen gas. Then used organometallic co-catalysts MAO to pre-reduction the catalyst precursor, the concentration of co-catalyst was 1.0 mmol/mL. Finally drying at 100° C. for 4 h, the drying is conducted under an inert gas atmosphere.

Example 8

160 mg of the catalyst in Example 1 was weighed for the polymerization respectively. The polymerization reaction kettle was firstly heated (100° C.) under vacuum, and then replaced with highly pure nitrogen, which was repeated for three times. Then a small amount of monomeric ethylene was used to replace once. Finally, the reaction kettle was filled with ethylene to a slight positive pressure (0.12 MPa). Into the reaction kettle were added in turn about 70 mL of a refined heptane treated by dehydration and deoxidation as solvent and TIBA as co-catalyst respectively, wherein the co-catalyst had a concentration of 1.0 mmol/mL (n-hexane solution) and Al/Cr (molar ratio)=10. Finally the pressure of ethylene in the kettle was raised to 0.15 MPa and the catalyst was added to start the polymerization. The instantaneous consumption of monomeric ethylene was on-line collected (by the high-precision ethylene mass flow meter connecting with a computer) during the reaction and recorded by the computer. After the reaction was conducted at 90° C. for 1 h, a mixed solution of hydrochloric acid/ethanol was added to terminate the reaction, and the polymer was vacuum dried, weighed and analyzed.

Example 9

160 mg of the catalyst in Example 2 was weighed for the polymerization respectively. The polymerization reaction kettle was firstly heated (100° C.) under vacuum, and then replaced with highly pure nitrogen, which was repeated for three times. Then a small amount of monomeric ethylene was used to replace once. Finally, the reaction kettle was filled with ethylene to a slight positive pressure (0.12 MPa). Into the reaction kettle were added in turn about 70 mL of a refined heptane treated by dehydration and deoxidation as solvent and TIBA as co-catalyst respectively, wherein the co-catalyst had a concentration of 1.0 mmol/mL (n-hexane solution) and Al/Cr (molar ratio)=10. Finally the pressure of ethylene in the kettle was raised to 0.15 MPa and the catalyst was added to start the polymerization. The instantaneous consumption of monomeric ethylene was on-line collected (by the high-precision ethylene mass flow meter connecting with a computer) during the reaction and recorded by the computer. After the reaction was conducted at 90° C. for 1 h, a mixed solution of hydrochloric acid/ethanol was added to terminate the reaction, and the polymer was vacuum dried, weighed and analyzed.

Example 10

160 mg of the catalyst in Example 3 was weighed for the polymerization respectively. The polymerization reaction kettle was firstly heated (100° C.) under vacuum, and then replaced with highly pure nitrogen, which was repeated for three times. Then a small amount of monomeric ethylene was used to replace once. Finally, the reaction kettle was filled with ethylene to a slight positive pressure (0.12 MPa). Into the reaction kettle were added in turn about 70 mL of a refined heptane treated by dehydration and deoxidation as solvent and TIBA as co-catalyst respectively, wherein the co-catalyst had a concentration of 1.0 mmol/mL (n-hexane solution) and Al/Cr (molar ratio)=5. Finally the pressure of ethylene in the kettle was raised to 0.15 MPa and the catalyst was added to start the polymerization. The instantaneous consumption of monomeric ethylene was on-line collected (by the high-precision ethylene mass flow meter connecting with a computer) during the reaction and recorded by the computer. After the reaction was conducted at 90° C. for 1 h, a mixed solution of hydrochloric acid/ethanol was added to terminate the reaction, and the polymer was vacuum dried, weighed and analyzed.

Example 11

160 mg of the catalyst in Example 5 was weighed for the polymerization respectively. The polymerization reaction kettle was firstly heated (100° C.) under vacuum, and then replaced with highly pure nitrogen, which was repeated for three times. Then a small amount of monomeric ethylene was used to replace once. Finally, the reaction kettle was filled with ethylene to a slight positive pressure (0.12 MPa). Into the reaction kettle were added in turn about 70 mL of a refined heptane treated by dehydration and deoxidation as solvent and TIBA as co-catalyst respectively, wherein the co-catalyst had a concentration of 1.0 mmol/mL (n-hexane solution) and Al/Cr (molar ratio)=20. Finally the pressure of ethylene in the kettle was raised to 0.15 MPa and the catalyst was added to start the polymerization. The instantaneous consumption of monomeric ethylene was on-line collected (by the high-precision ethylene mass flow meter connecting with a computer) during the reaction and recorded by the computer. After the reaction was conducted at 90° C. for 1 h, a mixed solution of hydrochloric acid/ethanol was added to terminate the reaction, and the polymer was vacuum dried, weighed and analyzed.

Example 12

160 mg of the catalyst in Example 6 was weighed for the polymerization respectively. The polymerization reaction kettle was firstly heated (100° C.) under vacuum, and then replaced with highly pure nitrogen, which was repeated for three times. Then a small amount of monomeric ethylene was used to replace once. Finally, the reaction kettle was filled with ethylene to a slight positive pressure (0.12 MPa). Into the reaction kettle were added in turn about 70 mL of a refined heptane treated by dehydration and deoxidation as solvent and TIBA as co-catalyst respectively, wherein the co-catalyst had a concentration of 1.0 mmol/mL (n-hexane solution) and Al/Cr (molar ratio)=5. Finally the pressure of ethylene in the kettle was raised to 0.15 MPa and the catalyst was added to start the polymerization. The instantaneous consumption of monomeric ethylene was on-line collected (by the high-precision ethylene mass flow meter connecting with a computer) during the reaction and recorded by the computer. After the reaction was conducted at 90° C. for 1 h, a mixed solution of hydrochloric acid/ethanol was added to terminate the reaction, and the polymer was vacuum dried, weighed and analyzed.

Example 13

160 mg of the catalyst in Example 7 was weighed for the polymerization respectively. The polymerization reaction kettle was firstly heated (100° C.) under vacuum, and then replaced with highly pure nitrogen, which was repeated for three times. Then a small amount of monomeric ethylene was used to replace once. Finally, the reaction kettle was filled with ethylene to a slight positive pressure (0.12 MPa). Into the reaction kettle were added in turn about 70 mL of a refined heptane treated by dehydration, Finally the pressure of ethylene in the kettle was raised to 0.15 MPa and the catalyst was added to start the polymerization. The instantaneous consumption of monomeric ethylene was on-line collected (by the high-precision ethylene mass flow meter connecting with a computer) during the reaction and recorded by the computer. After the reaction was conducted at 90° C. for 1 h, a mixed solution of hydrochloric acid/ethanol was added to terminate the reaction, and the polymer was vacuum dried, weighed and analyzed.

Example 14

160 mg of the catalyst in Example 4 was weighed for the polymerization respectively. The polymerization reaction kettle was firstly heated (100° C.) under vacuum, and then replaced with highly pure nitrogen, which was repeated for three times. Then a small amount of monomeric ethylene was used to replace once. Finally, the reaction kettle was filled with ethylene to a slight positive pressure (0.12 MPa). Into the reaction kettle were added in turn about 70 ml of a refined heptane treated by dehydration and deoxidation as solvent and TIBA as co-catalyst respectively, wherein the co-catalyst had a concentration of 1.0 mmol/mL (n-hexane solution) and Al/Cr (molar ratio)=10. Finally the pressure of ethylene in the kettle was raised to 0.15 MPa and the catalyst was added to start the polymerization. The instantaneous consumption of monomeric ethylene was on-line collected (by the high-precision ethylene mass flow meter connecting with a computer) during the reaction and recorded by the computer. After the reaction was conducted at 90° C. for 1 h, a mixed solution of hydrochloric acid/ethanol was added to terminate the reaction, and the polymer was vacuum dried, weighed and analyzed.

Example 15

160 mg of the catalyst in Example 4 was weighed for the polymerization respectively. The polymerization reaction kettle was firstly heated (100° C.) under vacuum, and then replaced with highly pure nitrogen, which was repeated for three times. Then a small amount of monomeric ethylene was used to replace once. Finally, the reaction kettle was filled with ethylene to a slight positive pressure (0.12 MPa). Into the reaction kettle were added in turn about 70 mL of a refined heptane treated by dehydration and deoxidation as solvent and TIBA as co-catalyst respectively, wherein the co-catalyst had a concentration of 1.0 mmol/mL (n-hexane solution) and Al/Cr (molar ratio)=5, 10, 15 and 20 (Example 15-1, 15-2, 15-3 and 15-4). Finally the pressure of ethylene in the kettle was raised to 0.15 MPa and the catalyst was added to start the polymerization. The instantaneous consumption of monomeric ethylene was on-line collected (by the high-precision ethylene mass flow meter connecting with a computer) during the reaction and recorded by the computer. After the reaction was conducted at 90° C. for 1 h, a mixed solution of hydrochloric acid/ethanol was added to terminate the reaction, and the polymer was vacuum dried, weighed and analyzed.

Example 16

160 mg of the catalyst in Example 4 was weighed for the polymerization respectively. The polymerization reaction kettle was firstly heated (100° C.) under vacuum, and then replaced with highly pure nitrogen, which was repeated for three times. Then a small amount of monomeric ethylene was used to replace once. Finally, the reaction kettle was filled with ethylene to a slight positive pressure (0.12 MPa). Into the reaction kettle were added in turn about 70 ml of a refined heptane treated by dehydration and deoxidation as solvent and TIBA as co-catalyst respectively, wherein the co-catalyst had a concentration of 1.0 mmol/mL (n-hexane solution) and Al/Cr (molar ratio)=10. Finally the pressure of ethylene in the kettle was raised to 0.15 MPa and the catalyst was added to start the polymerization. The instantaneous consumption of monomeric ethylene was on-line collected (by the high-precision ethylene mass flow meter connecting with a computer) during the reaction and recorded by the computer. After the reaction was conducted at 50° C. and 70° C. for 1 h (Example 16-1, 16-2), a mixed solution of hydrochloric acid/ethanol was added to terminate the reaction, and the polymer was vacuum dried, weighed and analyzed.

Example 17

160 mg of the catalyst in Example 4 was weighed for the polymerization respectively. The polymerization reaction kettle was firstly heated (100° C.) under vacuum, and then replaced with highly pure nitrogen, which was repeated for three times. Then a small amount of monomeric ethylene was used to replace once. Finally, the reaction kettle was filled with ethylene to a slight positive pressure (0.12 MPa). Into the reaction kettle were added in turn about 70 ml of a refined heptane treated by dehydration and deoxidation as solvent and TEA as co-catalyst respectively, wherein the co-catalyst had a concentration of 1.0 mmol/mL (n-hexane solution) and Al/Cr (molar ratio)=10. Finally the pressure of ethylene in the kettle was raised to 0.15 MPa and the catalyst was added to start the polymerization. The instantaneous consumption of monomeric ethylene was on-line collected (by the high-precision ethylene mass flow meter connecting with a computer) during the reaction and recorded by the computer. After the reaction was conducted at 85° C. for 1 h, a mixed solution of hydrochloric acid/ethanol was added to terminate the reaction, and the polymer was vacuum dried, weighed and analyzed.

Example 18

160 mg of the catalyst in Example 4 was weighed for the polymerization respectively. The polymerization reaction kettle was firstly heated (100° C.) under vacuum, and then replaced with highly pure nitrogen, which was repeated for three times. Then a small amount of monomeric ethylene was used to replace once. Finally, the reaction kettle was filled with ethylene to a slight positive pressure (0.12 MPa). Into the reaction kettle were added in turn about 70 ml of a refined heptane treated by dehydration and deoxidation as solvent, a refined hexene treated by dehydration and deoxidation as comonomer and TIBA as co-catalyst respectively, wherein the co-catalyst had a concentration of 1.0 mmol/mL (n-hexane solution) and Al/Cr (molar ratio)=10. The amount of 1-hexene was respectively 0.7 mL, 2.1 mL, and 3.5 mL, i.e. the volume ratio of 1-hexene and the solvent used for polymerization being 1 vol % (Example 18-1), 3 vol % (Example 18-2) and 5 vol % (Example 18-3). Finally the pressure of ethylene in the kettle was raised to 0.15 MPa and the catalyst was added to start the polymerization. The instantaneous consumption of monomeric ethylene was on-line collected (by the high-precision ethylene mass flow meter connecting with a computer) during the reaction and recorded by the computer. After the reaction was conducted at 85° C. for 1 h, a mixed solution of hydrochloric acid/ethanol was added to terminate the reaction, and the polymer was vacuum dried, weighed and analyzed.

Example 19

160 mg of the catalyst in Example 4 was weighed for the polymerization respectively. The polymerization reaction kettle was firstly heated (100° C.) under vacuum, and then replaced with highly pure nitrogen, which was repeated for three times. Then a small amount of monomeric ethylene was used to replace once. Finally, the reaction kettle was filled with ethylene to a slight positive pressure (0.12 MPa). Into the reaction kettle were added in turn about 70 ml of a refined heptane treated by dehydration and deoxidation as solvent, 10 mL hydrogen and TIBA as co-catalyst respectively, wherein the co-catalyst had a concentration of 1.0 mmol/mL (n-hexane solution) and Al/Cr (molar ratio)=10. Finally the pressure of ethylene in the kettle was raised to 0.15 MPa and the catalyst was added to start the polymerization. The instantaneous consumption of monomeric ethylene was on-line collected (by the high-precision ethylene mass flow meter connecting with a computer) during the reaction and recorded by the computer. After the reaction was conducted at 85° C. for 1 h, a mixed solution of hydrochloric acid/ethanol was added to terminate the reaction, and the polymer was vacuum dried, weighed and analyzed.

Example 20

100 mg of the catalyst in Example 4 was weighed for the polymerization respectively. The polymerization reaction kettle was firstly heated (100° C.) under vacuum, and then replaced with highly pure nitrogen, which was repeated for three times. Then a small amount of monomeric ethylene was used to replace once. Finally, the reaction kettle was filled with ethylene to a slight positive pressure (0.12 MPa). Into the reaction kettle were added in turn about 200 ml of a refined heptane treated by dehydration and deoxidation as solvent and TIBA as co-catalyst respectively, wherein the co-catalyst had a concentration of 1.0 mmol/mL (n-hexane solution) and Al/Cr (molar ratio)=10. Finally the pressure of ethylene in the kettle was raised to 0.4 MPa and the catalyst was added to start the polymerization. The instantaneous consumption of monomeric ethylene was on-line collected (by the high-precision ethylene mass flow meter connecting with a computer) during the reaction and recorded by the computer. After the reaction was conducted at 85° C. for 1 h, a mixed solution of hydrochloric acid/ethanol was added to terminate the reaction, and the polymer was vacuum dried, weighed and analyzed.

Example 21

100 mg of the catalyst in Example 4 was weighed for the polymerization respectively. The polymerization reaction kettle was firstly heated (100° C.) under vacuum, and then replaced with highly pure nitrogen, which was repeated for three times. Then a small amount of monomeric ethylene was used to replace once. Finally, the reaction kettle was filled with ethylene to a slight positive pressure (0.12 MPa). Into the reaction kettle were added in turn about 200 ml of a refined heptane treated by dehydration and deoxidation as solvent, a refined hexene treated by dehydration and deoxidation as comonomer and TIBA as co-catalyst respectively, wherein the co-catalyst had a concentration of 1.0 mmol/mL (n-hexane solution) and Al/Cr (molar ratio)=10. The amount of 1-hexene was respectively 6 mL, i.e. the volume ratio of 1-hexene and the solvent used for polymerization being 3 vol %. Finally the pressure of ethylene in the kettle was raised to 0.15 MPa and the catalyst was added to start the polymerization. The instantaneous consumption of monomeric ethylene was on-line collected (by the high-precision ethylene mass flow meter connecting with a computer) during the reaction and recorded by the computer. After the reaction was conducted at 85° C. for 1 h, a mixed solution of hydrochloric acid/ethanol was added to terminate the reaction, and the polymer was vacuum dried, weighed and analyzed.

Comparison Example 1

10 g of silica gel (having a pore volume of 1.5~1.7 cm$^3$/g and a surface area of 250~300 m$^2$/g) was impregnated in an aqueous solution of alkali type chromium acetate, enabled the Cr loading (based on the mass of Cr) to be 0.5%. After being continuously stirred for 4 h, heated to 120° C. and dried in air for 4 h, the silica gel support supporting the alkali type chromium acetate was high-temperature calcined in a fluidized bed and obtained Phillips catalyst.

Comparison Example 2

10 g of silica gel (having a pore volume of 1.5~1.7 cm$^3$/g and a surface area of 250~300 m$^2$/g) was impregnated in an aqueous solution of ammonium metavanadate, enabled the V loading (based on the mass of V) to be 0.24%. After being continuously stirred for 4 h, heated to 120° C. and dried in air for 4 h, the silica gel support supporting the alkali type chromium acetate was high-temperature calcined in a fluidized bed and obtained vanadium catalyst.

Comparison Example 3

10 g of silica gel (having a pore volume of 1.5~1.7 cm$^3$/g and a surface area of 250~300 m$^2$/g) was impregnated in an aqueous solution of alkali type chromium acetate, enabled the Cr loading (based on the mass of Cr) to be 0.5%. After being continuously stirred for 4 h, heated to 120° C. and dried in air for 4 h, the silica gel support supporting the alkali type chromium acetate was high-temperature calcined in a fluidized bed and obtained Phillips catalyst. And 10 g of silica gel (having a pore volume of 1.5~1.7 cm$^3$/g and a surface area of 250~300 m$^2$/g) was impregnated in an aqueous solution of ammonium metavanadate, enabled the V loading (based on the mass of V) to be 0.24%. After being continuously stirred for 4 h, heated to 120° C. and dried in air for 4 h, the silica gel support supporting the alkali type chromium acetate was high-temperature calcined in a fluidized bed and obtained vanadium catalyst. Then mix the Phillips catalyst and vanadium catalyst to obtain a mixture catalyst.

Comparison Example 4

160 mg of the catalyst in Comparison Example 1 was weighed for the polymerization respectively. The polymerization reaction kettle was firstly heated (100° C.) under vacuum, and then replaced with highly pure nitrogen, which was repeated for three times. Then a small amount of monomeric ethylene was used to replace once. Finally, the reaction kettle was filled with ethylene to a slight positive pressure (0.12 MPa). Into the reaction kettle were added in turn about 70 mL of a refined heptane treated by dehydration and deoxidation as solvent and TIBA as co-catalyst respectively, wherein the co-catalyst had a concentration of 1.0 mmol/mL (n-hexane solution) and Al/Cr (molar ratio)=5. Finally the pressure of ethylene in the kettle was raised to 0.15 MPa and the catalyst was added to start the polymerization. The instantaneous consumption of monomeric ethylene was on-line collected (by the high-precision ethylene mass flow meter connecting with a computer) during the reaction and recorded by the computer. After the reaction was conducted at 90° C. for 1 h, a mixed solution of hydrochloric acid/ethanol was added to terminate the reaction, and the polymer was vacuum dried, weighed and analyzed.

Comparison Example 5

160 mg of the catalyst in Comparison Example 2 was weighed for the polymerization respectively. The polymerization reaction kettle was firstly heated (100° C.) under vacuum, and then replaced with highly pure nitrogen, which was repeated for three times. Then a small amount of monomeric ethylene was used to replace once. Finally, the reaction kettle was filled with ethylene to a slight positive pressure (0.12 MPa). Into the reaction kettle were added in turn about 70 mL of a refined heptane treated by dehydration and deoxidation as solvent and TIBA as co-catalyst respectively, wherein the co-catalyst had a concentration of 1.0 mmol/mL (n-hexane solution) and Al/V (molar ratio)=5. Finally the pressure of ethylene in the kettle was raised to 0.15 MPa and the catalyst was added to start the polymerization. The instantaneous consumption of monomeric ethylene was on-line collected (by the high-precision ethylene mass flow meter connecting with a computer) during the reaction and recorded by the computer. After the reaction was conducted at 90° C. for 1 h, a mixed solution of hydrochloric acid/ethanol was added to terminate the reaction, and the polymer was vacuum dried, weighed and analyzed.

Comparison Example 6

160 mg of the catalyst in Comparison Example 1 was weighed for the polymerization respectively. The polymerization reaction kettle was firstly heated (100° C.) under vacuum, and then replaced with highly pure nitrogen, which was repeated for three times. Then a small amount of monomeric ethylene was used to replace once. Finally, the reaction kettle was filled with ethylene to a slight positive pressure (0.12 MPa). Into the reaction kettle were added in turn about 70 mL of a refined heptane treated by dehydration and deoxidation as solvent and TIBA as co-catalyst respectively, wherein the co-catalyst had a concentration of 1.0 mmol/mL (n-hexane solution) and Al/Cr (molar ratio)=5. Finally the pressure of ethylene in the kettle was raised to 0.15 MPa and the catalyst was added to start the polymerization. The instantaneous consumption of monomeric ethylene was on-line collected (by the high-precision ethylene mass flow meter connecting with a computer) during the reaction and recorded by the computer. After the reaction was conducted at 90° C. for 1 h, a mixed solution of hydrochloric acid/ethanol was added to terminate the reaction, and the polymer was vacuum dried, weighed and analyzed.

Comparison Example 7

160 mg of the catalyst in Comparison Example 1 was weighed for the polymerization respectively. The polymerization reaction kettle was firstly heated (100° C.) under vacuum, and then replaced with highly pure nitrogen, which was repeated for three times. Then a small amount of monomeric ethylene was used to replace once. Finally, the reaction kettle was filled with ethylene to a slight positive pressure (0.12 MPa). Into the reaction kettle were added in turn about 70 ml of a refined heptane treated by dehydration and deoxidation as solvent, a refined hexene treated by dehydration and deoxidation as comonomer and TIBA as co-catalyst respectively, wherein the co-catalyst had a concentration of 1.0 mmol/mL (n-hexane solution) and Al/Cr (molar ratio)=10. The amount of 1-hexene was respectively 0.7 mL, 2.1 mL, and 3.5 mL, i.e. the volume ratio of 1-hexene and the solvent used for polymerization being 1 vol % (Comparison Example 7-1), 3 vol % (Comparison Example 7-2) and 5 vol % (Comparison Example 7-3). Finally the pressure of ethylene in the kettle was raised to 0.15 MPa and the catalyst was added to start the polymerization. The instantaneous consumption of monomeric ethylene was on-line collected (by the high-precision ethylene mass flow meter connecting with a computer) during the reaction and recorded by the computer. After the reaction was conducted at 85° C. for 1 h, a mixed solution of hydrochloric acid/ethanol was added to terminate the reaction, and the polymer was vacuum dried, weighed and analyzed.

Comparison Example 8

160 mg of the catalyst in Comparison Example 1 was weighed for the polymerization respectively. The polymerization reaction kettle was firstly heated (100° C.) under vacuum, and then replaced with highly pure nitrogen, which was repeated for three times. Then a small amount of monomeric ethylene was used to replace once. Finally, the reaction kettle was filled with ethylene to a slight positive pressure (0.12 MPa). Into the reaction kettle were added in turn about 70 ml of a refined heptane treated by dehydration and deoxidation as solvent, 10 mL hydrogen and TIBA as co-catalyst respectively, wherein the co-catalyst had a concentration of 1.0 mmol/mL (n-hexane solution) and Al/Cr (molar ratio)=10. Finally the pressure of ethylene in the kettle was raised to 0.15 MPa and the catalyst was added to start the polymerization. The instantaneous consumption of monomeric ethylene was on-line collected (by the high-precision ethylene mass flow meter connecting with a computer) during the reaction and recorded by the computer. After the reaction was conducted at 85° C. for 1 h, a mixed solution of hydrochloric acid/ethanol was added to terminate the reaction, and the polymer was vacuum dried, weighed and analyzed.

Comparison Example 9

160 mg of the catalyst in Comparison Example 2 was weighed for the polymerization respectively. The polymerization reaction kettle was firstly heated (100° C.) under vacuum, and then replaced with highly pure nitrogen, which was repeated for three times. Then a small amount of monomeric ethylene was used to replace once. Finally, the reaction kettle was filled with ethylene to a slight positive pressure (0.12 MPa). Into the reaction kettle were added in turn about 70 ml of a refined heptane treated by dehydration and deoxidation as solvent, 10 mL hydrogen and TIBA as co-catalyst respectively, wherein the co-catalyst had a concentration of 1.0 mmol/mL (n-hexane solution) and Al/Cr (molar ratio)=10. Finally the pressure of ethylene in the kettle was raised to 0.15 MPa and the catalyst was added to start the polymerization. The instantaneous consumption of monomeric ethylene was on-line collected (by the high-precision ethylene mass flow meter connecting with a computer) during the reaction and recorded by the computer. After the reaction was conducted at 85° C. for 1 h, a mixed solution of hydrochloric acid/ethanol was added to terminate the reaction, and the polymer was vacuum dried, weighed and analyzed.

Comparison Example 10

100 mg of the catalyst in Comparison Example 1 was weighed for the polymerization respectively. The polymerization reaction kettle was firstly heated (100° C.) under vacuum, and then replaced with highly pure nitrogen, which was repeated for three times. Then a small amount of monomeric ethylene was used to replace once. Finally, the reaction kettle was filled with ethylene to a slight positive pressure (0.12 MPa). Into the reaction kettle were added in turn about 200 ml of a refined heptane treated by dehydration and deoxidation as solvent and TIBA as co-catalyst respectively, wherein the co-catalyst had a concentration of 1.0 mmol/mL (n-hexane solution) and Al/Cr (molar ratio)=10. Finally the pressure of ethylene in the kettle was raised to 0.4 MPa and the catalyst was added to start the polymerization. The instantaneous consumption of monomeric ethylene was on-line collected (by the high-precision ethylene mass flow meter connecting with a computer) during the reaction and recorded by the computer. After the reaction was conducted at 85° C. for 1 h, a mixed solution of hydrochloric acid/ethanol was added to terminate the reaction, and the polymer was vacuum dried, weighed and analyzed.

Comparison Example 11

100 mg of the catalyst in Comparison Example 2 was weighed for the polymerization respectively. The polymerization reaction kettle was firstly heated (100° C.) under vacuum, and then replaced with highly pure nitrogen, which was repeated for three times. Then a small amount of monomeric ethylene was used to replace once. Finally, the reaction kettle was filled with ethylene to a slight positive pressure (0.12 MPa). Into the reaction kettle were added in turn about 200 ml of a refined heptane treated by dehydration and deoxidation as solvent and TIBA as co-catalyst respectively, wherein the co-catalyst had a concentration of 1.0 mmol/mL (n-hexane solution) and Al/Cr (molar ratio)=10. Finally the pressure of ethylene in the kettle was raised to 0.4 MPa and the catalyst was added to start the polymerization. The instantaneous consumption of monomeric ethylene was on-line collected (by the high-precision ethylene mass flow meter connecting with a computer) during the reaction and recorded by the computer. After the reaction was conducted at 85° C. for 1 h, a mixed solution of hydrochloric acid/ethanol was added to terminate the reaction, and the polymer was vacuum dried, weighed and analyzed.

Comparison Example 12

100 mg of the catalyst in Comparison Example 1 was weighed for the polymerization respectively. The polymerization reaction kettle was firstly heated (100° C.) under vacuum, and then replaced with highly pure nitrogen, which was repeated for three times. Then a small amount of monomeric ethylene was used to replace once. Finally, the reaction kettle was filled with ethylene to a slight positive pressure (0.12 MPa). Into the reaction kettle were added in turn about 200 ml of a refined heptane treated by dehydration and deoxidation as solvent, a refined hexene treated by dehydration and deoxidation as comonomer and TIBA as co-catalyst respectively, wherein the co-catalyst had a concentration of 1.0 mmol/mL (n-hexane solution) and Al/Cr (molar ratio)=10. The amount of 1-hexene was respectively 6 mL, i.e. the volume ratio of 1-hexene and the solvent used for polymerization being 3 vol %. Finally the pressure of ethylene in the kettle was raised to 0.15 MPa and the catalyst was added to start the polymerization. The instantaneous consumption of monomeric ethylene was on-line collected (by the high-precision ethylene mass flow meter connecting with a computer) during the reaction and recorded by the computer. After the reaction was conducted at 85° C. for 1 h, a mixed solution of hydrochloric acid/ethanol was added to terminate the reaction, and the polymer was vacuum dried, weighed and analyzed.

Comparison Example 13

100 mg of the catalyst in Comparison Example 2 was weighed for the polymerization respectively. The polymerization reaction kettle was firstly heated (100° C.) under vacuum, and then replaced with highly pure nitrogen, which was repeated for three times. Then a small amount of monomeric ethylene was used to replace once. Finally, the reaction kettle was filled with ethylene to a slight positive pressure (0.12 MPa). Into the reaction kettle were added in turn about 200 ml of a refined heptane treated by dehydration and deoxidation as solvent, a refined hexene treated by dehydration and deoxidation as comonomer and TIBA as co-catalyst respectively, wherein the co-catalyst had a concentration of 1.0 mmol/mL (n-hexane solution) and Al/Cr (molar ratio)=10. The amount of 1-hexene was respectively 6 mL, i.e. the volume ratio of 1-hexene and the solvent used for polymerization being 3 vol %. Finally the pressure of ethylene in the kettle was raised to 0.15 MPa and the catalyst was added to start the polymerization. The instantaneous consumption of monomeric ethylene was on-line collected (by the high-precision ethylene mass flow meter connecting with a computer) during the reaction and recorded by the computer. After the reaction was conducted at 85° C. for 1 h, a mixed solution of hydrochloric acid/ethanol was added to terminate the reaction, and the polymer was vacuum dried, weighed and analyzed.

TABLE 1

Polymerization activities of examples

| Example | Activity ($kg_{PE}$/mol Cr or V h) |
|---|---|
| Example 8 | 139.4 |
| Example 9 | 88.4 |
| Example 10 | 75.9 |
| Example 11 | 73.8 |
| Example 12 | 80.1 |
| Example 13 | 70.7 |
| Example 14 | 96.7 |
| Example 15-1 | 145.6 |
| Example 15-2 | 111.3 |
| Example 15-3 | 87.4 |
| Example 15-4 | 82.2 |
| Example 16-1 | 535.6 |
| Example 16-2 | 325.5 |
| Example 17 | 103.0 |
| Example 18-1 | 127.9 |
| Example 18-2 | 124.8 |
| Example 18-3 | 122.7 |
| Example 19 | 157.0 |
| Example 20 | 1690.0 |
| Example 21 | 907.9 |
| Comparison Example 4 | 101.9 |
| Comparison Example 5 | 36.1 |
| Comparison Example 6 | 80.1 |
| Comparison Example 7-1 | 111.3 |
| Comparison Example 7-2 | 104.0 |
| Comparison Example 7-3 | 72.8 |
| Comparison Example 8 | 110.2 |
| Comparison Example 9 | 79.0 |
| Comparison Example 10 | 670.8 |
| Comparison Example 11 | 274.1 |
| Comparison Example 12 | 536.6 |
| Comparison Example 13 | 225.3 |

(1) Comparison of Different Amount of Cocatalyst

TABLE 2

Comparison of different amount of cocatalyst in ethylene homopolymerization

| Example | co-catalyst | Al/Cr | activity (kg PE/mol Cr h) | $T_m$ (° C.) | $M_w$ (×10$^5$) | PDI |
|---|---|---|---|---|---|---|
| Example 14 | — | 0 | 96.7 | 132.07 | 3.09 | 28.6 |
| Example 15-1 | TIBA | 5 | 145.6 | 132.16 | 2.76 | 30.1 |
| Example 15-2 | TIBA | 10 | 111.3 | 132.96 | 3.15 | 29.8 |
| Example 15-3 | TIBA | 15 | 87.4 | 133.51 | 3.49 | 29.3 |
| Example 15-4 | TIBA | 20 | 82.2 | 133.60 | 3.52 | 29.5 |

Polymerization conditions:
ethylene pressure = 0.15 MPa;
polymerization time = 1 hr;
polymerization temperature = 90° C.;
n-heptane = 70 mL;
Cr = 0.5% (wt), V = 0.24% (wt);
co-catalyst = TIBA.

Represented by Example 14 and 15, examines the Cr—V catalyst in different amount of cocatalyst by ethylene homopolymerization, result in table 2.

From table 2 shows that under the condition of TIBA as cocatalyst, as cocatalyst Al/Cr than from 5 to 20 increasing, Cr—V catalyst toward a reduction in the activity of catalyst in ethylene homopolymerization process, instructions to achieve highly active polymerization, the dosage of the catalyst promoter is an appropriate value or range, catalyst in the Al/Cr is 5, the highest activity.

TABLE 3

Comparison of Cr—V catalyst and Phillips catalyst

| Example | co-catalyst | Al/Cr | activity (kg PE/mol Cr h) | $T_m$ (° C.) | $M_w$ (×10$^5$) | PDI |
|---|---|---|---|---|---|---|
| Comparison Example 4 | TIBA | 5 | 101.9 | 132.11 | 2.52 | 28.2 |
| Comparison Example 9 | TEA | 5 | 79.0 | 131.07 | 1.73 | 19.9 |
| Example 15-1 | TIBA | 5 | 145.6 | 132.16 | 2.76 | 30.1 |
| Example 17 | TEA | 5 | 103.0 | 131.44 | 1.94 | 33.8 |

Polymerization conditions:
ethylene pressure = 0.15 MPa;
polymerization time = 1 hr;
polymerization temperature = 90° C.;
n-heptane = 70 mL;
Cr = 0.5% (wt);
co-catalyst = TIBA.

Table 3 according to different cocatalyst double active center of chrome vanadium catalyst and the effect of ethylene homopolymerization Phillips catalyst activity. By TEA as cocatalyst activity below made cocatalyst TiBA. Further through the analysis of the above product polyethylene, under different cocatalyst is the melting point of polyethylene products have similar, but its very different molecular weight and molecular weight distribution, showed the cocatalyst to the center of the catalyst activity after reduction degree and reduction of distribution has great influence.

(2) Comparison of Temperature

TABLE 4

Comparison of temperature

| Example | temp. | Al/Cr | activity (kg PE/ mol Cr h) | $T_m$ (° C.) | $M_w$ (× $10^5$) | PDI |
|---|---|---|---|---|---|---|
| Example 16-1 | 50 | 5 | 535.6 | 132.35 | 3.65 | 29.4 |
| Example 16-2 | 70 | 5 | 325.5 | 132.28 | 3.39 | 13.8 |
| Example 15-1 | 90 | 5 | 145.6 | 132.16 | 2.76 | 30.1 |

Polymerization conditions:
ethylene pressure = 0.15 MPa;
polymerization time = 1 hr;
n-heptane = 70 mL;
Cr = 0.5% (wt), V = 0.24% (wt);
co-catalyst = TIBA.

Table 4 for the different polymerization temperature (Example 15-1 and Example 16) of chrome vanadium double active center of ethylene polymerization catalyst. At 50° C. with the highest catalyst activity, with the increase of temperature of catalyst activity decreases, the lowest activity at 90° C. Under different temperature of the melting point of polyethylene products have similar, its molecular weight with the increase of polymerization temperature, the trend of decrease, chain transfer reaction shows polymerization temperature on polymerization more advantageous.

(3) Comparison of Different Preparation of Catalyst

TABLE 5

Comparison of different preparation of catalyst

| Example | co-catalyst | Al/Cr | activity (kg PE/ mol Cr h) | $T_m$ (° C.) | $M_w$ (×$10^5$) |
|---|---|---|---|---|---|
| Example 8 | | 5 | 139.4 | 131.85 | 2.16 | 25.8 |
| Example 9 | | 5 | 88.4 | 131.04 | 1.97 | 25.4 |

Polymerization conditions: ethylene pressure = 0.15 MPa; polymerization time = 1 hr; n-heptane = 70 mL; Cr = 0.5% (wt), V = 0.24% (wt); co-catalyst = TIBA.

Example 8 and 9 are two step impregnation and total immersion respectively in different load method preparation of chrome vanadium catalyst in the same conditions of polymerization activity, visible by dipping the preparation of composite catalyst activity is higher.

(4) Comparison of Different Dosage of 1-Hexene

TABLE 6

Comparison of different dosage of 1-hexene

| Example | 1-hexene | Al/Cr | activity (kg PE/ mol Cr h) | $T_m$ (° C.) | $M_w$ (×$10^5$) | PDI |
|---|---|---|---|---|---|---|
| Comparison Example 4 | 0 | 5 | 101.9 | 132.11 | 2.52 | 28.2 |
| Comparison Example 7-1 | 0.7 | 5 | 111.3 | 131.73 | 2.11 | 20.1 |
| Comparison Example 7-2 | 2.1 | 5 | 104.0 | 131.30 | 2.13 | 25.9 |
| Comparison Example 7-3 | 3.5 | 5 | 72.8 | 131.34 | 2.08 | 23.8 |
| Example 15-1 | 0 | 5 | 145.6 | 132.16 | 2.76 | 30.1 |
| Example 18-1 | 0.7 | 5 | 127.9 | 131.54 | 3.74 | 38.6 |
| Example 18-2 | 2.1 | 5 | 124.8 | 131.41 | 3.45 | 50.4 |
| Example 18-3 | 3.5 | 5 | 122.7 | 131.06 | 3.24 | 50.1 |

Polymerization conditions:
ethylene pressure = 0.15 MPa;
polymerization time = 1 hr;
n-heptane = 70 mL;
Cr = 0.5% (wt), V = 0.24% (wt);
co-catalyst = TIBA.

Example 8 and 9 are two step impregnation and total immersion respectively in different load method preparation of chrome vanadium catalyst in the same conditions of polymerization activity, visible by dipping the preparation of composite catalyst activity is higher.

Cr—V catalyst is presented in table 6 catalysts and Phillips catalysts 1-hexene polymerization of vinyl results. Chrome vanadium double active center 1-hexene ethylene copolymerization activity presents the lower trend, combined with the result of ethylene homopolymerization before, showed that ethylene 1-hexene copolymerization activity are lower than the activity of ethylene homopolymerization. Phillips catalysts of ethylene 1-hexene copolymerization activity presents a slightly increased after the first reduce trend. Add 1-hexene, other chrome vanadium dual active center catalyst polymerization activity also declined.

Figure 3:
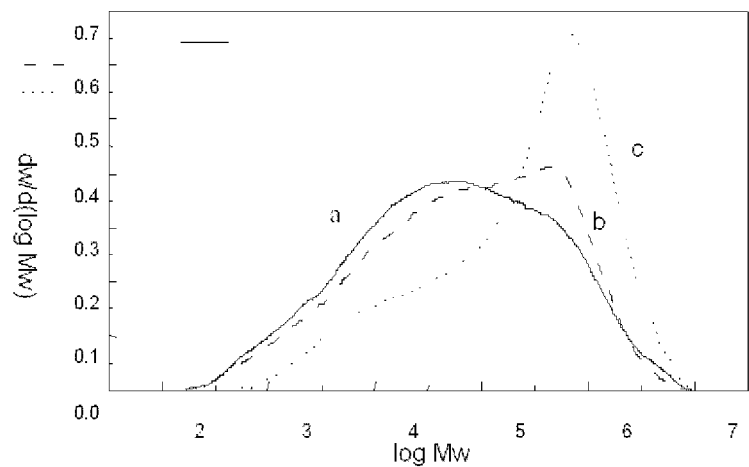
FIG. 3 represents the GPC curves of 3 polymers obtained from ethylene homopolymerization (Example 10, 11 and 20).
Figure 4:
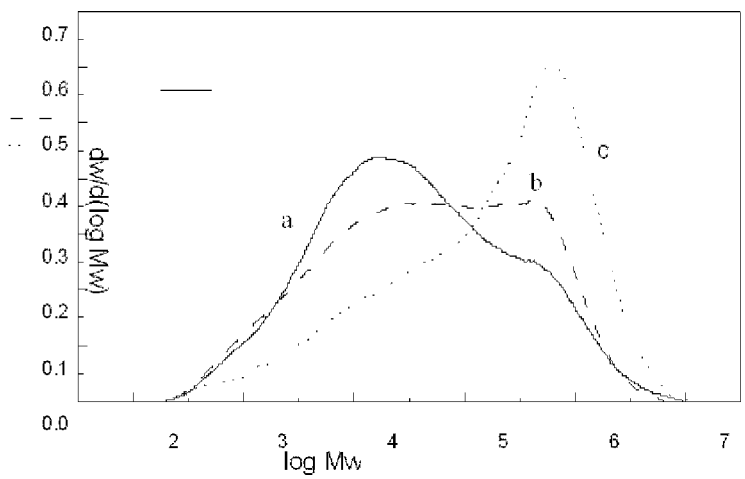
FIG. 4 represents the GPC curves of 3 polymers obtained from ethylene/1-hexene copolymerization (Example 12, 13 and 21).

FIGS. 3 and 4, respectively, double active center for chrome vanadium catalyst, Phillips catalysts as well as the load vanadium oxide catalysts of ethylene homopolymer and ethylene with 1-hexene GPC chromatogram of the copolymer product comparison.

(5) Comparison of Hydrogen

TABLE 7

Comparison of hydrogen

| Example | $H_2$ | Al/Cr | activity (kg PE/ mol Cr h) | $T_m$ (° C.) | $M_w$ (×$10^5$) | PDI |
|---|---|---|---|---|---|---|
| Comparison Example 4 | 0 | 5 | 101.9 | 132.11 | 2.52 | 28.2 |
| Comparison Example 8 | 10 | 5 | 110.2 | 131.79 | 2.19 | 28.4 |
| Example 15-1 | 0 | 5 | 145.6 | 132.16 | 2.76 | 30.1 |
| Example 19 | 10 | 5 | 157.0 | 131.66 | 2.41 | 29.6 |

Polymerization conditions:
ethylene pressure = 0.15 MPa;
polymerization time = 1 hr;
n-heptane = 70 mL;
Cr = 0.5% (wt), V = 0.24% (wt);
co-catalyst = TIBA.

Table 7 shows, ethylene homopolymerization of different catalyst activity is lower than without the presence of hydrogen and the molecular weight of polyethylene and melting point is lower, that the hydrogen have the effect of chain transfer agent led to a decline in its molecular weight and melting point.

Example 22

Figure 5:
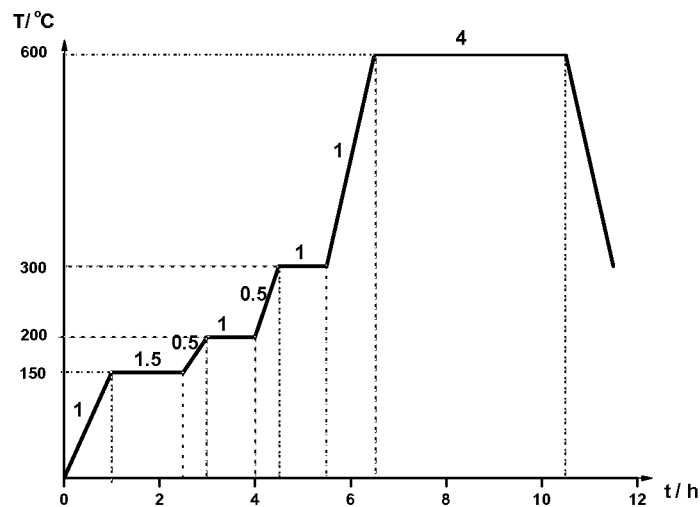
FIG. 5 represents the process of treating the silica gel support or the catalyst precursor.
Figure 6:
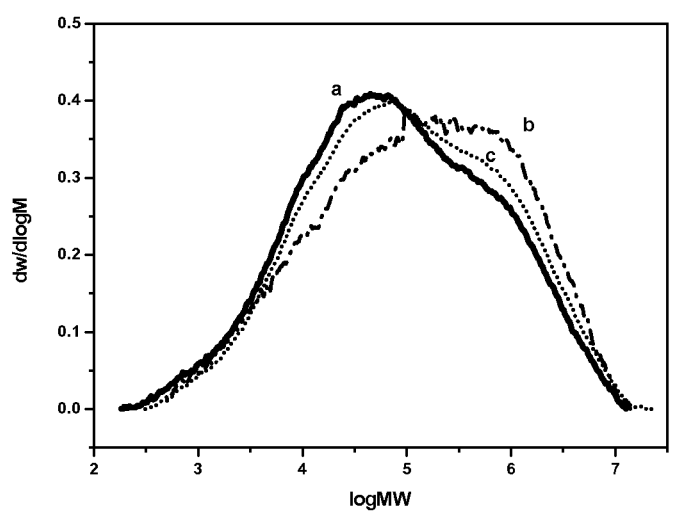
FIG. 6 represents the GPC curves of 3 polymers obtained from ethylene homopolymerization (Comparison Example 16-1, Example 37 and 38-1).
Figure 7:
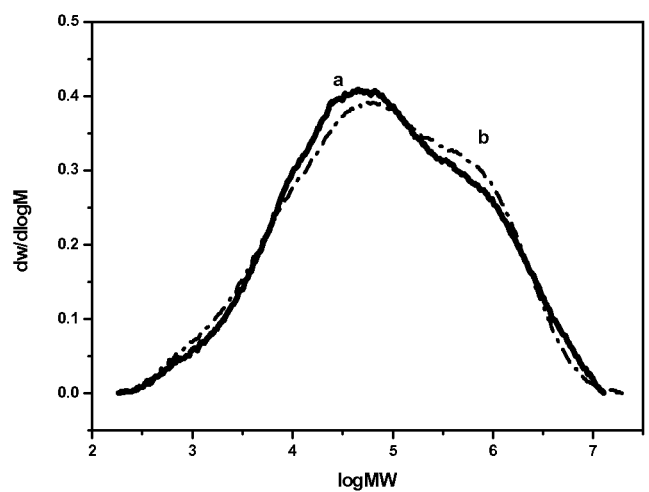
FIG. 7 represents the GPC curves of 3 polymers obtained from ethylene homopolymerization (Comparison Example 16-1, Example 39).

10 g of silica gel (having a pore volume of 1.5~1.7 cm$^3$/g and a surface area of 250~300 m$^2$/g) was impregnated in a n-hexane solution of tetra-n-butyl titanate at 40° C., enabled the Ti loading (based on the mass of Ti) to be 1%. After being continuously stirred for 4 h, heated to 80° C. and dried in vacuum 2 h and in air for 8 h, the silica gel support supporting the Ti was high-temperature calcined in a fluidized bed. Then, the silica gel was naturally cooled down under the protection of nitrogen gas to obtain a Ti modified catalyst precursor. The high temperature calcining and then cooling processes above are shown in FIG. 5. Then it was impregnated in an aqueous solution of ammonium metavanadate at 40° C., enabled the vanadium loading (based on the mass of V) to be 0.24%. After being continuously stirred for 4 h, heated to 120° C. and dried in air for 4 h, it was high-temperature calcined in a fluidized bed. Finally, it was naturally cooled down under the protection of nitrogen gas. After that it was impregnated in an aqueous solution of alkali type chromium acetate, enabled the chromium loading (based on the mass of Cr) to be 0.5%. After being continuously stirred for 4 h, heated to 120° C. and dried in air for 4 h, it was high-temperature calcined in a fluidized bed. Finally, it was naturally cooled down under the protection of nitrogen gas.

Example 23

10 g of silica gel (having a pore volume of 1.5~1.7 cm$^3$/g and a surface area of 250~300 m$^2$/g) was impregnated in a n-hexane solution of tetra-n-butyl titanate at 40° C., enabled the Ti loading (based on the mass of Ti) to be 3%. After being continuously stirred for 4 h, heated to 80° C. and dried in air for 8 h, the silica gel support supporting the Ti was high-temperature calcined in a fluidized bed. Then, the silica gel was naturally cooled down under the protection of nitrogen gas to obtain a Ti modified catalyst precursor. The high temperature calcining and then cooling processes above are shown in FIG. 5. Then it was impregnated in an aqueous solution of ammonium metavanadate at 40° C., enabled the vanadium loading (based on the mass of V) to be 0.24%. After being continuously stirred for 4 h, heated to 120° C. and dried in air for 4 h, it was high-temperature calcined in a fluidized bed. Finally, it was naturally cooled down under the protection of nitrogen gas. After that it was impregnated in an aqueous solution of alkali type chromium acetate, enabled the chromium loading (based on the mass of Cr) to be 0.5%. After being continuously stirred for 4 h, heated to 120° C. and dried in air for 4 h, it was high-temperature calcined in a fluidized bed. Finally, it was naturally cooled down under the protection of nitrogen gas.

Example 24

10 g of silica gel (having a pore volume of 1.5~1.7 cm$^3$/g and a surface area of 250~300 m$^2$/g) was impregnated in a n-hexane solution of tetra-n-butyl titanate at 40° C., enabled the Ti loading (based on the mass of Ti) to be 5%. After being continuously stirred for 4 h, heated to 80° C. and dried in air for 8 h, the silica gel support supporting the Ti was high-temperature calcined in a fluidized bed. Then, the silica gel was naturally cooled down under the protection of nitrogen gas to obtain a Ti modified catalyst precursor. The high temperature calcining and then cooling processes above are shown in FIG. 5. Then it was impregnated in an aqueous solution of ammonium metavanadate at 40° C., enabled the vanadium loading (based on the mass of V) to be 0.24%. After being continuously stirred for 4 h, heated to 120° C. and dried in air for 4 h, it was high-temperature calcined in a fluidized bed. Finally, it was naturally cooled down under the protection of nitrogen gas. After that it was impregnated in an aqueous solution of alkali type chromium acetate, enabled the chromium loading (based on the mass of Cr) to be 0.5%. After being continuously stirred for 4 h, heated to 120° C. and dried in air for 4 h, it was high-temperature calcined in a fluidized bed. Finally, it was naturally cooled down under the protection of nitrogen gas.

Example 25

10 g of silica gel (having a pore volume of 1.5~1.7 cm$^3$/g and a surface area of 250~300 m$^2$/g) was impregnated in a n-hexane solution of tetra-n-butyl titanate at 40° C., enabled the Ti loading (based on the mass of Ti) to be 3%. After being continuously stirred for 4 h, heated to 80° C. and dried in air for 8 h, the silica gel support supporting the Ti was high-temperature calcined in a fluidized bed. Then, the silica gel was naturally cooled down under the protection of nitrogen gas to obtain a Ti modified catalyst precursor. The high temperature calcining and then cooling processes above are shown in FIG. 5. Then it was impregnated in an aqueous solution of ammonium metavanadate at 40° C., enabled the vanadium loading (based on the mass of V) to be 0.48%. After being continuously stirred for 4 h, heated to 120° C. and dried in air for 4 h, it was high-temperature calcined in a fluidized bed. Finally, it was naturally cooled down under the protection of nitrogen gas. After that it was impregnated in an aqueous solution of alkali type chromium acetate, enabled the chromium loading (based on the mass of Cr) to be 0.5%. After being continuously stirred for 4 h, heated to 120° C. and dried in air for 4 h, it was high-temperature calcined in a fluidized bed. Finally, it was naturally cooled down under the protection of nitrogen gas.

Example 26

10 g of silica gel (having a pore volume of 1.5~1.7 cm$^3$/g and a surface area of 250~300 m$^2$/g) was impregnated in a n-hexane solution of tetra-n-butyl titanate at 40° C., enabled the Ti loading (based on the mass of Ti) to be 5%. After being continuously stirred for 4 h, heated to 80° C. and dried in air for 8 h, the silica gel support supporting the Ti was high-temperature calcined in a fluidized bed. Then, the silica gel was naturally cooled down under the protection of nitrogen gas to obtain a Ti modified catalyst precursor. The high temperature calcining and then cooling processes above are shown in FIG. 5. Then it was impregnated in an aqueous solution of ammonium metavanadate and alkali type chromium acetate at 40° C., enabled the V and Cr loading (based on the mass of V and Cr) to be 0.24% and 0.5%. After being continuously stirred for 4 h, heated to 120° C. and dried in air for 4 h, it was high-temperature calcined in a fluidized bed. Finally, it was naturally cooled down under the protection of nitrogen gas.

Example 27

10 g of silica gel (having a pore volume of 1.5~1.7 cm$^3$/g and a surface area of 250~300 m$^2$/g) was impregnated in a n-hexane solution of tetra-n-butyl titanate at 40° C., enabled the Ti loading (based on the mass of Ti) to be 3%. After being continuously stirred for 4 h, heated to 80° C. and dried in air for 8 h, the silica gel support supporting the Ti was high-temperature calcined in a fluidized bed. Then, the silica gel was naturally cooled down under the protection of nitrogen gas to obtain a Ti modified catalyst precursor. The high temperature calcining and then cooling processes above are shown in FIG. 5. Then it was impregnated in an aqueous solution of ammonium metavanadate at 40° C., enabled the vanadium loading (based on the mass of V) to be 0.96%. After being continuously stirred for 4 h, heated to 120° C. and dried in air for 4 h, it was high-temperature calcined in a fluidized bed. Finally, it was naturally cooled down under the protection of nitrogen gas. After that it was impregnated in an aqueous solution of alkali type chromium acetate, enabled the chromium loading (based on the mass of Cr) to be 0.5%. After being continuously stirred for 4 h, heated to 120° C. and dried in air for 4 h, it was high-temperature calcined in a fluidized bed. Finally, it was naturally cooled down under the protection of nitrogen gas.

Example 28

10 g of silica gel (having a pore volume of 1.5~1.7 cm$^3$/g and a surface area of 250~300 m$^2$/g) was impregnated in a n-hexane solution of tetra-n-butyl titanate at 40° C., enabled the Ti loading (based on the mass of Ti) to be 3%. After being continuously stirred for 4 h, heated to 80° C. and dried in air for 8 h, the silica gel support supporting the Ti was high-temperature calcined in a fluidized bed. Then, the silica gel was naturally cooled down under the protection of nitrogen gas to obtain a Ti modified catalyst precursor. The high temperature calcining and then cooling processes above are shown in FIG. 5. Then it was impregnated in an aqueous solution of vanadyl oxalate at 40° C., enabled the vanadium loading (based on the mass of V) to be 0.24%. After being continuously stirred for 4 h, heated to 120° C. and dried in air for 4 h, it was high-temperature calcined in a fluidized bed. Finally, it was naturally cooled down under the protection of nitrogen gas. After that it was impregnated in an aqueous solution of $CrO_3$, enabled the chromium loading (based on the mass of Cr) to be 0.5%. After being continuously stirred for 4 h, heated to 120° C. and dried in air for 4 h, it was high-temperature calcined in a fluidized bed. Finally, it was naturally cooled down under the protection of nitrogen gas.

Example 29

10 g of silica gel (having a pore volume of 1.5~1.7 cm$^3$/g and a surface area of 250~300 m$^2$/g) was impregnated in a n-hexane solution of tetra-n-butyl titanate at 40° C., enabled the Ti loading (based on the mass of Ti) to be 3%. After being continuously stirred for 4 h, heated to 80° C. and dried in air for 8 h, the silica gel support supporting the Ti was high-temperature calcined in a fluidized bed. Then, the silica gel was naturally cooled down under the protection of nitrogen gas to obtain a Ti modified catalyst precursor. The high temperature calcining and then cooling processes above are shown in FIG. 5. Then it was impregnated in an aqueous solution of ammonium metavanadate at 40° C., enabled the vanadium loading (based on the mass of V) to be 0.16%. After being continuously stirred for 4 h, heated to 120° C. and dried in air for 4 h, it was high-temperature calcined in a fluidized bed. Finally, it was naturally cooled down under the protection of nitrogen gas. After that it was impregnated in an aqueous solution of alkali type chromium acetate, enabled the chromium loading (based on the mass of Cr) to be 0.5%. After being continuously stirred for 4 h, heated to 120° C. and dried in air for 4 h, it was high-temperature calcined in a fluidized bed. Finally, it was naturally cooled down under the protection of nitrogen gas.

Example 30

10 g of sodium silicate was impregnated in a n-hexane solution of tetra-n-butyl titanate at 40° C., enabled the Ti loading (based on the mass of Ti) to be 5%. After being continuously stirred for 4 h, heated to 120° C. and dried in air for 8 h, the silica gel support supporting the Ti was high-temperature calcined in a fluidized bed. Then, the silica gel was naturally cooled down under the protection of nitrogen gas to obtain a Ti modified catalyst precursor. The high temperature calcining and then cooling processes above are shown in FIG. 5. Then it was impregnated in an aqueous solution of ammonium metavanadate at 40° C., enabled the vanadium loading (based on the mass of V) to be 0.24%. After being continuously stirred for 4 h, heated to 120° C. and dried in air for 4 h, it was high-temperature calcined in a fluidized bed. Finally, it was naturally cooled down under the protection of nitrogen gas. After that it was impregnated in an aqueous solution of alkali type chromium acetate, enabled the chromium loading (based on the mass of Cr) to be 0.5%. After being continuously stirred for 4 h, heated to 120° C. and dried in air for 4 h, it was high-temperature calcined in a fluidized bed. Finally, it was naturally cooled down under the protection of nitrogen gas.

Example 31

10 g of silica gel (having a pore volume of 1.5~1.7 cm$^3$/g and a surface area of 250~300 m$^2$/g) was impregnated in a n-hexane solution of Titanium isopropoxide at 40° C. with pH=2~3, enabled the Ti loading (based on the mass of Ti) to be 3%. After being continuously stirred for 4 h, heated to 80° C. and dried in air for 8 h, the silica gel support supporting the Ti was high-temperature calcined in a fluidized bed. Then, the silica gel was naturally cooled down under the protection of nitrogen gas to obtain a Ti modified catalyst precursor. The high temperature calcining and then cooling processes above are shown in FIG. 5. Then it was impregnated in an aqueous solution of ammonium metavanadate at 40° C., enabled the vanadium loading (based on the mass of V) to be 0.24%. After being continuously stirred for 4 h, heated to 120° C. and dried in air for 4 h, it was high-temperature calcined in a fluidized bed. Finally, it was naturally cooled down under the protection of nitrogen gas. After that it was impregnated in an aqueous solution of alkali type chromium acetate, enabled the chromium loading (based on the mass of Cr) to be 0.5%. After being continuously stirred for 4 h, heated to 120° C. and dried in air for 4 h, it was high-temperature calcined in a fluidized bed. Finally, it was naturally cooled down under the protection of nitrogen gas.

Example 32

10 g of silica gel (having a pore volume of 1.5~1.7 cm$^3$/g and a surface area of 250~300 m$^2$/g) was impregnated in a n-hexane solution of tetra-n-butyl titanate at 40° C., enabled the Ti loading (based on the mass of Ti) to be 5%. After being continuously stirred for 4 h, heated to 80° C. and dried in air for 8 h, the silica gel support supporting the Ti was high-temperature calcined in a fluidized bed. Then, the silica gel was naturally cooled down under the protection of nitrogen gas to obtain a Ti modified catalyst precursor. The high temperature calcining and then cooling processes above are shown in FIG. 5. After that it was impregnated in an aqueous solution of alkali type chromium acetate, enabled the chromium loading (based on the mass of Cr) to be 0.5%. After being continuously stirred for 4 h, heated to 120° C. and dried in air for 4 h, it was high-temperature calcined in a fluidized bed. Finally, it was naturally cooled down under the protection of nitrogen gas. Then it was impregnated in an aqueous solution of ammonium metavanadate at 40° C., enabled the vanadium loading (based on the mass of V) to be 0.24%. After being continuously stirred for 4 h, heated to 120° C. and dried in air for 4 h, it was high-temperature calcined in a fluidized bed. Finally, it was naturally cooled down under the protection of nitrogen gas.

Example 33

10 g of silica gel (having a pore volume of 1.5~1.7 $cm^3/g$ and a surface area of 250~300 $m^2/g$) was impregnated in a aqueous solution of titanium sulfate and vanadyl oxalate, enabled the Ti and V loading (based on the mass of Ti and V) to be 5% and 0.24%. After being continuously stirred for 4 h, heated to 80° C. and dried in air for 8 h, the silica gel support supporting the Ti was high-temperature calcined in a fluidized bed. Then, the silica gel was naturally cooled down under the protection of nitrogen gas to obtain a Ti and V modified catalyst precursor. The high temperature calcining and then cooling processes above are shown in FIG. 5. Then it was impregnated in an aqueous solution of alkali type chromium acetate at 40° C., enabled the Cr loading (based on the mass of Cr) to be 0.5%. After being continuously stirred for 4 h, heated to 120° C. and dried in air for 4 h, it was high-temperature calcined in a fluidized bed. Finally, it was naturally cooled down under the protection of nitrogen gas.

Example 34

10 g of silica gel (having a pore volume of 1.5~1.7 $cm^3/g$ and a surface area of 250~300 $m^2/g$) was impregnated in a aqueous solution of titanium sulfate and $CrO_3$, enabled the Ti and Cr loading (based on the mass of Ti and Cr) to be 5% and 0.5%. After being continuously stirred for 4 h, heated to 80° C. and dried in air for 8 h, the silica gel support supporting the Ti and Cr was high-temperature calcined in a fluidized bed. Then, the silica gel was naturally cooled down under the protection of nitrogen gas to obtain a Ti and Cr modified catalyst precursor. The high temperature calcining and then cooling processes above are shown in FIG. 5. Then it was impregnated in an aqueous solution of fluoride ammonium vanadate acetate at 40° C., enabled the V loading (based on the mass of V) to be 0.24%. After being continuously stirred for 4 h, heated to 120° C. and dried in air for 4 h, it was high-temperature calcined in a fluidized bed. Finally, it was naturally cooled down under the protection of nitrogen gas.

Example 35

10 g of silica gel (having a pore volume of 1.5~1.7 $cm^3/g$ and a surface area of 250~300 $m^2/g$) was impregnated in an aqueous solution of titanium sulfate and vanadyl oxalate, enabled the Ti, V and Cr loading (based on the mass of Ti, V and Cr) to be 5%, 0.24% and 0.5%. After being continuously stirred for 4 h, heated to 80° C. and dried in air for 8 h, it was high-temperature calcined in a fluidized bed. Finally, it was naturally cooled down under the protection of nitrogen gas.

Example 36

10 g of silica gel (having a pore volume of 1.5~1.7 $cm^3/g$ and a surface area of 250~300 $m^2/g$) was impregnated in a n-hexane solution of tetra-n-butyl titanate, enabled the Ti loading (based on the mass of Ti) to be 3%. After being continuously stirred for 4 h, heated to 80° C. and dried in air for 8 h, the silica gel carrier supporting the Ti was high-temperature calcined in a fluidized bed. Then, the silica gel was naturally cooled down under the protection of nitrogen gas to obtain a Ti modified catalyst precursor. The high temperature calcining and then cooling processes above are shown in FIG. 5. Then it was impregnated in an aqueous solution of $(acac)_2V$ at 40° C., enabled the vanadium loading (based on the mass of V) to be 0.24%. After being continuously stirred for 4 h, heated to 120° C. and dried in air for 4 h, it was high-temperature calcined in a fluidized bed. Finally, it was naturally cooled down under the protection of nitrogen gas. After that it was impregnated in an aqueous solution of alkali type chromium acetate, enabled the chromium loading (based on the mass of Cr) to be 0.5%. After being continuously stirred for 4 h, heated to 120° C. and dried in air for 4 h, it was high-temperature calcined in a fluidized bed. Finally, it was naturally cooled down under the protection of nitrogen gas. Then used organometallic co-catalysts MAO to pre-reduction the catalyst precursor, the concentration of co-catalyst was 1.0 mmol/mL. Finally drying at 100° C. for 4 h, the drying is conducted under an inert gas atmosphere.

Example 37

160 mg of the catalyst in Example 22 was weighed for the polymerization respectively. The polymerization reaction kettle was firstly heated (100° C.) under vacuum, and then replaced with highly pure nitrogen, which was repeated for three times. Then a small amount of monomeric ethylene was used to replace once. Finally, the reaction kettle was filled with ethylene to a slight positive pressure (0.12 MPa). The polymerization temperature was maintained at 85° C. Into the reaction kettle were added in turn about 70 mL of a refined heptane treated by dehydration and deoxidation as solvent and TIBA as co-catalyst respectively, wherein the co-catalyst had a concentration of 1.0 mmol/mL (n-hexane solution) and Al/Cr (molar ratio)=5. Finally the pressure of ethylene in the kettle was raised to 0.15 MPa and the catalyst was added to start the polymerization. The instantaneous consumption of monomeric ethylene was on-line collected (by the high-precision ethylene mass flow meter connecting with a computer) during the reaction and recorded by the computer. After the reaction was conducted at 85° C. for 1 h, a mixed solution of hydrochloric acid/ethanol was added to terminate the reaction, and the polymer was vacuum dried, weighed and analyzed.

Example 38

160 mg of the catalyst in Example 23 was weighed for the polymerization respectively. The polymerization reaction kettle was firstly heated (100° C.) under vacuum, and then replaced with highly pure nitrogen, which was repeated for three times. Then a small amount of monomeric ethylene was used to replace once. Finally, the reaction kettle was filled with ethylene to a slight positive pressure (0.12 MPa). The polymerization temperature was maintained at 85° C. Into the reaction kettle were added in turn about 70 mL of a refined heptane treated by dehydration and deoxidation as solvent and TIBA as co-catalyst respectively, wherein the co-catalyst had a concentration of 1.0 mmol/mL (n-hexane solution) and Al/Cr (molar ratio)=5, 10, 15, 20, 30 (Example 38-1, 38-2, 38-3, 38-4, 38-5). Finally the pressure of ethylene in the kettle was raised to 0.15 MPa and the catalyst was added to start the polymerization. The instantaneous consumption of monomeric ethylene was on-line collected (by the high-precision ethylene mass flow meter connecting with a computer) during the reaction and recorded by the computer. After the reaction was conducted at 85° C. for 1 h, a mixed solution of hydrochloric acid/ethanol was added to terminate the reaction, and the polymer was vacuum dried, weighed and analyzed.

Example 39

160 mg of the catalyst in Example 24 was weighed for the polymerization respectively. The polymerization reaction kettle was firstly heated (100° C.) under vacuum, and then replaced with highly pure nitrogen, which was repeated for three times. Then a small amount of monomeric ethylene was used to replace once. Finally, the reaction kettle was filled with ethylene to a slight positive pressure (0.12 MPa). The polymerization temperature was maintained at 85° C. Into the reaction kettle were added in turn about 70 mL of a refined heptane treated by dehydration and deoxidation as solvent and TIBA as co-catalyst respectively, wherein the co-catalyst had a concentration of 1.0 mmol/mL (n-hexane solution) and Al/Cr (molar ratio)=5. Finally the pressure of ethylene in the kettle was raised to 0.15 MPa and the catalyst was added to start the polymerization. The instantaneous consumption of monomeric ethylene was on-line collected (by the high-precision ethylene mass flow meter connecting with a computer) during the reaction and recorded by the computer. After the reaction was conducted at 85° C. for 1 h, a mixed solution of hydrochloric acid/ethanol was added to terminate the reaction, and the polymer was vacuum dried, weighed and analyzed.

Example 40

160 mg of the catalyst in Example 25 was weighed for the polymerization respectively. The polymerization reaction kettle was firstly heated (100° C.) under vacuum, and then replaced with highly pure nitrogen, which was repeated for three times. Then a small amount of monomeric ethylene was used to replace once. Finally, the reaction kettle was filled with ethylene to a slight positive pressure (0.12 MPa). The polymerization temperature was maintained at 85° C. Into the reaction kettle were added in turn about 70 mL of a refined heptane treated by dehydration and deoxidation as solvent and TIBA as co-catalyst respectively, wherein the co-catalyst had a concentration of 1.0 mmol/mL (n-hexane solution) and Al/Cr (molar ratio)=5. Finally the pressure of ethylene in the kettle was raised to 0.15 MPa and the catalyst was added to start the polymerization. The instantaneous consumption of monomeric ethylene was on-line collected (by the high-precision ethylene mass flow meter connecting with a computer) during the reaction and recorded by the computer. After the reaction was conducted at 85° C. for 1 h, a mixed solution of hydrochloric acid/ethanol was added to terminate the reaction, and the polymer was vacuum dried, weighed and analyzed.

Example 41

160 mg of the catalyst in Example 26 was weighed for the polymerization respectively. The polymerization reaction kettle was firstly heated (100° C.) under vacuum, and then replaced with highly pure nitrogen, which was repeated for three times. Then a small amount of monomeric ethylene was used to replace once. Finally, the reaction kettle was filled with ethylene to a slight positive pressure (0.12 MPa). The polymerization temperature was maintained at 85° C. Into the reaction kettle were added in turn about 70 mL of a refined heptane treated by dehydration and deoxidation as solvent and TIBA as co-catalyst respectively, wherein the co-catalyst had a concentration of 1.0 mmol/mL (n-hexane solution) and Al/Cr (molar ratio)=5. Finally the pressure of ethylene in the kettle was raised to 0.15 MPa and the catalyst was added to start the polymerization. The instantaneous consumption of monomeric ethylene was on-line collected (by the high-precision ethylene mass flow meter connecting with a computer) during the reaction and recorded by the computer. After the reaction was conducted at 85° C. for 1 h, a mixed solution of hydrochloric acid/ethanol was added to terminate the reaction, and the polymer was vacuum dried, weighed and analyzed.

Example 42

160 mg of the catalyst in Example 27 was weighed for the polymerization respectively. The polymerization reaction kettle was firstly heated (100° C.) under vacuum, and then replaced with highly pure nitrogen, which was repeated for three times. Then a small amount of monomeric ethylene was used to replace once. Finally, the reaction kettle was filled with ethylene to a slight positive pressure (0.12 MPa). The polymerization temperature was maintained at 85° C. Into the reaction kettle were added in turn about 70 mL of a refined heptane treated by dehydration and deoxidation as solvent and TIBA as co-catalyst respectively, wherein the co-catalyst had a concentration of 1.0 mmol/mL (n-hexane solution) and Al/Cr (molar ratio)=5. Finally the pressure of ethylene in the kettle was raised to 0.15 MPa and the catalyst was added to start the polymerization. The instantaneous consumption of monomeric ethylene was on-line collected (by the high-precision ethylene mass flow meter connecting with a computer) during the reaction and recorded by the computer. After the reaction was conducted at 85° C. for 1 h, a mixed solution of hydrochloric acid/ethanol was added to terminate the reaction, and the polymer was vacuum dried, weighed and analyzed.

Example 43

160 mg of the catalyst in Example 28 was weighed for the polymerization respectively. The polymerization reaction kettle was firstly heated (100° C.) under vacuum, and then replaced with highly pure nitrogen, which was repeated for three times. Then a small amount of monomeric ethylene was used to replace once. Finally, the reaction kettle was filled with ethylene to a slight positive pressure (0.12 MPa). The polymerization temperature was maintained at 85° C. Into the reaction kettle were added in turn about 70 mL of a refined heptane treated by dehydration and deoxidation as solvent and TIBA as co-catalyst respectively, wherein the co-catalyst had a concentration of 1.0 mmol/mL (n-hexane solution) and Al/Cr (molar ratio)=5. Finally the pressure of ethylene in the kettle was raised to 0.15 MPa and the catalyst was added to start the polymerization. The instantaneous consumption of monomeric ethylene was on-line collected (by the high-precision ethylene mass flow meter connecting with a computer) during the reaction and recorded by the computer. After the reaction was conducted at 85° C. for 1 h, a mixed solution of hydrochloric acid/ethanol was added to terminate the reaction, and the polymer was vacuum dried, weighed and analyzed.

Example 44

160 mg of the catalyst in Example 29 was weighed for the polymerization respectively. The polymerization reaction kettle was firstly heated (100° C.) under vacuum, and then replaced with highly pure nitrogen, which was repeated for three times. Then a small amount of monomeric ethylene was used to replace once. Finally, the reaction kettle was filled with ethylene to a slight positive pressure (0.12 MPa). The polymerization temperature was maintained at 85° C. Into the reaction kettle were added in turn about 70 mL of a refined heptane treated by dehydration and deoxidation as solvent and TIBA as co-catalyst respectively, wherein the co-catalyst had a concentration of 1.0 mmol/mL (n-hexane solution) and Al/Cr (molar ratio)=5. Finally the pressure of ethylene in the kettle was raised to 0.15 MPa and the catalyst was added to start the polymerization. The instantaneous consumption of monomeric ethylene was on-line collected (by the high-precision ethylene mass flow meter connecting with a computer) during the reaction and recorded by the computer. After the reaction was conducted at 85° C. for 1 h, a mixed solution of hydrochloric acid/ethanol was added to terminate the reaction, and the polymer was vacuum dried, weighed and analyzed.

Example 45

160 mg of the catalyst in Example 30 was weighed for the polymerization respectively. The polymerization reaction kettle was firstly heated (100° C.) under vacuum, and then replaced with highly pure nitrogen, which was repeated for three times. Then a small amount of monomeric ethylene was used to replace once. Finally, the reaction kettle was filled with ethylene to a slight positive pressure (0.12 MPa). The polymerization temperature was maintained at 85° C. Into the reaction kettle were added in turn about 70 mL of a refined heptane treated by dehydration and deoxidation as solvent and TIBA as co-catalyst respectively, wherein the co-catalyst had a concentration of 1.0 mmol/mL (n-hexane solution) and Al/Cr (molar ratio)=5. Finally the pressure of ethylene in the kettle was raised to 0.15 MPa and the catalyst was added to start the polymerization. The instantaneous consumption of monomeric ethylene was on-line collected (by the high-precision ethylene mass flow meter connecting with a computer) during the reaction and recorded by the computer. After the reaction was conducted at 85° C. for 1 h, a mixed solution of hydrochloric acid/ethanol was added to terminate the reaction, and the polymer was vacuum dried, weighed and analyzed.

Example 46

160 mg of the catalyst in Example 31 was weighed for the polymerization respectively. The polymerization reaction kettle was firstly heated (100° C.) under vacuum, and then replaced with highly pure nitrogen, which was repeated for three times. Then a small amount of monomeric ethylene was used to replace once. Finally, the reaction kettle was filled with ethylene to a slight positive pressure (0.12 MPa). The polymerization temperature was maintained at 85° C. Into the reaction kettle were added in turn about 70 mL of a refined heptane treated by dehydration and deoxidation as solvent and TIBA as co-catalyst respectively, wherein the co-catalyst had a concentration of 1.0 mmol/mL (n-hexane solution) and Al/Cr (molar ratio)=5. Finally the pressure of ethylene in the kettle was raised to 0.15 MPa and the catalyst was added to start the polymerization. The instantaneous consumption of monomeric ethylene was on-line collected (by the high-precision ethylene mass flow meter connecting with a computer) during the reaction and recorded by the computer. After the reaction was conducted at 85° C. for 1 h, a mixed solution of hydrochloric acid/ethanol was added to terminate the reaction, and the polymer was vacuum dried, weighed and analyzed.

Example 47

160 mg of the catalyst in Example 32 was weighed for the polymerization respectively. The polymerization reaction kettle was firstly heated (100° C.) under vacuum, and then replaced with highly pure nitrogen, which was repeated for three times. Then a small amount of monomeric ethylene was used to replace once. Finally, the reaction kettle was filled with ethylene to a slight positive pressure (0.12 MPa). The polymerization temperature was maintained at 85° C. Into the reaction kettle were added in turn about 70 mL of a refined heptane treated by dehydration and deoxidation as solvent and TIBA as co-catalyst respectively, wherein the co-catalyst had a concentration of 1.0 mmol/mL (n-hexane solution) and Al/Cr (molar ratio)=5. Finally the pressure of ethylene in the kettle was raised to 0.15 MPa and the catalyst was added to start the polymerization. The instantaneous consumption of monomeric ethylene was on-line collected (by the high-precision ethylene mass flow meter connecting with a computer) during the reaction and recorded by the computer. After the reaction was conducted at 85° C. for 1 h, a mixed solution of hydrochloric acid/ethanol was added to terminate the reaction, and the polymer was vacuum dried, weighed and analyzed.

Example 48

160 mg of the catalyst in Example 33 was weighed for the polymerization respectively. The polymerization reaction kettle was firstly heated (100° C.) under vacuum, and then replaced with highly pure nitrogen, which was repeated for three times. Then a small amount of monomeric ethylene was used to replace once. Finally, the reaction kettle was filled with ethylene to a slight positive pressure (0.12 MPa). The polymerization temperature was maintained at 85° C. Into the reaction kettle were added in turn about 70 mL of a refined heptane treated by dehydration and deoxidation as solvent and TIBA as co-catalyst respectively, wherein the co-catalyst had a concentration of 1.0 mmol/mL (n-hexane solution) and Al/Cr (molar ratio)=5. Finally the pressure of ethylene in the kettle was raised to 0.15 MPa and the catalyst was added to start the polymerization. The instantaneous consumption of monomeric ethylene was on-line collected (by the high-precision ethylene mass flow meter connecting with a computer) during the reaction and recorded by the computer. After the reaction was conducted at 85° C. for 1 h, a mixed solution of hydrochloric acid/ethanol was added to terminate the reaction, and the polymer was vacuum dried, weighed and analyzed.

Example 49

160 mg of the catalyst in Example 34 was weighed for the polymerization respectively. The polymerization reaction kettle was firstly heated (100° C.) under vacuum, and then replaced with highly pure nitrogen, which was repeated for three times. Then a small amount of monomeric ethylene was used to replace once. Finally, the reaction kettle was filled with ethylene to a slight positive pressure (0.12 MPa). The polymerization temperature was maintained at 85° C. Into the reaction kettle were added in turn about 70 mL of a refined heptane treated by dehydration and deoxidation as solvent and TIBA as co-catalyst respectively, wherein the co-catalyst had a concentration of 1.0 mmol/mL (n-hexane solution) and Al/Cr (molar ratio)=5. Finally the pressure of ethylene in the kettle was raised to 0.15 MPa and the catalyst was added to start the polymerization. The instantaneous consumption of monomeric ethylene was on-line collected (by the high-precision ethylene mass flow meter connecting with a computer) during the reaction and recorded by the computer. After the reaction was conducted at 85° C. for 1 h, a mixed solution of hydrochloric acid/ethanol was added to terminate the reaction, and the polymer was vacuum dried, weighed and analyzed.

Example 50

160 mg of the catalyst in Example 35 was weighed for the polymerization respectively. The polymerization reaction kettle was firstly heated (100° C.) under vacuum, and then replaced with highly pure nitrogen, which was repeated for three times. Then a small amount of monomeric ethylene was used to replace once. Finally, the reaction kettle was filled with ethylene to a slight positive pressure (0.12 MPa). The polymerization temperature was maintained at 85° C. Into the reaction kettle were added in turn about 70 mL of a refined heptane treated by dehydration and deoxidation as solvent and TIBA as co-catalyst respectively, wherein the co-catalyst had a concentration of 1.0 mmol/mL (n-hexane solution) and Al/Cr (molar ratio)=5. Finally the pressure of ethylene in the kettle was raised to 0.15 MPa and the catalyst was added to start the polymerization. The instantaneous consumption of monomeric ethylene was on-line collected (by the high-precision ethylene mass flow meter connecting with a computer) during the reaction and recorded by the computer. After the reaction was conducted at 85° C. for 1 h, a mixed solution of hydrochloric acid/ethanol was added to terminate the reaction, and the polymer was vacuum dried, weighed and analyzed.

Example 51

160 mg of the catalyst in Example 36 was weighed for the polymerization respectively. The polymerization reaction kettle was firstly heated (100° C.) under vacuum, and then replaced with highly pure nitrogen, which was repeated for three times. Then a small amount of monomeric ethylene was used to replace once. Finally, the reaction kettle was filled with ethylene to a slight positive pressure (0.12 MPa). The polymerization temperature was maintained at 85° C. Into the reaction kettle were added in turn about 70 mL of a refined heptane treated by dehydration, Finally the pressure of ethylene in the kettle was raised to 0.15 MPa and the catalyst was added to start the polymerization. The instantaneous consumption of monomeric ethylene was on-line collected (by the high-precision ethylene mass flow meter connecting with a computer) during the reaction and recorded by the computer. After the reaction was conducted at 85° C. for 1 h, a mixed solution of hydrochloric acid/ethanol was added to terminate the reaction, and the polymer was vacuum dried, weighed and analyzed.

Example 52

160 mg of the catalyst in Example 23 was weighed for the polymerization respectively. The polymerization reaction kettle was firstly heated (100° C.) under vacuum, and then replaced with highly pure nitrogen, which was repeated for three times. Then a small amount of monomeric ethylene was used to replace once. Finally, the reaction kettle was filled with ethylene to a slight positive pressure (0.12 MPa). Into the reaction kettle were added in turn about 70 ml of a refined heptane treated by dehydration and deoxidation as solvent, a refined hexene treated by dehydration and deoxidation as comonomer and TIBA as co-catalyst respectively, wherein the co-catalyst had a concentration of 1.0 mmol/mL (n-hexane solution) and Al/Cr (molar ratio)=5. The amount of 1-hexene was respectively 1.4 mL, 2.8 mL, and 4.2 mL, i.e. the volume ratio of 1-hexene and the solvent used for polymerization being 2 vol % (Example 52-1), 4 vol % (Example 52-2) and 6 vol % (Example 52-3). Finally the pressure of ethylene in the kettle was raised to 0.15 MPa and the catalyst was added to start the polymerization. The instantaneous consumption of monomeric ethylene was on-line collected (by the high-precision ethylene mass flow meter connecting with a computer) during the reaction and recorded by the computer. After the reaction was conducted at 85° C. for 1 h, a mixed solution of hydrochloric acid/ethanol was added to terminate the reaction, and the polymer was vacuum dried, weighed and analyzed.

Example 53

160 mg of the catalyst in Example 24 was weighed for the polymerization respectively. The polymerization reaction kettle was firstly heated (100° C.) under vacuum, and then replaced with highly pure nitrogen, which was repeated for three times. Then a small amount of monomeric ethylene was used to replace once. Finally, the reaction kettle was filled with ethylene to a slight positive pressure (0.12 MPa). Into the reaction kettle were added in turn about 70 ml of a refined heptane treated by dehydration and deoxidation as solvent, a refined hexene treated by dehydration and deoxidation as comonomer and TIBA as co-catalyst respectively, wherein the co-catalyst had a concentration of 1.0 mmol/mL (n-hexane solution) and Al/Cr (molar ratio)=5. The amount of 1-hexene was respectively 1.4 mL, 2.8 mL, and 4.2 mL, i.e. the volume ratio of 1-hexene and the solvent used for polymerization being 2 vol % (Example 53-1), 4 vol % (Example 53-2) and 6 vol % (Example 53-3). Finally the pressure of ethylene in the kettle was raised to 0.15 MPa and the catalyst was added to start the polymerization. The instantaneous consumption of monomeric ethylene was on-line collected (by the high-precision ethylene mass flow meter connecting with a computer) during the reaction and recorded by the computer. After the reaction was conducted at 85° C. for 1 h, a mixed solution of hydrochloric acid/ethanol was added to terminate the reaction, and the polymer was vacuum dried, weighed and analyzed.

Example 54

160 mg of the catalyst in Example 22 was weighed for the polymerization respectively. The polymerization reaction kettle was firstly heated under vacuum, and then replaced with highly pure nitrogen, which was repeated for three times. Then a small amount of monomeric ethylene was used to replace once. Finally, the reaction kettle was filled with ethylene to a slight positive pressure (0.12 MPa). Into the reaction kettle were added in turn about 70 ml of a refined heptane treated by dehydration and deoxidation as solvent, 10 mL and 20 mL hydrogen (Example 54-1, 54-2) and TIBA as co-catalyst respectively, wherein the co-catalyst had a concentration of 1.0 mmol/mL (n-hexane solution) and Al/Cr (molar ratio)=5. Finally the pressure of ethylene in the kettle was raised to 0.15 MPa and the catalyst was added to start the polymerization. The instantaneous consumption of monomeric ethylene was on-line collected (by the high-precision ethylene mass flow meter connecting with a computer) during the reaction and recorded by the computer. After the reaction was conducted at 85° C. for 1 h, a mixed solution of hydrochloric acid/ethanol was added to terminate the reaction, and the polymer was vacuum dried, weighed and analyzed.

Example 55

160 mg of the catalyst in Example 23 was weighed for the polymerization respectively. The polymerization reaction kettle was firstly heated under vacuum, and then replaced with highly pure nitrogen, which was repeated for three times. Then a small amount of monomeric ethylene was used to replace once. Finally, the reaction kettle was filled with ethylene to a slight positive pressure (0.12 MPa). Into the reaction kettle were added in turn about 70 ml of a refined heptane treated by dehydration and deoxidation as solvent, 10 mL and 20 mL hydrogen (Example 55-1, 55-2) and TIBA as co-catalyst respectively, wherein the co-catalyst had a concentration of 1.0 mmol/mL (n-hexane solution) and Al/Cr (molar ratio)=5. Finally the pressure of ethylene in the kettle was raised to 0.15 MPa and the catalyst was added to start the polymerization. The instantaneous consumption of monomeric ethylene was on-line collected (by the high-precision ethylene mass flow meter connecting with a computer) during the reaction and recorded by the computer. After the reaction was conducted at 85° C. for 1 h, a mixed solution of hydrochloric acid/ethanol was added to terminate the reaction, and the polymer was vacuum dried, weighed and analyzed.

Example 56

160 mg of the catalyst in Example 24 was weighed for the polymerization respectively. The polymerization reaction kettle was firstly heated under vacuum, and then replaced with highly pure nitrogen, which was repeated for three times. Then a small amount of monomeric ethylene was used to replace once. Finally, the reaction kettle was filled with ethylene to a slight positive pressure (0.12 MPa). Into the reaction kettle were added in turn about 70 ml of a refined heptane treated by dehydration and deoxidation as solvent, 10 mL and 20 mL hydrogen (Example 56-1, 56-2) and TIBA as co-catalyst respectively, wherein the co-catalyst had a concentration of 1.0 mmol/mL (n-hexane solution) and Al/Cr (molar ratio)=5. Finally the pressure of ethylene in the kettle was raised to 0.15 MPa and the catalyst was added to start the polymerization. The instantaneous consumption of monomeric ethylene was on-line collected (by the high-precision ethylene mass flow meter connecting with a computer) during the reaction and recorded by the computer. After the reaction was conducted at 85° C. for 1 h, a mixed solution of hydrochloric acid/ethanol was added to terminate the reaction, and the polymer was vacuum dried, weighed and analyzed.

Example 57

160 mg of the catalyst in Example 24 was weighed for the polymerization respectively. The polymerization reaction kettle was firstly heated under vacuum, and then replaced with highly pure nitrogen, which was repeated for three times. Then a small amount of monomeric ethylene was used to replace once. Finally, the reaction kettle was filled with ethylene to a slight positive pressure (0.12 MPa). Into the reaction kettle were added in turn about 70 ml of a refined heptane treated by dehydration and deoxidation as solvent and TIBA as co-catalyst respectively, wherein the co-catalyst had a concentration of 1.0 mmol/mL (n-hexane solution) and Al/Cr (molar ratio)=10. Finally the pressure of ethylene in the kettle was raised to 0.15 MPa and the catalyst was added to start the polymerization. The instantaneous consumption of monomeric ethylene was on-line collected (by the high-precision ethylene mass flow meter connecting with a computer) during the reaction and recorded by the computer. After the reaction was conducted at 55° C. and 70° C. for 1 h (Example 57-1, 57-2), a mixed solution of hydrochloric acid/ethanol was added to terminate the reaction, and the polymer was vacuum dried, weighed and analyzed.

Example 58

160 mg of the catalyst in Example 24 was weighed for the polymerization respectively. The polymerization reaction kettle was firstly heated (100° C.) under vacuum, and then replaced with highly pure nitrogen, which was repeated for three times. Then a small amount of monomeric ethylene was used to replace once. Finally, the reaction kettle was filled with ethylene to a slight positive pressure (0.12 MPa). The polymerization temperature was maintained at 85° C. Into the reaction kettle were added in turn about 70 mL of a refined heptane treated by dehydration and deoxidation as solvent and TEA as co-catalyst respectively, wherein the co-catalyst had a concentration of 1.0 mmol/mL (n-hexane solution) and Al/Cr (molar ratio)=5. Finally the pressure of ethylene in the kettle was raised to 0.15 MPa and the catalyst was added to start the polymerization. The instantaneous consumption of monomeric ethylene was on-line collected (by the high-precision ethylene mass flow meter connecting with a computer) during the reaction and recorded by the computer. After the reaction was conducted at 85° C. for 1 h, a mixed solution of hydrochloric acid/ethanol was added to terminate the reaction, and the polymer was vacuum dried, weighed and analyzed.

Example 59

160 mg of the catalyst in Example 23 was weighed for the polymerization respectively. The polymerization reaction kettle was firstly heated (100° C.) under vacuum, and then replaced with highly pure nitrogen, which was repeated for three times. Then a small amount of monomeric ethylene was used to replace once. Finally, the reaction kettle was filled with ethylene to a slight positive pressure (0.12 MPa). The polymerization temperature was maintained at 85° C. Into the reaction kettle were added in turn about 70 mL of a refined heptane treated by dehydration and deoxidation as solvent respectively. Finally the pressure of ethylene in the kettle was raised to 0.15 MPa and the catalyst was added to start the polymerization. The instantaneous consumption of monomeric ethylene was on-line collected (by the high-precision ethylene mass flow meter connecting with a computer) during the reaction and recorded by the computer. After the reaction was conducted at 85° C. for 1 h, a mixed solution of hydrochloric acid/ethanol was added to terminate the reaction, and the polymer was vacuum dried, weighed and analyzed.

Example 60

160 mg of the catalyst in Example 28 was weighed for the polymerization respectively. The polymerization reaction kettle was firstly heated (100° C.) under vacuum, and then replaced with highly pure nitrogen, which was repeated for three times. Then a small amount of monomeric ethylene was used to replace once. Finally, the reaction kettle was filled with ethylene to a slight positive pressure (0.12 MPa). The polymerization temperature was maintained at 85° C. Into the reaction kettle were added in turn about 70 mL of a refined heptane treated by dehydration and deoxidation as solvent and TEA as co-catalyst respectively, wherein the co-catalyst had a concentration of 1.0 mmol/mL (n-hexane solution) and Al/Cr (molar ratio)=5. Finally the pressure of ethylene in the kettle was raised to 0.15 MPa and the catalyst was added to start the polymerization. The instantaneous consumption of monomeric ethylene was on-line collected (by the high-precision ethylene mass flow meter connecting with a computer) during the reaction and recorded by the computer. After the reaction was conducted at 85° C. for 1 h, a mixed solution of hydrochloric acid/ethanol was added to terminate the reaction, and the polymer was vacuum dried, weighed and analyzed.

Comparison Example 14

10 g of silica gel (having a pore volume of 1.5~1.7 cm$^3$/g and a surface area of 250~300 m$^2$/g) was impregnated in an aqueous solution of ammonium metavanadate at 45° C., enabled the vanadium loading (based on the mass of V) to be 0.24%. After being continuously stirred for 5 h, heated to 120° C. and dried in air for 6 h, it was high-temperature calcined in a fluidized bed in 450° C. Finally, it was naturally cooled down under the protection of nitrogen gas to obtain a vanadium supported catalyst precursor. The high temperature calcining and then cooling processes above are shown in FIG. 1. Then it was impregnated in an aqueous solution of alkali type chromium acetate, enabled the chromium loading (based on the mass of Cr) to be 0.5%. After being continuously stirred for 4 h, heated to 120° C. and dried in air for 4 h, it was high-temperature calcined in a fluidized bed. Finally, it was naturally cooled down under the protection of nitrogen gas.

Comparison Example 15

20 g of silica gel (having a pore volume of 1.5~1.7 cm$^3$/g and a surface area of 250~300 m$^2$/g) was impregnated in a n-hexane solution of tetra-n-butyl titanate at 40° C., enabled the Ti loading (based on the mass of Ti) to be 5%. After being continuously stirred for 4 h, heated to 80° C. and dried in air for 8 h, the silica gel support supporting the Ti was high-temperature calcined in a fluidized bed. Then, the silica gel was naturally cooled down under the protection of nitrogen gas to obtain a Ti modified catalyst precursor. The high temperature calcining and then cooling processes above are shown in FIG. 5. Then 10 g of it was impregnated in an aqueous solution of ammonium dichromate, enabled the Cr loading (based on the mass of Cr) to be 1%. After being continuously stirred for 4 h, heated to 120° C. and dried in air for 6 h, it was high-temperature calcined in a fluidized bed. Finally, it was naturally cooled down under the protection of nitrogen gas. Then another 10 g of it was impregnated in an aqueous solution of vanadyl oxalate, enabled the V loading (based on the mass of V) to be 0.48%. After being continuously stirred for 4 h, heated to 120° C. and dried in air for 6 h, it was high-temperature calcined in a fluidized bed. Finally, it was naturally cooled down under the protection of nitrogen gas. Mix the catalyst produced above as the Cr/V=2:1 to obtain a mixture catalyst.

Comparison Example 16

160 mg of the catalyst in Comparison Example 14 was weighed for the polymerization respectively. The polymerization reaction kettle was firstly heated (100° C.) under vacuum, and then replaced with highly pure nitrogen, which was repeated for three times. Then a small amount of monomeric ethylene was used to replace once. Finally, the reaction kettle was filled with ethylene to a slight positive pressure (0.12 MPa). The polymerization temperature was maintained at 85° C. Into the reaction kettle were added in turn about 70 mL of a refined heptane treated by dehydration and deoxidation as solvent and TIBA as co-catalyst respectively, wherein the co-catalyst had a concentration of 1.0 mmol/mL (n-hexane solution) and Al/Cr (molar ratio)=5, 10, 15, 20, 30 (Comparison Example 16-1, 16-2, 16-3, 16-4, 16-5). Finally the pressure of ethylene in the kettle was raised to 0.15 MPa and the catalyst was added to start the polymerization. The instantaneous consumption of monomeric ethylene was on-line collected (by the high-precision ethylene mass flow meter connecting with a computer) during the reaction and recorded by the computer. After the reaction was conducted at 85° C. for 1 h, a mixed solution of hydrochloric acid/ethanol was added to terminate the reaction, and the polymer was vacuum dried, weighed and analyzed.

Comparison Example 17

160 mg of the catalyst in Comparison Example 14 was weighed for the polymerization respectively. The polymerization reaction kettle was firstly heated under vacuum, and then replaced with highly pure nitrogen, which was repeated for three times. Then a small amount of monomeric ethylene was used to replace once. Finally, the reaction kettle was filled with ethylene to a slight positive pressure (0.12 MPa). Into the reaction kettle were added in turn about 70 mL of a refined heptane treated by dehydration and deoxidation as solvent and TEA as co-catalyst respectively, wherein the co-catalyst had a concentration of 1.0 mmol/mL (n-hexane solution) and Al/Cr (molar ratio)=5. Finally the pressure of ethylene in the kettle was raised to 0.15 MPa and the catalyst was added to start the polymerization. The instantaneous consumption of monomeric ethylene was on-line collected (by the high-precision ethylene mass flow meter connecting with a computer) during the reaction and recorded by the computer. After the reaction was conducted at 85° C. for 1 h, a mixed solution of hydrochloric acid/ethanol was added to terminate the reaction, and the polymer was vacuum dried, weighed and analyzed.

Comparison Example 18

160 mg of the catalyst in Comparison Example 1 was weighed for the polymerization respectively. The polymerization reaction kettle was firstly heated (100° C.) under vacuum, and then replaced with highly pure nitrogen, which was repeated for three times. Then a small amount of monomeric ethylene was used to replace once. Finally, the reaction kettle was filled with ethylene to a slight positive pressure (0.12 MPa). Into the reaction kettle were added in turn about 70 ml of a refined heptane treated by dehydration and deoxidation as solvent, a refined hexene treated by dehydration and deoxidation as comonomer and TIBA as co-catalyst respectively, wherein the co-catalyst had a concentration of 1.0 mmol/mL (n-hexane solution) and Al/Cr (molar ratio)=10. The amount of 1-hexene was respectively 1.4 mL, 2.8 mL, and 4.2 mL, i.e. the volume ratio of 1-hexene and the solvent used for polymerization being 2 vol % (Comparison Example 18-1), 4 vol % (Comparison Example 18-2) and 6 vol % (Comparison Example 18-3). Finally the pressure of ethylene in the kettle was raised to 0.15 MPa and the catalyst was added to start the polymerization. The instantaneous consumption of monomeric ethylene was on-line collected (by the high-precision ethylene mass flow meter connecting with a computer) during the reaction and recorded by the computer. After the reaction was conducted at 85° C. for 1 h, a mixed solution of hydrochloric acid/ethanol was added to terminate the reaction, and the polymer was vacuum dried, weighed and analyzed.

Comparison Example 19

160 mg of the catalyst in Comparison Example 14 was weighed for the polymerization respectively. The polymerization reaction kettle was firstly heated under vacuum, and then replaced with highly pure nitrogen, which was repeated for three times. Then a small amount of monomeric ethylene was used to replace once. Finally, the reaction kettle was filled with ethylene to a slight positive pressure (0.12 MPa). Into the reaction kettle were added in turn about 70 ml of a refined heptane treated by dehydration and deoxidation as solvent, 10 mL and 20 mL hydrogen (Comparison Example 19-1, 19-2) and TIBA as co-catalyst respectively, wherein the co-catalyst had a concentration of 1.0 mmol/mL (n-hexane solution) and Al/Cr (molar ratio)=5. Finally the pressure of ethylene in the kettle was raised to 0.15 MPa and the catalyst was added to start the polymerization. The instantaneous consumption of monomeric ethylene was on-line collected (by the high-precision ethylene mass flow meter connecting with a computer) during the reaction and recorded by the computer. After the reaction was conducted at 85° C. for 1 h, a mixed solution of hydrochloric acid/ethanol was added to terminate the reaction, and the polymer was vacuum dried, weighed and analyzed.

Comparison Example 20

160 mg of the catalyst in Comparison Example 14 was weighed for the polymerization respectively. The polymerization reaction kettle was firstly heated under vacuum, and then replaced with highly pure nitrogen, which was repeated for three times. Then a small amount of monomeric ethylene was used to replace once. Finally, the reaction kettle was filled with ethylene to a slight positive pressure (0.12 MPa). Into the reaction kettle were added in turn about 70 ml of a refined heptane treated by dehydration and deoxidation as solvent and TIBA as co-catalyst respectively, wherein the co-catalyst had a concentration of 1.0 mmol/mL (n-hexane solution) and Al/Cr (molar ratio)=10. Finally the pressure of ethylene in the kettle was raised to 0.15 MPa and the catalyst was added to start the polymerization. The instantaneous consumption of monomeric ethylene was on-line collected (by the high-precision ethylene mass flow meter connecting with a computer) during the reaction and recorded by the computer. After the reaction was conducted at 55° C. and 70° C. for 1 h (Comparison Example 20-1, 20-2), a mixed solution of hydrochloric acid/ethanol was added to terminate the reaction, and the polymer was vacuum dried, weighed and analyzed.

Comparison Example 21

160 mg of the catalyst in Comparison Example 15 was weighed for the polymerization respectively. The polymerization reaction kettle was firstly heated under vacuum, and then replaced with highly pure nitrogen, which was repeated for three times. Then a small amount of monomeric ethylene was used to replace once. Finally, the reaction kettle was filled with ethylene to a slight positive pressure (0.12 MPa). Into the reaction kettle were added in turn about 70 mL of a refined heptane treated by dehydration and deoxidation as solvent and TIBA as co-catalyst respectively, wherein the co-catalyst had a concentration of 1.0 mmol/mL (n-hexane solution) and Al/Cr (molar ratio)=5. Finally the pressure of ethylene in the kettle was raised to 0.15 MPa and the catalyst was added to start the polymerization. The instantaneous consumption of monomeric ethylene was on-line collected (by the high-precision ethylene mass flow meter connecting with a computer) during the reaction and recorded by the computer. After the reaction was conducted at 85° C. for 1 h, a mixed solution of hydrochloric acid/ethanol was added to terminate the reaction, and the polymer was vacuum dried, weighed and analyzed.

TABLE 8

Polymerization activities of examples

| Example | Activity ($kg_{PE}$/mol Cr or V h) |
|---|---|
| Example 37 | 203.86 |
| Example 38-1 | 227.08 |
| Example 38-2 | 174.87 |
| Example 38-3 | 134.07 |
| Example 38-4 | 133.86 |
| Example 38-5 | 104.22 |
| Example 39 | 232.33 |
| Example 40 | 193.75 |
| Example 41 | 198.80 |
| Example 42 | 139.73 |
| Example 43 | 233.68 |
| Example 44 | 201.69 |
| Example 45 | 192.57 |
| Example 46 | 223.80 |
| Example 47 | 186.21 |
| Example 48 | 102.49 |
| Example 49 | 98.26 |
| Example 50 | 91.12 |
| Example 51 | 142.06 |
| Example 52-1 | 195.79 |
| Example 52-2 | 188.80 |
| Example 52-3 | 157.81 |
| Example 53-1 | 199.36 |
| Example 53-2 | 170.30 |
| Example 53-3 | 102.53 |
| Example 54-1 | 195.83 |
| Example 54-2 | 190.65 |
| Example 55-1 | 226.59 |
| Example 55-2 | 187.13 |
| Example 56-1 | 228.74 |
| Example 56-2 | 143.23 |
| Example 57-1 | 543.23 |
| Example 57-2 | 413.74 |
| Example 58 | 185.10 |
| Example 58 | 80.82 |
| Example 60 | 156.18 |
| Comparison Example 16-1 | 207.97 |
| Comparison Example 16-2 | 176.94 |
| Comparison Example 16-3 | 141.21 |
| Comparison Example 16-4 | 117.44 |
| Comparison Example 16-5 | 135.16 |
| Comparison Example 17 | 188.88 |
| Comparison Example 18-1 | 189.73 |
| Comparison Example 18-2 | 172.88 |
| Comparison Example 18-3 | 102.62 |

TABLE 8-continued

Polymerization activities of examples

| Example | Activity (kg$_{PE}$/mol Cr or V h) |
|---|---|
| Comparison Example 19-1 | 207.45 |
| Comparison Example 19-2 | 220.52 |
| Comparison Example 20-1 | 585.73 |
| Comparison Example 20-2 | 442.83 |
| Comparison Example 21 | 163.58 |

(1) Comparison of Different Amount of Cocatalyst

TABLE 9

Comparison of different amount of cocatalyst in ethylene homopolymerization

| Example | Al/Cr | activity (kg PE/ mol Cr h) | $T_m$ (° C.) | $M_w$ (×10$^5$) | PDI |
|---|---|---|---|---|---|
| Example 38-1 | 5 | 227.08 | 131.58 | 6.04 | 39.90 |
| Example 38-2 | 10 | 174.87 | 132.80 | 6.13 | 28.34 |
| Example 38-3 | 15 | 134.07 | 133.13 | 8.34 | 44.31 |
| Example 38-4 | 20 | 133.86 | 133.74 | 8.55 | 48.51 |
| Example 38-5 | 30 | 104.22 | 133.71 | 8.28 | 14.68 |
| Comparison Example 16-1 | 5 | 207.97 | 131.11 | 4.90 | 43.67 |
| Comparison Example 16-2 | 10 | 176.94 | 132.93 | 6.41 | 36.71 |
| Comparison Example 16-3 | 15 | 141.21 | 133.24 | 7.03 | 20.73 |
| Comparison Example 16-4 | 20 | 117.44 | 133.72 | 7.82 | 18.14 |
| Comparison Example 16-5 | 30 | 135.16 | 133.69 | 7.37 | 14.60 |

Polymerization conditions: ethylene pressure = 0.15 MPa; polymerization time = 1 hr; polymerization temperature = 85° C.; n-heptane = 70 mL; Cr = 0.5% (wt), co-catalyst = TIBA.

From table 9 shows that in three isobutyl aluminum (TIBA) as cocatalyst conditions (16 example and contrast 38 cases), with the help of catalyst increasing, chrome vanadium titanium dioxide modified load type double active center type chrome vanadium catalyst and unmodified load double active center of the activity of catalyst in ethylene homopolymerization downward trend, while the polymer molecular weight showed a trend of reducing the rise, then required to get the polymer molecular weight, the dosage of the catalyst promoter is an appropriate value or range. Using other except TIBA cocatalyst in a similar rule.

(2) Comparison of Different Cocatalyst

TABLE 10

Comparison of different cocatalyst in ethylene homopolymerization

| Example | co-catalyst | activity (kg PE/ mol Cr h) | $T_m$ (° C.) | $M_w$ (×10$^5$) | PDI |
|---|---|---|---|---|---|
| Example 39 | TIBA | 232.33 | 131.58 | 4.62 | 46.04 |
| Example 58 | TEA | 185.10 | 132.02 | 3.14 | 10.61 |
| Comparison Example 16-1 | TIBA | 207.97 | 131.11 | 4.90 | 43.67 |
| Comparison Example 17 | TEA | 188.88 | 132.09 | 2.54 | 11.21 |

Polymerization conditions: ethylene pressure = 0.15 MPa; polymerization time = 1 hr; polymerization temperature = 85° C.; n-heptane = 70 mL; Cr = 0.5% (wt);

Table 10 different cocatalyst is presented for titanium dioxide modified and unmodified load type chrome vanadium double metal oxide catalysts for catalytic active sites of ethylene homopolymerization activity (Example 39, 58 and Comparison Example 16-1, 17). Visible, use the three isobutyl aluminum (TiBA) as cocatalyst, two kinds of catalyst activity were significantly higher than that of using triethyl aluminium (TEA) as catalyst promoter activity of ethylene homopolymerization. Further through the analysis of the above product polyethylene, under different cocatalyst is the melting point of polyethylene products have similar, but its very different molecular weight and molecular weight distribution, showed the cocatalyst to the center of the catalyst activity after reduction degree and reduction of distribution has great influence.

(3) Comparison of Temperature

TABLE 11

Comparison of temperature

| Example | temp. | activity (kg PE/ mol Cr h) | $T_m$ (° C.) | $M_w$ (×10$^5$) | PDI |
|---|---|---|---|---|---|
| Example 57-1 | 55 | 543.23 | 131.66 | 7.28 | 27.19 |
| Example 57-2 | 70 | 413.74 | 131.68 | 4.73 | 41.38 |
| Example 39 | 85 | 232.33 | 131.58 | 4.62 | 46.04 |
| Comparison Example 20-1 | 55 | 585.73 | 131.79 | 6.00 | 36.69 |
| Comparison Example 20-2 | 70 | 442.83 | 130.77 | 5.14 | 25.24 |
| Comparison Example 16-1 | 85 | 207.97 | 131.11 | 4.90 | 43.67 |

Polymerization conditions: ethylene pressure = 0.15 MPa; polymerization time = 1 hr; n-heptane = 70 mL; Cr = 0.5% (wt); co-catalyst = TIBA.

Table 11 for different polymerization temperature of titanium dioxide modified and unmodified double active center load type chrome vanadium catalysts of ethylene homopolymerization activity (Example 39, 57 and Comparison Example 16-1, 20). In 55° C. to 85° C. of polymerization temperature range, the catalyst with the highest activity at 55° C., with the increase of temperature reduction catalyst polymerization activity, the minimum activity at 85° C. Under different temperature of the melting point of polyethylene products have similar, its molecular weight with the increase of polymerization temperature decrease trend, chain transfer reaction shows polymerization temperature on polymerization more advantageous.

(4) Comparison of Different Dosage of 1-Hexene

TABLE 12

Comparison of different dosage of 1-hexene

| Example | 1-hexene | activity (kg PE/ mol Cr h) | $T_m$ (° C.) | $M_w$ (×10$^5$) | PDI |
|---|---|---|---|---|---|
| Example 38-1 | 0 | 227.08 | 132.80 | 6.04 | 39.90 |
| Example 52-1 | 1.4 | 195.79 | 132.40 | 6.33 | 36.53 |
| Example 52-2 | 2.8 | 188.80 | 132.09 | 5.86 | 42.64 |
| Example 52-3 | 4.2 | 157.81 | 131.98 | 5.95 | 46.01 |
| Example 39 | 0 | 232.33 | 131.58 | 4.62 | 46.04 |
| Example 53-1 | 1.4 | 199.36 | 131.85 | 6.44 | 44.21 |
| Example 53-2 | 2.8 | 170.30 | 131.93 | 5.45 | 37.43 |
| Example 53-3 | 4.2 | 102.53 | 131.83 | 4.83 | 48.25 |
| Comparison Example 16-1 | 0 | 207.97 | 131.11 | 4.90 | 43.67 |
| Comparison Example 18-1 | 1.4 | 189.73 | 131.86 | 3.10 | 10.95 |
| Comparison Example 18-2 | 2.8 | 172.88 | 131.76 | 5.17 | 38.30 |
| Comparison Example 18-3 | 4.2 | 102.62 | 131.15 | 4.62 | 47.61 |

Polymerization conditions: ethylene pressure = 0.15 MPa; polymerization time = 1 hr; n-heptane = 70 mL; Cr = 0.5% (wt), V = 0.24% (wt); co-catalyst = TIBA.

Titanium dioxide modified load model is presented in table 12 chrome vanadium double active center of the ethylene/1-hexene catalyzed polymerization activity (Example 38-1, 39, 52, 53, and Comparison Example 16-1, 18). With the increase of dosage of 1-hexene, chrome vanadium titanium dioxide modified load type double active center/1-hexene ethylene copolymerization activity presents the lower trend, combined with the result of ethylene homopolymerization before, showed that ethylene/1-hexene copolymerization activity are lower than the activity of ethylene homopolymerization.

(5) Comparison of Different Preparation of Catalyst

TABLE 13

Comparison of different preparation of catalyst

| Example | cocat. | activity (kg PE/ mol Cr h) | $T_m$ (° C.) | $M_w$ (×10$^5$) | PDI |
|---|---|---|---|---|---|
| Example 39 | TIBA | 232.33 | 131.58 | 4.62 | 46.04 |
| Example 58 | TEA | 185.10 | 132.02 | 3.14 | 10.61 |
| Example 43 | TIBA | 233.68 | 131.86 | 4.28 | 43.19 |
| Example 60 | TEA | 156.18 | 132.31 | 2.93 | 19.32 |

Polymerization conditions: ethylene pressure = 0.15 MPa; polymerization time = 1 hr; n-heptane = 70 mL; Cr = 0.5% (wt)

Table 13 is compared the two kinds of titanium type (impregnation method and sol-gel method) preparation of titanium dioxide modified double active center load type chrome vanadium catalyst of catalytic activity of ethylene homopolymerization. Implementation example of 39, 58 of titanium dioxide prepared catalyst is impregnation method modified silica gel as the carrier, Example 43, 60 of catalyst is based on sol gel method of titanium dioxide modified silica gel as carrier. From the table 13 shows, when to TIBA as cocatalyst, two types of titanium is introduced into the preparation of catalyst for ethylene homopolymerization activity were small; But, when with TEA as cocatalyst, impregnation method for the modification of the load on the chrome vanadium titanium dioxide double ethylene homopolymerization of active center catalyst activity significantly higher than that of using sol-gel method homopolymerization activity of the catalyst.

TABLE 14

Comparison of different preparation of catalyst

| Example | activity (kg PE/ mol Cr h) | $T_m$ (° C.) | $M_w$ (×10$^5$) | PDI |
|---|---|---|---|---|
| Example 39 | 232.33 | 131.58 | 4.62 | 46.04 |
| Example 41 | 198.80 | 131.12 | 4.37 | 43.86 |

Polymerization conditions: ethylene pressure = 0.15 MPa; polymerization time = 1 hr; n-heptane = 70 mL; Cr = 0.5% (wt)

Table 14 is compared the two chrome vanadium load modes (chrome vanadium by dipping on the modification of TiO$_2$ carrier and chrome vanadium were impregnated in the modification of TiO$_2$ carrier) preparation of titanium dioxide modified double active center type load chrome vanadium catalyst of catalytic activity of ethylene homopolymerization. Visible, use the chrome vanadium titanium dioxide modified prepared step by step impregnation method of double active center load type chrome vanadium catalyst ethylene homopolymerization activity is higher than chrome vanadium total immersion of the catalyst prepared by the homopolymerization of activity.

(6) Comparison of Dosage of TiO$_2$

TABLE 15

Comparison of dosage of TiO$_2$

| Example | Al/Cr | activity (kg PE/ mol Cr h) | $T_m$ (° C.) | $M_w$ (×10$^5$) | PDI |
|---|---|---|---|---|---|
| Comparison Example 16-1 | 5 | 207.97 | 131.11 | 4.90 | 43.67 |
| Example 37 | 5 | 203.86 | 131.86 | 6.81 | 44.15 |
| Example 38-1 | 5 | 227.08 | 132.80 | 6.04 | 39.90 |
| Example 39 | 5 | 232.33 | 131.58 | 4.62 | 46.04 |

Polymerization conditions: ethylene pressure = 0.15 MPa; polymerization time = 1 hr; n-heptane = 70 mL; Cr = 0.5% (wt), co-catalyst = TIBA.

Given in table 15 different titanium dioxide content of titanium dioxide modified load type double active center chrome vanadium oxide catalyst polymerization reactivity (Example 37, 38-1, 39 and Comparison Example 16-1). Implementation Example 39 were molecular weight polyethylene products than Comparison Example 16-1 the low molecular weight polyethylene products; Example 37 and practiced by Example 38-1 heaviness in the preparation of polyethylene products molecular weight than Comparison Example 16-1 high molecular weight polyethylene products. This shows that the titanium dioxide is introduced into the catalytic system affect the activity of catalyst center. In addition, the product of PDI is around Example 40, there is no significant change.

(7) Comparison of Hydrogen

TABLE 16

Comparison of hydrogen

| Example | H$_2$ | activity (kg PE/ mol Cr h) | $T_m$ (° C.) | $M_w$ (×10$^5$) | PDI |
|---|---|---|---|---|---|
| Example 37 | 0 | 203.86 | 131.86 | 6.80 | 44.15 |
| Example 54-1 | 10 | 195.83 | 131.70 | 5.01 | 54.72 |
| Example 54-2 | 20 | 190.65 | 132.29 | 3.52 | 14.92 |
| Example 38-1 | 0 | 227.08 | 132.80 | 6.03 | 39.90 |
| Example 55-1 | 10 | 226.59 | 132.09 | 4.96 | 21.84 |
| Example 55-2 | 20 | 187.13 | 132.22 | 3.03 | 35.77 |
| Example 39 | 0 | 232.33 | 131.58 | 4.62 | 46.04 |
| Example 56-1 | 10 | 228.74 | 132.03 | 3.52 | 14.92 |
| Example 56-2 | 20 | 143.23 | 131.91 | 3.44 | 24.76 |
| Comparison Example 16-1 | 0 | 207.97 | 131.11 | 4.90 | 43.67 |
| Comparison Example 19-1 | 10 | 207.45 | 131.18 | 4.16 | 15.46 |
| Comparison Example 19-2 | 20 | 220.52 | 131.20 | 3.39 | 12.56 |

Polymerization conditions: ethylene pressure = 0.15 MPa; polymerization time = 1 hr; n-heptane = 70 mL; Cr = 0.5% (wt); co-catalyst = TIBA.

The load of different titanium dioxide modified double active center type chrome vanadium oxide catalysts of the effects of hydrogen transfer reaction such as shown in table 16 (Example 37, 38-1, 39, 54, 55, 56 and Comparison Example 16-1, 19). Visible, hydrogen after chrome vanadium titanium dioxide modified load type double active center of catalysts of ethylene homopolymerization activity than hydrogen does not exist under the condition of lower, and the molecular weight of polyethylene greatly decreased, and that the hydrogen plays a significant role of chain transfer agent to lower molecular weight polyethylene.

Example 61

Figure 8:
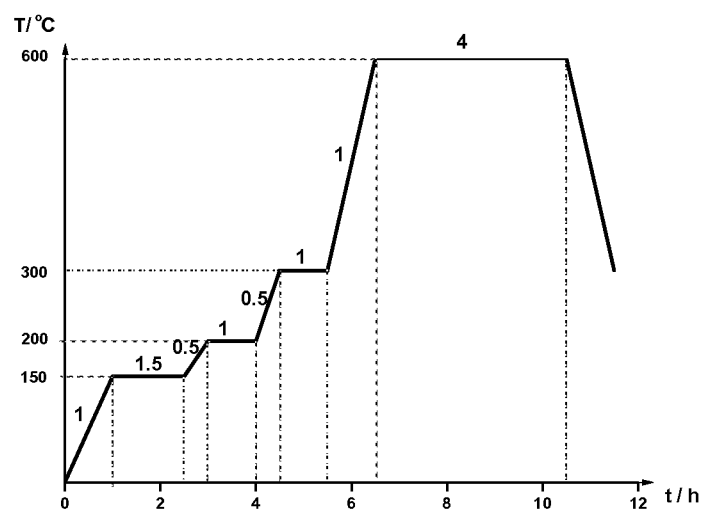
FIG. 8 represents the process of treating the silica gel support or the catalyst precursor.

10 g of silica gel (having a pore volume of 1.5~1.7 cm$^3$/g and a surface area of 250~300 m$^2$/g) was impregnated in an aqueous solution of ammonium fluorosilicate, enabled the F loading (based on the mass of F) to be 1.5%. After being continuously stirred for 4 h, heated to 80° C. for 8 h, the silica gel support supporting the F was high-temperature calcined in a fluidized bed. Then, the silica gel was naturally cooled down under the protection of nitrogen gas to obtain a F modified catalyst precursor. The high temperature calcining and then cooling processes above are shown in FIG. 8. Then it was impregnated in an aqueous solution of ammonium metavanadate, enabled the vanadium loading (based on the mass of V) to be 0.48%. After being continuously stirred for 4 h, heated to 120° C. and dried in air for 4 h, it was high-temperature calcined in a fluidized bed. Finally, it was naturally cooled down under the protection of nitrogen gas. After that it was impregnated in an aqueous solution of alkali type chromium acetate, enabled the chromium loading (based on the mass of Cr) to be 1%. After being continuously stirred for 4 h, heated to 120° C. and dried in air for 4 h, it was high-temperature calcined in a fluidized bed. Finally, it was naturally cooled down under the protection of nitrogen gas.

Example 62

10 g of silica gel (having a pore volume of 1.5~1.7 cm$^3$/g and a surface area of 250~300 m$^2$/g) was impregnated in an aqueous solution of ammonium fluorosilicate, enabled the F loading (based on the mass of F) to be 0.75%. After being continuously stirred for 4 h, heated to 80° C. for 8 h, the silica gel support supporting the F was high-temperature calcined in a fluidized bed. Then, the silica gel was naturally cooled down under the protection of nitrogen gas to obtain a F modified catalyst precursor. The high temperature calcining and then cooling processes above are shown in FIG. 8. Then it was impregnated in an aqueous solution of ammonium metavanadate, enabled the vanadium loading (based on the mass of V) to be 0.48%. After being continuously stirred for 4 h, heated to 120° C. and dried in air for 4 h, it was high-temperature calcined in a fluidized bed. Finally, it was naturally cooled down under the protection of nitrogen gas. After that it was impregnated in an aqueous solution of alkali type chromium acetate, enabled the chromium loading (based on the mass of Cr) to be 1%. After being continuously stirred for 4 h, heated to 120° C. and dried in air for 4 h, it was high-temperature calcined in a fluidized bed. Finally, it was naturally cooled down under the protection of nitrogen gas.

Example 63

10 g of silica gel (having a pore volume of 1.5~1.7 cm$^3$/g and a surface area of 250~300 m$^2$/g) was impregnated in an aqueous solution of ammonium fluorosilicate, enabled the F loading (based on the mass of F) to be 1.5%. After being continuously stirred for 4 h, heated to 80° C. for 8 h, the silica gel support supporting the F was high-temperature calcined in a fluidized bed. Then, the silica gel was naturally cooled down under the protection of nitrogen gas to obtain a F modified catalyst precursor. The high temperature calcining and then cooling processes above are shown in FIG. 8. Then it was impregnated in an aqueous solution of ammonium metavanadate and alkali type chromium acetate, enabled the V and Cr loading (based on the mass of V and Cr) to be 0.48% and 1%. After being continuously stirred for 4 h, heated to 120° C. and dried in air for 4 h, it was high-temperature calcined in a fluidized bed. Finally, it was naturally cooled down under the protection of nitrogen gas.

Example 64

10 g of silica gel (having a pore volume of 1.5~1.7 cm$^3$/g and a surface area of 250~300 m$^2$/g) was impregnated in an aqueous solution of ammonium fluorosilicate, enabled the F loading (based on the mass of F) to be 1.5%. After being continuously stirred for 4 h, heated to 80° C. for 8 h, the silica gel support supporting the F was high-temperature calcined in a fluidized bed. Then, the silica gel was naturally cooled down under the protection of nitrogen gas to obtain a F modified catalyst precursor. The high temperature calcining and then cooling processes above are shown in FIG. 8. Then it was impregnated in an aqueous solution of vanadyl oxalate, enabled the vanadium loading (based on the mass of V) to be 0.48%. After being continuously stirred for 4 h, heated to 120° C. and dried in air for 4 h, it was high-temperature calcined in a fluidized bed. Finally, it was naturally cooled down under the protection of nitrogen gas. After that it was impregnated in an aqueous solution of CrO$_3$, enabled the chromium loading (based on the mass of Cr) to be 1%. After being continuously stirred for 4 h, heated to 120° C. and dried in air for 4 h, it was high-temperature calcined in a fluidized bed. Finally, it was naturally cooled down under the protection of nitrogen gas.

Example 65

10 g of silica gel (having a pore volume of 1.5~1.7 cm$^3$/g and a surface area of 250~300 m$^2$/g) was impregnated in an aqueous solution of ammonium fluorosilicate, enabled the F loading (based on the mass of F) to be 1.5%. After being continuously stirred for 4 h, heated to 80° C. for 8 h, the silica gel support supporting the F was high-temperature calcined in a fluidized bed. Then, the silica gel was naturally cooled down under the protection of nitrogen gas to obtain a F modified catalyst precursor. The high temperature calcining and then cooling processes above are shown in FIG. 8. After that it was impregnated in an aqueous solution of alkali type chromium acetate, enabled the chromium loading (based on the mass of Cr) to be 1%. After being continuously stirred for 4 h, heated to 120° C. and dried in air for 4 h, it was high-temperature calcined in a fluidized bed. Finally, it was naturally cooled down under the protection of nitrogen gas. Then it was impregnated in an aqueous solution of ammonium metavanadate, enabled the vanadium loading (based on the mass of V) to be 0.48%. After being continuously stirred for 4 h, heated to 120° C. and dried in air for 4 h, it was high-temperature calcined in a fluidized bed. Finally, it was naturally cooled down under the protection of nitrogen gas.

Example 66

10 g of silica gel (having a pore volume of 1.5~1.7 cm$^3$/g and a surface area of 250~300 m$^2$/g) was impregnated in an aqueous solution of ammonium fluorosilicate and vanadyl oxalate, enabled the F and V loading (based on the mass of F and V) to be 1.5% and 0.48%. After being continuously stirred for 4 h, heated to 80° C. and dried in air for 8 h, the silica gel support supporting the Ti was high-temperature calcined in a fluidized bed. Then, the silica gel was naturally cooled down under the protection of nitrogen gas to obtain a F and V modified catalyst precursor. The high temperature calcining and then cooling processes above are shown in FIG. 8. Then it was impregnated in an aqueous solution of alkali type chromium acetate at 40° C., enabled the Cr loading (based on the mass of Cr) to be 1%. After being continuously stirred for 4 h, heated to 120° C. and dried in air for 4 h, it was high-temperature calcined in a fluidized bed. Finally, it was naturally cooled down under the protection of nitrogen gas.

Example 67

10 g of silica gel (having a pore volume of 1.5~1.7 cm$^3$/g and a surface area of 250~300 m$^2$/g) was impregnated in a aqueous solution of NH$_4$F and CrO$_3$, enabled the F and Cr loading (based on the mass of F and Cr) to be 1.5% and 1%. After being continuously stirred for 4 h, heated to 80° C. and dried in air for 8 h, the silica gel support supporting the F and Cr was high-temperature calcined in a fluidized bed. Then, the silica gel was naturally cooled down under the protection of nitrogen gas to obtain a Ti and Cr modified catalyst precursor. The high temperature calcining and then cooling processes above are shown in FIG. 8. Then it was impregnated in an aqueous solution of vanadyl oxalate at 40° C., enabled the V loading (based on the mass of V) to be 0.48%. After being continuously stirred for 4 h, heated to 120° C. and dried in air for 4 h, it was high-temperature calcined in a fluidized bed. Finally, it was naturally cooled down under the protection of nitrogen gas.

Example 68

10 g of silica gel (having a pore volume of 1.5~1.7 cm$^3$/g and a surface area of 250~300 m$^2$/g) was impregnated in an aqueous solution of ammonium fluorosilicate, alkali type chromium acetate and ammonium metavanadate, enabled the F, V and Cr loading (based on the mass of F, V and Cr) to be 1.5%, 0.48% and 1%. After being continuously stirred for 4 h, heated to 80° C. and dried in air for 8 h, it was high-temperature calcined in a fluidized bed. Finally, it was naturally cooled down under the protection of nitrogen gas.

Example 69

10 g of silica gel (having a pore volume of 1.5~1.7 cm$^3$/g and a surface area of 250~300 m$^2$/g) was impregnated in an aqueous solution of ammonium fluorosilicate, enabled the F loading (based on the mass of F) to be 1.5%. After being continuously stirred for 4 h, heated to 80° C. for 8 h, the silica gel support supporting the F was high-temperature calcined in a fluidized bed. Then, the silica gel was naturally cooled down under the protection of nitrogen gas to obtain a F modified catalyst precursor. The high temperature calcining and then cooling processes above are shown in FIG. 8. Then it was impregnated in an aqueous solution of (acac)$_2$V, enabled the vanadium loading (based on the mass of V) to be 0.48%. After being continuously stirred for 4 h, heated to 120° C. and dried in air for 4 h, it was high-temperature calcined in a fluidized bed. Finally, it was naturally cooled down under the protection of nitrogen gas. After that it was impregnated in an aqueous solution of CrO$_3$, enabled the chromium loading (based on the mass of Cr) to be 1%. After being continuously stirred for 4 h, heated to 120° C. and dried in air for 4 h, it was high-temperature calcined in a fluidized bed. Finally, it was naturally cooled down under the protection of nitrogen gas. Then used organometallic co-catalysts MAO to pre-reduction the catalyst precursor, the concentration of co-catalyst was 1.0 mmol/mL. Finally drying at 100° C. for 4 h, the drying is conducted under an inert gas atmosphere.

Example 70

160 mg of the catalyst in Example 61 was weighed for the polymerization respectively. The polymerization reaction kettle was firstly heated (100° C.) under vacuum, and then replaced with highly pure nitrogen, which was repeated for three times. Then a small amount of monomeric ethylene was used to replace once. Finally, the reaction kettle was filled with ethylene to a slight positive pressure (0.12 MPa). The polymerization temperature was maintained at 85° C. Into the reaction kettle were added in turn about 70 mL of a refined heptane treated by dehydration and deoxidation as solvent and TIBA as co-catalyst respectively, wherein the co-catalyst had a concentration of 1.0 mmol/mL (n-hexane solution) and Al/Cr (molar ratio)=2.5. Finally the pressure of ethylene in the kettle was raised to 0.15 MPa and the catalyst was added to start the polymerization. The instantaneous consumption of monomeric ethylene was on-line collected (by the high-precision ethylene mass flow meter connecting with a computer) during the reaction and recorded by the computer. After the reaction was conducted at 85° C. for 1 h, a mixed solution of hydrochloric acid/ethanol was added to terminate the reaction, and the polymer was vacuum dried, weighed and analyzed.

Example 71

160 mg of the catalyst in Example 62 was weighed for the polymerization respectively. The polymerization reaction kettle was firstly heated (100° C.) under vacuum, and then replaced with highly pure nitrogen, which was repeated for three times. Then a small amount of monomeric ethylene was used to replace once. Finally, the reaction kettle was filled with ethylene to a slight positive pressure (0.12 MPa). The polymerization temperature was maintained at 85° C. Into the reaction kettle were added in turn about 70 mL of a refined heptane treated by dehydration and deoxidation as solvent and TIBA as co-catalyst respectively, wherein the co-catalyst had a concentration of 1.0 mmol/mL (n-hexane solution) and Al/Cr (molar ratio)=2.5. Finally the pressure of ethylene in the kettle was raised to 0.15 MPa and the catalyst was added to start the polymerization. The instantaneous consumption of monomeric ethylene was on-line collected (by the high-precision ethylene mass flow meter connecting with a computer) during the reaction and recorded by the computer. After the reaction was conducted at 85° C. for 1 h, a mixed solution of hydrochloric acid/ethanol was added to terminate the reaction, and the polymer was vacuum dried, weighed and analyzed.

Example 72

160 mg of the catalyst in Example 63 was weighed for the polymerization respectively. The polymerization reaction kettle was firstly heated (100° C.) under vacuum, and then replaced with highly pure nitrogen, which was repeated for three times. Then a small amount of monomeric ethylene was used to replace once. Finally, the reaction kettle was filled with ethylene to a slight positive pressure (0.12 MPa). The polymerization temperature was maintained at 85° C. Into the reaction kettle were added in turn about 70 mL of a refined heptane treated by dehydration and deoxidation as solvent and TIBA as co-catalyst respectively, wherein the co-catalyst had a concentration of 1.0 mmol/mL (n-hexane solution) and Al/Cr (molar ratio)=2.5. Finally the pressure of ethylene in the kettle was raised to 0.15 MPa and the catalyst was added to start the polymerization. The instantaneous consumption of monomeric ethylene was on-line collected (by the high-precision ethylene mass flow meter connecting with a computer) during the reaction and recorded by the computer. After the reaction was conducted at 85° C. for 1 h, a mixed solution of hydrochloric acid/ethanol was added to terminate the reaction, and the polymer was vacuum dried, weighed and analyzed.

Example 73

160 mg of the catalyst in Example 64 was weighed for the polymerization respectively. The polymerization reaction kettle was firstly heated (100° C.) under vacuum, and then replaced with highly pure nitrogen, which was repeated for three times. Then a small amount of monomeric ethylene was used to replace once. Finally, the reaction kettle was filled with ethylene to a slight positive pressure (0.12 MPa). The polymerization temperature was maintained at 85° C. Into the reaction kettle were added in turn about 70 mL of a refined heptane treated by dehydration and deoxidation as solvent and TIBA as co-catalyst respectively, wherein the co-catalyst had a concentration of 1.0 mmol/mL (n-hexane solution) and Al/Cr (molar ratio)=2.5. Finally the pressure of ethylene in the kettle was raised to 0.15 MPa and the catalyst was added to start the polymerization. The instantaneous consumption of monomeric ethylene was on-line collected (by the high-precision ethylene mass flow meter connecting with a computer) during the reaction and recorded by the computer. After the reaction was conducted at 85° C. for 1 h, a mixed solution of hydrochloric acid/ethanol was added to terminate the reaction, and the polymer was vacuum dried, weighed and analyzed.

Example 74

160 mg of the catalyst in Example 65 was weighed for the polymerization respectively. The polymerization reaction kettle was firstly heated (100° C.) under vacuum, and then replaced with highly pure nitrogen, which was repeated for three times. Then a small amount of monomeric ethylene was used to replace once. Finally, the reaction kettle was filled with ethylene to a slight positive pressure (0.12 MPa). The polymerization temperature was maintained at 85° C. Into the reaction kettle were added in turn about 70 mL of a refined heptane treated by dehydration and deoxidation as solvent and TIBA as co-catalyst respectively, wherein the co-catalyst had a concentration of 1.0 mmol/mL (n-hexane solution) and Al/Cr (molar ratio)=2.5. Finally the pressure of ethylene in the kettle was raised to 0.15 MPa and the catalyst was added to start the polymerization. The instantaneous consumption of monomeric ethylene was on-line collected (by the high-precision ethylene mass flow meter connecting with a computer) during the reaction and recorded by the computer. After the reaction was conducted at 85° C. for 1 h, a mixed solution of hydrochloric acid/ethanol was added to terminate the reaction, and the polymer was vacuum dried, weighed and analyzed.

Example 75

160 mg of the catalyst in Example 66 was weighed for the polymerization respectively. The polymerization reaction kettle was firstly heated (100° C.) under vacuum, and then replaced with highly pure nitrogen, which was repeated for three times. Then a small amount of monomeric ethylene was used to replace once. Finally, the reaction kettle was filled with ethylene to a slight positive pressure (0.12 MPa). The polymerization temperature was maintained at 85° C. Into the reaction kettle were added in turn about 70 mL of a refined heptane treated by dehydration and deoxidation as solvent and TIBA as co-catalyst respectively, wherein the co-catalyst had a concentration of 1.0 mmol/mL (n-hexane solution) and Al/Cr (molar ratio)=2.5. Finally the pressure of ethylene in the kettle was raised to 0.15 MPa and the catalyst was added to start the polymerization. The instantaneous consumption of monomeric ethylene was on-line collected (by the high-precision ethylene mass flow meter connecting with a computer) during the reaction and recorded by the computer. After the reaction was conducted at 85° C. for 1 h, a mixed solution of hydrochloric acid/ethanol was added to terminate the reaction, and the polymer was vacuum dried, weighed and analyzed.

Example 76

160 mg of the catalyst in Example 68 was weighed for the polymerization respectively. The polymerization reaction kettle was firstly heated (100° C.) under vacuum, and then replaced with highly pure nitrogen, which was repeated for three times. Then a small amount of monomeric ethylene was used to replace once. Finally, the reaction kettle was filled with ethylene to a slight positive pressure (0.12 MPa). The polymerization temperature was maintained at 85° C. Into the reaction kettle were added in turn about 70 mL of a refined heptane treated by dehydration and deoxidation as solvent and TIBA as co-catalyst respectively, wherein the co-catalyst had a concentration of 1.0 mmol/mL (n-hexane solution) and Al/Cr (molar ratio)=2.5, 5, 10, 15, 20, (Example 76-1, 76-2, 76-3, 76-4, 76-5). Finally the pressure of ethylene in the kettle was raised to 0.15 MPa and the catalyst was added to start the polymerization. The instantaneous consumption of monomeric ethylene was on-line collected (by the high-precision ethylene mass flow meter connecting with a computer) during the reaction and recorded by the computer. After the reaction was conducted at 85° C. for 1 h, a mixed solution of hydrochloric acid/ethanol was added to terminate the reaction, and the polymer was vacuum dried, weighed and analyzed.

Example 77

160 mg of the catalyst in Example 67 was weighed for the polymerization respectively. The polymerization reaction kettle was firstly heated (100° C.) under vacuum, and then replaced with highly pure nitrogen, which was repeated for three times. Then a small amount of monomeric ethylene was used to replace once. Finally, the reaction kettle was filled with ethylene to a slight positive pressure (0.12 MPa). The polymerization temperature was maintained at 85° C. Into the reaction kettle were added in turn about 70 mL of a refined heptane treated by dehydration and deoxidation as solvent and TIBA as co-catalyst respectively, wherein the co-catalyst had a concentration of 1.0 mmol/mL (n-hexane solution) and Al/Cr (molar ratio)=2.5. Finally the pressure of ethylene in the kettle was raised to 0.15 MPa and the catalyst was added to start the polymerization. The instantaneous consumption of monomeric ethylene was on-line collected (by the high-precision ethylene mass flow meter connecting with a computer) during the reaction and recorded by the computer. After the reaction was conducted at 85° C. for 1 h, a mixed solution of hydrochloric acid/ethanol was added to terminate the reaction, and the polymer was vacuum dried, weighed and analyzed.

Example 78

160 mg of the catalyst in Example 69 was weighed for the polymerization respectively. The polymerization reaction kettle was firstly heated (100° C.) under vacuum, and then replaced with highly pure nitrogen, which was repeated for three times. Then a small amount of monomeric ethylene was used to replace once. Finally, the reaction kettle was filled with ethylene to a slight positive pressure (0.12 MPa). The polymerization temperature was maintained at 85° C. Into the reaction kettle were added in turn about 70 mL of a refined heptane treated by dehydration and deoxidation as solvent. Finally the pressure of ethylene in the kettle was raised to 0.15 MPa and the catalyst was added to start the polymerization. The instantaneous consumption of monomeric ethylene was on-line collected (by the high-precision ethylene mass flow meter connecting with a computer) during the reaction and recorded by the computer. After the reaction was conducted at 85° C. for 1 h, a mixed solution of hydrochloric acid/ethanol was added to terminate the reaction, and the polymer was vacuum dried, weighed and analyzed.

Example 79

160 mg of the catalyst in Example 67 was weighed for the polymerization respectively. The polymerization reaction kettle was firstly heated (100° C.) under vacuum, and then replaced with highly pure nitrogen, which was repeated for three times. Then a small amount of monomeric ethylene was used to replace once. Finally, the reaction kettle was filled with ethylene to a slight positive pressure (0.12 MPa). Into the reaction kettle were added in turn about 70 ml of a refined heptane treated by dehydration and deoxidation as solvent, a refined hexene treated by dehydration and deoxidation as comonomer and TIBA as co-catalyst respectively, wherein the co-catalyst had a concentration of 1.0 mmol/mL (n-hexane solution) and Al/Cr (molar ratio)=2.5. The amount of 1-hexene was respectively 0.7 mL, 2.1 mL, and 3.5 mL, i.e. the volume ratio of 1-hexene and the solvent used for polymerization being 21 vol % (Example 79-1), 3 vol % (Example 79-2) and 5 vol % (Example 79-3). Finally the pressure of ethylene in the kettle was raised to 0.15 MPa and the catalyst was added to start the polymerization. The instantaneous consumption of monomeric ethylene was on-line collected (by the high-precision ethylene mass flow meter connecting with a computer) during the reaction and recorded by the computer. After the reaction was conducted at 85° C. for 1 h, a mixed solution of hydrochloric acid/ethanol was added to terminate the reaction, and the polymer was vacuum dried, weighed and analyzed.

Example 80

160 mg of the catalyst in Example 67 was weighed for the polymerization respectively. The polymerization reaction kettle was firstly heated under vacuum, and then replaced with highly pure nitrogen, which was repeated for three times. Then a small amount of monomeric ethylene was used to replace once. Finally, the reaction kettle was filled with ethylene to a slight positive pressure (0.12 MPa). Into the reaction kettle were added in turn about 70 ml of a refined heptane treated by dehydration and deoxidation as solvent, 10 mL and 20 mL hydrogen (Example 80-1, 80-2) and TIBA as co-catalyst respectively, wherein the co-catalyst had a concentration of 1.0 mmol/mL (n-hexane solution) and Al/Cr (molar ratio)=2.5. Finally the pressure of ethylene in the kettle was raised to 0.15 MPa and the catalyst was added to start the polymerization. The instantaneous consumption of monomeric ethylene was on-line collected (by the high-precision ethylene mass flow meter connecting with a computer) during the reaction and recorded by the computer. After the reaction was conducted at 85° C. for 1 h, a mixed solution of hydrochloric acid/ethanol was added to terminate the reaction, and the polymer was vacuum dried, weighed and analyzed.

Example 81

160 mg of the catalyst in Example 62 was weighed for the polymerization respectively. The polymerization reaction kettle was firstly heated under vacuum, and then replaced with highly pure nitrogen, which was repeated for three times. Then a small amount of monomeric ethylene was used to replace once. Finally, the reaction kettle was filled with ethylene to a slight positive pressure (0.12 MPa). Into the reaction kettle were added in turn about 70 ml of a refined heptane treated by dehydration and deoxidation as solvent, 10 mL and 20 mL hydrogen (Example 81-1, 81-2) and TIBA as co-catalyst respectively, wherein the co-catalyst had a concentration of 1.0 mmol/mL (n-hexane solution) and Al/Cr (molar ratio)=2.5. Finally the pressure of ethylene in the kettle was raised to 0.15 MPa and the catalyst was added to start the polymerization. The instantaneous consumption of monomeric ethylene was on-line collected (by the high-precision ethylene mass flow meter connecting with a computer) during the reaction and recorded by the computer. After the reaction was conducted at 85° C. for 1 h, a mixed solution of hydrochloric acid/ethanol was added to terminate the reaction, and the polymer was vacuum dried, weighed and analyzed.

Example 82

160 mg of the catalyst in Example 63 was weighed for the polymerization respectively. The polymerization reaction kettle was firstly heated under vacuum, and then replaced with highly pure nitrogen, which was repeated for three times. Then a small amount of monomeric ethylene was used to replace once. Finally, the reaction kettle was filled with ethylene to a slight positive pressure (0.12 MPa). Into the reaction kettle were added in turn about 70 ml of a refined heptane treated by dehydration and deoxidation as solvent, 10 mL and 20 mL hydrogen (Example 82-1, 82-2) and TIBA as co-catalyst respectively, wherein the co-catalyst had a concentration of 1.0 mmol/mL (n-hexane solution) and Al/Cr (molar ratio)=2.5. Finally the pressure of ethylene in the kettle was raised to 0.15 MPa and the catalyst was added to start the polymerization. The instantaneous consumption of monomeric ethylene was on-line collected (by the high-precision ethylene mass flow meter connecting with a computer) during the reaction and recorded by the computer. After the reaction was conducted at 85° C. for 1 h, a mixed solution of hydrochloric acid/ethanol was added to terminate the reaction, and the polymer was vacuum dried, weighed and analyzed.

Example 83

160 mg of the catalyst in Example 67 was weighed for the polymerization respectively. The polymerization reaction kettle was firstly heated under vacuum, and then replaced with highly pure nitrogen, which was repeated for three times. Then a small amount of monomeric ethylene was used to replace once. Finally, the reaction kettle was filled with ethylene to a slight positive pressure (0.12 MPa). Into the reaction kettle were added in turn about 70 ml of a refined heptane treated by dehydration and deoxidation as solvent and TIBA as co-catalyst respectively, wherein the co-catalyst had a concentration of 1.0 mmol/mL (n-hexane solution) and Al/Cr (molar ratio)=10. Finally the pressure of ethylene in the kettle was raised to 0.15 MPa and the catalyst was added to start the polymerization. The instantaneous consumption of monomeric ethylene was on-line collected (by the high-precision ethylene mass flow meter connecting with a computer) during the reaction and recorded by the computer. After the reaction was conducted at 45° C. and 65° C. for 1 h (Example 83-1, 83-2), a mixed solution of hydrochloric acid/ethanol was added to terminate the reaction, and the polymer was vacuum dried, weighed and analyzed.

Example 84

160 mg of the catalyst in Example 63 was weighed for the polymerization respectively. The polymerization reaction kettle was firstly heated (100° C.) under vacuum, and then replaced with highly pure nitrogen, which was repeated for three times. Then a small amount of monomeric ethylene was used to replace once. Finally, the reaction kettle was filled with ethylene to a slight positive pressure (0.12 MPa). The polymerization temperature was maintained at 85° C. Into the reaction kettle were added in turn about 70 mL of a refined heptane treated by dehydration and deoxidation as solvent and TEA as co-catalyst respectively, wherein the co-catalyst had a concentration of 1.0 mmol/mL (n-hexane solution) and Al/Cr (molar ratio)=2.5. Finally the pressure of ethylene in the kettle was raised to 0.15 MPa and the catalyst was added to start the polymerization. The instantaneous consumption of monomeric ethylene was on-line collected (by the high-precision ethylene mass flow meter connecting with a computer) during the reaction and recorded by the computer. After the reaction was conducted at 85° C. for 1 h, a mixed solution of hydrochloric acid/ethanol was added to terminate the reaction, and the polymer was vacuum dried, weighed and analyzed.

Example 85

160 mg of the catalyst in Example 62 was weighed for the polymerization respectively. The polymerization reaction kettle was firstly heated (100° C.) under vacuum, and then replaced with highly pure nitrogen, which was repeated for three times. Then a small amount of monomeric ethylene was used to replace once. Finally, the reaction kettle was filled with ethylene to a slight positive pressure (0.12 MPa). The polymerization temperature was maintained at 85° C. Into the reaction kettle were added in turn about 70 mL of a refined heptane treated by dehydration and deoxidation as solvent. Finally the pressure of ethylene in the kettle was raised to 0.15 MPa and the catalyst was added to start the polymerization. The instantaneous consumption of monomeric ethylene was on-line collected (by the high-precision ethylene mass flow meter connecting with a computer) during the reaction and recorded by the computer. After the reaction was conducted at 85° C. for 1 h, a mixed solution of hydrochloric acid/ethanol was added to terminate the reaction, and the polymer was vacuum dried, weighed and analyzed.

Example 86

160 mg of the catalyst in Example 67 was weighed for the polymerization respectively. The polymerization reaction kettle was firstly heated (100° C.) under vacuum, and then replaced with highly pure nitrogen, which was repeated for three times. Then a small amount of monomeric ethylene was used to replace once. Finally, the reaction kettle was filled with ethylene to a slight positive pressure (0.12 MPa). The polymerization temperature was maintained at 85° C. Into the reaction kettle were added in turn about 70 mL of a refined heptane treated by dehydration and deoxidation as solvent and TEA as co-catalyst respectively, wherein the co-catalyst had a concentration of 1.0 mmol/mL (n-hexane solution) and Al/Cr (molar ratio)=2.5. Finally the pressure of ethylene in the kettle was raised to 0.15 MPa and the catalyst was added to start the polymerization. The instantaneous consumption of monomeric ethylene was on-line collected (by the high-precision ethylene mass flow meter connecting with a computer) during the reaction and recorded by the computer. After the reaction was conducted at 85° C. for 1 h, a mixed solution of hydrochloric acid/ethanol was added to terminate the reaction, and the polymer was vacuum dried, weighed and analyzed.

Comparison Example 22

10 g of silica gel (having a pore volume of 1.5~1.7 $cm^3/g$ and a surface area of 250~300 $m^2/g$) was impregnated in an aqueous solution of ammonium metavanadate at 45° C., enabled the vanadium loading (based on the mass of V) to be 0.48%. After being continuously stirred for 5 h, heated to 120° C. and dried in air for 6 h, it was high-temperature calcined in a fluidized bed in 450° C. Finally, it was naturally cooled down under the protection of nitrogen gas to obtain a vanadium supported catalyst precursor. The high temperature calcining and then cooling processes above are shown in FIG. 1. Then it was impregnated in an aqueous solution of alkali type chromium acetate, enabled the chromium loading (based on the mass of Cr) to be 1%. After being continuously stirred for 4 h, heated to 120° C. and dried in air for 4 h, it was high-temperature calcined in a fluidized bed. Finally, it was naturally cooled down under the protection of nitrogen gas.

Comparison Example 23

10 g of silica gel (having a pore volume of 1.5~1.7 $cm^3/g$ and a surface area of 250~300 $m^2/g$) was impregnated in an aqueous solution of ammonium fluorosilicate, enabled the F loading (based on the mass of F) to be 1.5%. After being continuously stirred for 4 h, heated to 80° C. for 8 h, the silica gel support supporting the F was high-temperature calcined in a fluidized bed. Then, the silica gel was naturally cooled down under the protection of nitrogen gas to obtain a F modified catalyst precursor. The high temperature calcining and then cooling processes above are shown in FIG. 8. After that it was impregnated in an aqueous solution of alkali type chromium acetate, enabled the chromium loading (based on the mass of Cr) to be 1%. After being continuously stirred for 4 h, heated to 120° C. and dried in air for 4 h, it was high-temperature calcined in a fluidized bed. Finally, it was naturally cooled down under the protection of nitrogen gas.

Comparison Example 24

10 g of silica gel (having a pore volume of 1.5~1.7 cm$^3$/g and a surface area of 250~300 m$^2$/g) was impregnated in an aqueous solution of alkali type chromium acetate, enabled the chromium loading (based on the mass of Cr) to be 1%. After being continuously stirred for 4 h, heated to 120° C. and dried in air for 4 h, it was high-temperature calcined in a fluidized bed. Finally, it was naturally cooled down under the protection of nitrogen gas.

Comparison Example 25

20 g of silica gel (having a pore volume of 1.5~1.7 cm$^3$/g and a surface area of 250~300 m$^2$/g) was impregnated in an aqueous solution of ammonium fluorosilicate, enabled the F loading (based on the mass of F) to be 1.5%. After being continuously stirred for 4 h, heated to 80° C. for 8 h, the silica gel support supporting the F was high-temperature calcined in a fluidized bed. Then, the silica gel was naturally cooled down under the protection of nitrogen gas to obtain a F modified catalyst precursor. The high temperature calcining and then cooling processes above are shown in FIG. 8. Then 10 g of it was impregnated in an aqueous solution of ammonium dichromate, enabled the Cr loading (based on the mass of Cr) to be 2%. After being continuously stirred for 4 h, heated to 120° C. and dried in air for 6 h, it was high-temperature calcined in a fluidized bed. Finally, it was naturally cooled down under the protection of nitrogen gas. Then another 10 g of it was impregnated in an aqueous solution of vanadyl oxalate, enabled the V loading (based on the mass of V) to be 0.96%. After being continuously stirred for 4 h, heated to 120° C. and dried in air for 6 h, it was high-temperature calcined in a fluidized bed. Finally, it was naturally cooled down under the protection of nitrogen gas. Mix the catalyst produced above as the Cr/V=2:1 to obtain a mixture catalyst.

Comparison Example 26

160 mg of the catalyst in Comparison Example 22 was weighed for the polymerization respectively. The polymerization reaction kettle was firstly heated (100° C.) under vacuum, and then replaced with highly pure nitrogen, which was repeated for three times. Then a small amount of monomeric ethylene was used to replace once. Finally, the reaction kettle was filled with ethylene to a slight positive pressure (0.12 MPa). The polymerization temperature was maintained at 85° C. Into the reaction kettle were added in turn about 70 mL of a refined heptane treated by dehydration and deoxidation as solvent and TIBA as co-catalyst respectively, wherein the co-catalyst had a concentration of 1.0 mmol/mL (n-hexane solution) and Al/Cr (molar ratio)=2.5, 5, 10, 15, 20 (Comparison Example 26-1, 26-2, 26-3, 26-4, 26-5). Finally the pressure of ethylene in the kettle was raised to 0.15 MPa and the catalyst was added to start the polymerization. The instantaneous consumption of monomeric ethylene was on-line collected (by the high-precision ethylene mass flow meter connecting with a computer) during the reaction and recorded by the computer. After the reaction was conducted at 85° C. for 1 h, a mixed solution of hydrochloric acid/ethanol was added to terminate the reaction, and the polymer was vacuum dried, weighed and analyzed.

Comparison Example 27

160 mg of the catalyst in Comparison Example 23 was weighed for the polymerization respectively. The polymerization reaction kettle was firstly heated (100° C.) under vacuum, and then replaced with highly pure nitrogen, which was repeated for three times. Then a small amount of monomeric ethylene was used to replace once. Finally, the reaction kettle was filled with ethylene to a slight positive pressure (0.12 MPa). The polymerization temperature was maintained at 85° C. Into the reaction kettle were added in turn about 70 mL of a refined heptane treated by dehydration and deoxidation as solvent and TIBA as co-catalyst respectively, wherein the co-catalyst had a concentration of 1.0 mmol/mL (n-hexane solution) and Al/Cr (molar ratio)=2.5, 5, 10, 15, 20 (Comparison Example 27-1, 27-2, 27-3, 27-4, 27-5). Finally the pressure of ethylene in the kettle was raised to 0.15 MPa and the catalyst was added to start the polymerization. The instantaneous consumption of monomeric ethylene was on-line collected (by the high-precision ethylene mass flow meter connecting with a computer) during the reaction and recorded by the computer. After the reaction was conducted at 85° C. for 1 h, a mixed solution of hydrochloric acid/ethanol was added to terminate the reaction, and the polymer was vacuum dried, weighed and analyzed.

Comparison Example 28

160 mg of the catalyst in Comparison Example 24 was weighed for the polymerization respectively. The polymerization reaction kettle was firstly heated (100° C.) under vacuum, and then replaced with highly pure nitrogen, which was repeated for three times. Then a small amount of monomeric ethylene was used to replace once. Finally, the reaction kettle was filled with ethylene to a slight positive pressure (0.12 MPa). The polymerization temperature was maintained at 85° C. Into the reaction kettle were added in turn about 70 mL of a refined heptane treated by dehydration and deoxidation as solvent and TIBA as co-catalyst respectively, wherein the co-catalyst had a concentration of 1.0 mmol/mL (n-hexane solution) and Al/Cr (molar ratio)=2.5, 5, 10, 15, 20 (Comparison Example 28-1, 28-2, 28-3, 28-4, 28-5). Finally the pressure of ethylene in the kettle was raised to 0.15 MPa and the catalyst was added to start the polymerization. The instantaneous consumption of monomeric ethylene was on-line collected (by the high-precision ethylene mass flow meter connecting with a computer) during the reaction and recorded by the computer. After the reaction was conducted at 85° C. for 1 h, a mixed solution of hydrochloric acid/ethanol was added to terminate the reaction, and the polymer was vacuum dried, weighed and analyzed.

Comparison Example 29

160 mg of the catalyst in Comparison Example 22 was weighed for the polymerization respectively. The polymerization reaction kettle was firstly heated (100° C.) under vacuum, and then replaced with highly pure nitrogen, which was repeated for three times. Then a small amount of monomeric ethylene was used to replace once. Finally, the reaction kettle was filled with ethylene to a slight positive pressure (0.12 MPa). Into the reaction kettle were added in turn about 70 ml of a refined heptane treated by dehydration and deoxidation as solvent, a refined hexene treated by dehydration and deoxidation as comonomer and TIBA as co-catalyst respectively, wherein the co-catalyst had a concentration of 1.0 mmol/mL (n-hexane solution) and Al/Cr (molar ratio)=2.5. The amount of 1-hexene was respectively 0.7 mL and 2.1 mL, the volume ratio of 1-hexene and the solvent used for polymerization being 1 vol % (Comparison Example 29-1) and 3 vol % (Comparison Example 29-2). Finally the pressure of ethylene in the kettle was raised to 0.15 MPa and the catalyst was added to start the polymerization. The instantaneous consumption of monomeric ethylene was on-line collected (by the high-precision ethylene mass flow meter connecting with a computer) during the reaction and recorded by the computer. After the reaction was conducted at 85° C. for 1 h, a mixed solution of hydrochloric acid/ethanol was added to terminate the reaction, and the polymer was vacuum dried, weighed and analyzed.

Comparison Example 30

160 mg of the catalyst in Comparison Example 24 was weighed for the polymerization respectively. The polymerization reaction kettle was firstly heated (100° C.) under vacuum, and then replaced with highly pure nitrogen, which was repeated for three times. Then a small amount of monomeric ethylene was used to replace once. Finally, the reaction kettle was filled with ethylene to a slight positive pressure (0.12 MPa). Into the reaction kettle were added in turn about 70 ml of a refined heptane treated by dehydration and deoxidation as solvent, a refined hexene treated by dehydration and deoxidation as comonomer and TIBA as co-catalyst respectively, wherein the co-catalyst had a concentration of 1.0 mmol/mL (n-hexane solution) and Al/Cr (molar ratio)=2.5. The amount of 1-hexene was respectively 0.7 mL and 2.1 mL, the volume ratio of 1-hexene and the solvent used for polymerization being 1 vol % (Comparison Example 30~1) and 3 vol % (Comparison Example 30-2). Finally the pressure of ethylene in the kettle was raised to 0.15 MPa and the catalyst was added to start the polymerization. The instantaneous consumption of monomeric ethylene was on-line collected (by the high-precision ethylene mass flow meter connecting with a computer) during the reaction and recorded by the computer. After the reaction was conducted at 85° C. for 1 h, a mixed solution of hydrochloric acid/ethanol was added to terminate the reaction, and the polymer was vacuum dried, weighed and analyzed.

Comparison Example 31

160 mg of the catalyst in Comparison Example 22 was weighed for the polymerization respectively. The polymerization reaction kettle was firstly heated under vacuum, and then replaced with highly pure nitrogen, which was repeated for three times. Then a small amount of monomeric ethylene was used to replace once. Finally, the reaction kettle was filled with ethylene to a slight positive pressure (0.12 MPa). Into the reaction kettle were added in turn about 70 ml of a refined heptane treated by dehydration and deoxidation as solvent, 10 mL and 20 mL hydrogen (Comparison Example 31-1, 31-2) and TIBA as co-catalyst respectively, wherein the co-catalyst had a concentration of 1.0 mmol/mL (n-hexane solution) and Al/Cr (molar ratio)=2.5. Finally the pressure of ethylene in the kettle was raised to 0.15 MPa and the catalyst was added to start the polymerization. The instantaneous consumption of monomeric ethylene was on-line collected (by the high-precision ethylene mass flow meter connecting with a computer) during the reaction and recorded by the computer. After the reaction was conducted at 85° C. for 1 h, a mixed solution of hydrochloric acid/ethanol was added to terminate the reaction, and the polymer was vacuum dried, weighed and analyzed.

Comparison Example 32

160 mg of the catalyst in Comparison Example 24 was weighed for the polymerization respectively. The polymerization reaction kettle was firstly heated under vacuum, and then replaced with highly pure nitrogen, which was repeated for three times. Then a small amount of monomeric ethylene was used to replace once. Finally, the reaction kettle was filled with ethylene to a slight positive pressure (0.12 MPa). Into the reaction kettle were added in turn about 70 ml of a refined heptane treated by dehydration and deoxidation as solvent, 10 mL and 20 mL hydrogen (Comparison Example 32-1, 32-2) and TIBA as co-catalyst respectively, wherein the co-catalyst had a concentration of 1.0 mmol/mL (n-hexane solution) and Al/Cr (molar ratio)=2.5. Finally the pressure of ethylene in the kettle was raised to 0.15 MPa and the catalyst was added to start the polymerization. The instantaneous consumption of monomeric ethylene was on-line collected (by the high-precision ethylene mass flow meter connecting with a computer) during the reaction and recorded by the computer. After the reaction was conducted at 85° C. for 1 h, a mixed solution of hydrochloric acid/ethanol was added to terminate the reaction, and the polymer was vacuum dried, weighed and analyzed.

Comparison Example 33

160 mg of the catalyst in Comparison Example 22 was weighed for the polymerization respectively. The polymerization reaction kettle was firstly heated under vacuum, and then replaced with highly pure nitrogen, which was repeated for three times. Then a small amount of monomeric ethylene was used to replace once. Finally, the reaction kettle was filled with ethylene to a slight positive pressure (0.12 MPa). Into the reaction kettle were added in turn about 70 ml of a refined heptane treated by dehydration and deoxidation as solvent and TIBA as co-catalyst respectively, wherein the co-catalyst had a concentration of 1.0 mmol/mL (n-hexane solution) and Al/Cr (molar ratio)=2.5. Finally the pressure of ethylene in the kettle was raised to 0.15 MPa and the catalyst was added to start the polymerization. The instantaneous consumption of monomeric ethylene was on-line collected (by the high-precision ethylene mass flow meter connecting with a computer) during the reaction and recorded by the computer. After the reaction was conducted at 45° C. and 65° C. for 1 h (Comparison Example 33-1, 33-2), a mixed solution of hydrochloric acid/ethanol was added to terminate the reaction, and the polymer was vacuum dried, weighed and analyzed.

Comparison Example 34

160 mg of the catalyst in Comparison Example 24 was weighed for the polymerization respectively. The polymerization reaction kettle was firstly heated under vacuum, and then replaced with highly pure nitrogen, which was repeated for three times. Then a small amount of monomeric ethylene was used to replace once. Finally, the reaction kettle was filled with ethylene to a slight positive pressure (0.12 MPa). Into the reaction kettle were added in turn about 70 ml of a refined heptane treated by dehydration and deoxidation as solvent and TIBA as co-catalyst respectively, wherein the co-catalyst had a concentration of 1.0 mmol/mL (n-hexane solution) and Al/Cr (molar ratio)=2.5. Finally the pressure of ethylene in the kettle was raised to 0.15 MPa and the catalyst was added to start the polymerization. The instantaneous consumption of monomeric ethylene was on-line collected (by the high-precision ethylene mass flow meter connecting with a computer) during the reaction and recorded by the computer. After the reaction was conducted at 45° C. and 65° C. for 1 h (Comparison Example 34-1, 34-2), a mixed solution of hydrochloric acid/ethanol was added to terminate the reaction, and the polymer was vacuum dried, weighed and analyzed.

Comparison Example 35

160 mg of the catalyst in Comparison Example 22 was weighed for the polymerization respectively. The polymerization reaction kettle was firstly heated under vacuum, and then replaced with highly pure nitrogen, which was repeated for three times. Then a small amount of monomeric ethylene was used to replace once. Finally, the reaction kettle was filled with ethylene to a slight positive pressure (0.12 MPa). Into the reaction kettle were added in turn about 70 mL of a refined heptane treated by dehydration and deoxidation as solvent and TEA as co-catalyst respectively, wherein the co-catalyst had a concentration of 1.0 mmol/mL (n-hexane solution) and Al/Cr (molar ratio)=2.5. Finally the pressure of ethylene in the kettle was raised to 0.15 MPa and the catalyst was added to start the polymerization. The instantaneous consumption of monomeric ethylene was on-line collected (by the high-precision ethylene mass flow meter connecting with a computer) during the reaction and recorded by the computer. After the reaction was conducted at 85° C. for 1 h, a mixed solution of hydrochloric acid/ethanol was added to terminate the reaction, and the polymer was vacuum dried, weighed and analyzed.

Comparison Example 36

160 mg of the catalyst in Comparison Example 24 was weighed for the polymerization respectively. The polymerization reaction kettle was firstly heated under vacuum, and then replaced with highly pure nitrogen, which was repeated for three times. Then a small amount of monomeric ethylene was used to replace once. Finally, the reaction kettle was filled with ethylene to a slight positive pressure (0.12 MPa). Into the reaction kettle were added in turn about 70 mL of a refined heptane treated by dehydration and deoxidation as solvent and TEA as co-catalyst respectively, wherein the co-catalyst had a concentration of 1.0 mmol/mL (n-hexane solution) and Al/Cr (molar ratio)=2.5. Finally the pressure of ethylene in the kettle was raised to 0.15 MPa and the catalyst was added to start the polymerization. The instantaneous consumption of monomeric ethylene was on-line collected (by the high-precision ethylene mass flow meter connecting with a computer) during the reaction and recorded by the computer. After the reaction was conducted at 85° C. for 1 h, a mixed solution of hydrochloric acid/ethanol was added to terminate the reaction, and the polymer was vacuum dried, weighed and analyzed.

Comparison Example 37

160 mg of the catalyst in Comparison Example 24 was weighed for the polymerization respectively. The polymerization reaction kettle was firstly heated under vacuum, and then replaced with highly pure nitrogen, which was repeated for three times. Then a small amount of monomeric ethylene was used to replace once. Finally, the reaction kettle was filled with ethylene to a slight positive pressure (0.12 MPa). Into the reaction kettle were added in turn about 70 mL of a refined heptane treated by dehydration and deoxidation as solvent and TIBA as co-catalyst respectively, wherein the co-catalyst had a concentration of 1.0 mmol/mL (n-hexane solution) and Al/Cr (molar ratio)=2.5. Finally the pressure of ethylene in the kettle was raised to 0.15 MPa and the catalyst was added to start the polymerization. The instantaneous consumption of monomeric ethylene was on-line collected (by the high-precision ethylene mass flow meter connecting with a computer) during the reaction and recorded by the computer. After the reaction was conducted at 85° C. for 1 h, a mixed solution of hydrochloric acid/ethanol was added to terminate the reaction, and the polymer was vacuum dried, weighed and analyzed.

TABLE 17

Polymerization activities of examples

| Example | Activity ($kg_{PE}$/mol Cr or V h) |
| --- | --- |
| Example 70 | 90.5 |
| Example 71 | 71.2 |
| Example 72 | 91.8 |
| Example 73 | 89.0 |
| Example 74 | 85.2 |
| Example 75 | 93.5 |
| Example 76-1 | 105.1 |
| Example 76-2 | 62.6 |
| Example 76-3 | 55.0 |
| Example 76-4 | 50.6 |
| Example 76-5 | 44.3 |
| Example 77 | 78.6 |
| Example 78 | 67.5 |
| Example 79-1 | 73.9 |
| Example 19-2 | 61.3 |
| Example 80-1 | 98.6 |
| Example 80-2 | 83.4 |
| Example 81-1 | 62.3 |
| Example 81-2 | 51.4 |
| Example 82-1 | 81.2 |
| Example 82-2 | 75.4 |
| Example 83-1 | 315.2 |
| Example 83-2 | 243.7 |
| Example 84 | 78.5 |
| Example 85 | 31.6 |
| Example 86 | 93.2 |
| Comparison Example 26-1 | 149.0 |
| Comparison Example 26-2 | 114.4 |
| Comparison Example 26-3 | 87.5 |
| Comparison Example 26-4 | 83.4 |
| Comparison Example 26-5 | 71.4 |
| Comparison Example 27-1 | 96.5 |
| Comparison Example 27-2 | 51.2 |
| Comparison Example 27-3 | 39.4 |
| Comparison Example 27-4 | 32.3 |
| Comparison Example 27-5 | 22.8 |
| Comparison Example 28-1 | 131.6 |
| Comparison Example 28-2 | 100.3 |
| Comparison Example 28-3 | 77.7 |
| Comparison Example 28-4 | 64.1 |
| Comparison Example 28-5 | 66.3 |
| Comparison Example 29-1 | 114.3 |
| Comparison Example 29-2 | 97.3 |
| Comparison Example 30-1 | 104.5 |
| Comparison Example 30-2 | 84.9 |
| Comparison Example 31-1 | 136.6 |
| Comparison Example 31-2 | 135.1 |
| Comparison Example 32-1 | 105.6 |
| Comparison Example 32-2 | 105.0 |

TABLE 17-continued

Polymerization activities of examples

| Example | Activity (kg$_{PE}$/mol Cr or V h) |
|---|---|
| Comparison Example 33-1 | 140.3 |
| Comparison Example 33-2 | 226.5 |
| Comparison Example 34-1 | 162.7 |
| Comparison Example 34-2 | 265.8 |
| Comparison Example 35 | 99.1 |
| Comparison Example 36 | 121.9 |

(1) Comparison of Different Amount of Cocatalyst

TABLE 18

Comparison of different amount of cocatalyst in ethylene homopolymerization

| Example | Al/Cr | activity (kg PE/ mol Cr h) | $T_m$ (° C.) | $M_w$ (×10$^5$) | PDI |
|---|---|---|---|---|---|
| Example 76-1 | 2.5 | 105.1 | 131.2 | 5.21 | 22.7 |
| Example 76-2 | 5 | 62.6 | 131.9 | 6.23 | 25.4 |
| Example 76-3 | 10 | 55.0 | 132.4 | 7.98 | 34.3 |
| Example 76-4 | 15 | 50.6 | 132.7 | 7.15 | 28.5 |
| Example 76-5 | 20 | 44.3 | 132.5 | 6.38 | 30.8 |
| Comparison Example 26-1 | 2.5 | 149.0 | 131.2 | 4.40 | 25.5 |
| Comparison Example 26-2 | 5 | 114.4 | 131.9 | 4.79 | 26.1 |
| Comparison Example 26-3 | 10 | 87.5 | 132.2 | 7.13 | 29.7 |
| Comparison Example 26-4 | 15 | 83.4 | 131.7 | 6.42 | 28.5 |
| Comparison Example 26-5 | 20 | 71.4 | 131.3 | 6.17 | 25.6 |
| Comparison Example 27-1 | 2.5 | 96.5 | 131.0 | 4.78 | 22.3 |
| Comparison Example 27-2 | 5 | 51.2 | 131.9 | 6.31 | 21.7 |
| Comparison Example 27-3 | 10 | 39.4 | 132.2 | 7.13 | 28.9 |
| Comparison Example 27-4 | 15 | 32.3 | 131.8 | 7.02 | 26.1 |
| Comparison Example 27-5 | 20 | 22.8 | 132.0 | 5.97 | 24.7 |
| Comparison Example 28-1 | 2.5 | 131.6 | 131.1 | 3.28 | 23.8 |
| Comparison Example 28-2 | 5 | 100.3 | 131.3 | 5.41 | 22.1 |
| Comparison Example 28-3 | 10 | 77.7 | 131.9 | 6.33 | 27.3 |
| Comparison Example 28-4 | 15 | 64.1 | 131.7 | 5.82 | 29.4 |
| Comparison Example 28-5 | 20 | 66.3 | 131.5 | 5.37 | 25.6 |

Polymerization conditions: ethylene pressure = 0.15 MPa; polymerization time = 1 hr; polymerization temperature = 85° C.; n-heptane = 70 mL; Cr = 0.5% (wt), co-catalyst = TIBA.

From FIG. 8 shows, in the TIBA as cocatalyst conditions (Example 76-1、76-2、76-3、76-4、76-5 and Comparison Example 26-1、26-2、26-3、26-4、26-5、27-1、27-2、27-3、27-4、27-5、28-1、28-2、28-3、28-4、28-5), with the help of catalyst increasing, fluorine of modified and unmodified load type chrome vanadium double active center metal oxide catalyst and fluorine modified phillips catalysts, unmodified phillips catalyst activity of ethylene homopolymerization presents the downward trend, while the polymer molecular weight showed a trend of reducing the rise, then required to get the polymer molecular weight, the dosage of the catalyst promoter is an appropriate value or range. Using other except TiBA cocatalyst in a similar rule.

(2) Comparison of Different Cocatalyst

TABLE 19

Comparison of different cocatalyst in ethylene homopolymerization

| Example | co-catalyst | activity (kg PE/ mol Cr h) | $T_m$ (° C.) | $M_w$ (×10$^5$) | PDI |
|---|---|---|---|---|---|
| Example 76-1 | TIBA | 105.1 | 131.2 | 5.21 | 22.7 |
| Example 86 | TEA | 93.2 | 131.3 | 2.25 | 23.3 |
| Comparison Example 26-1 | TIBA | 149.0 | 131.2 | 4.40 | 25.5 |
| Comparison Example 35 | TEA | 99.1 | 132.1 | 2.69 | 15.6 |
| Comparison Example 28-1 | TIBA | 131.6 | 131.1 | 3.28 | 23.8 |
| Comparison Example 36 | TEA | 121.9 | 131.2 | 1.94 | 11.3 |

Polymerization conditions: ethylene pressure = 0.15 MPa; polymerization time = 1 hr; polymerization temperature = 85° C.; n-heptane = 70 mL; Cr = 0.5% (wt);

Given in table 19 different cocatalyst for fluoride load type of modified and unmodified chrome vanadium double active center metal oxide catalyst, unmodified ethylene homopolymerization phillips catalysts for catalytic activity (Example 76-1, 86, and Comparison Example 26-1, 35, 28-1, 36). Visible, use the TIBA as cocatalyst, two kinds of catalyst activity were significantly higher than that of using triethyl aluminium (TEA) as catalyst promoter activity of ethylene homopolymerization. Further through the analysis of the above product polyethylene, under different cocatalyst is the melting point of polyethylene products have similar, but its very different molecular weight and molecular weight distribution, showed the cocatalyst to the center of the catalyst activity after reduction degree and reduction of distribution has great influence.

(3) Comparison of Temperature

TABLE 20

Comparison of temperature

| Example | temp. (° C.) | activity (kg PE/ mol Cr h) | $T_m$ (° C.) | $M_w$ (×10$^5$) | PDI |
|---|---|---|---|---|---|
| Example 83-1 | 45 | 315.2 | 131.7 | 10.12 | 21.5 |
| Example 83-2 | 65 | 243.7 | 130.8 | 9.89 | 20.9 |
| Example 76-1 | 85 | 105.1 | 131.2 | 9.01 | 22.7 |
| Comparison Example 33-1 | 45 | 140.3 | 134.1 | 6.36 | 21.9 |
| Comparison Example 33-2 | 65 | 226.5 | 131.1 | 5.90 | 22.9 |
| Comparison Example 26-1 | 85 | 149.0 | 131.2 | 5.76 | 25.5 |
| Comparison Example 34-1 | 45 | 162.7 | 133.5 | 6.18 | 20.6 |
| Comparison Example 34-2 | 65 | 265.8 | 130.6 | 4.22 | 21.8 |
| Comparison Example 28-1 | 85 | 131.6 | 131.1 | 3.47 | 23.8 |

Polymerization conditions: ethylene pressure = 0.15 MPa; polymerization time = 1 hr; n-heptane = 70 mL; Cr = 0.5% (wt); co-catalyst = TIBA.

Table 20 is different polymerization temperature of fluorine of modified and unmodified load type chrome vanadium double active center metal oxide catalyst, unmodified phillips catalysts of ethylene homopolymerization activity (Example 83-1、83-2、76-1、and Comparison Example 33-1、33-2、26-1、34-1、34-2、28-1). Under different temperature of the melting point of polyethylene products have similar, fluorine modified load type chrome vanadium double active center metal oxide catalysts in the rise of its molecular weight as the polymerization temperature trends, chain transfer reaction shows polymerization temperature on polymerization more advantageous.

(4) Comparison of Different Dosage of 1-Hexene

TABLE 21

Comparison of different dosage of 1-hexene

| Example | 1-hexene | activity (kg PE/ mol Cr h) | $T_m$ (° C.) | $M_w$ (×10$^5$) | PDI |
|---|---|---|---|---|---|
| Example 76-1 | 0 | 105.1 | 131.2 | 5.21 | 22.7 |
| Example 79-1 | 0.7 | 73.9 | 131.7 | 4.57 | 20.3 |
| Example 79-2 | 2.1 | 61.3 | 131.5 | 3.47 | 16.9 |
| Comparison Example 26-1 | 0 | 149.0 | 131.2 | 4.40 | 25.5 |
| Comparison Example 29-1 | 0.7 | 114.3 | 131.8 | 4.21 | 24.9 |
| Comparison Example 29-2 | 2.1 | 97.3 | 131.6 | 4.01 | 25.4 |
| Comparison Example 28-1 | 0 | 131.6 | 131.1 | 3.28 | 23.8 |
| Comparison Example 30-1 | 0.7 | 104.5 | 132.2 | 3.02 | 20.8 |
| Comparison Example 30-2 | 2.1 | 84.9 | 131.9 | 2.83 | 18.0 |

Polymerization conditions: ethylene pressure = 0.15 MPa; polymerization time = 1 hr; n-heptane = 70 mL; Cr = 0.5% (wt), V = 0.24% (wt); co-catalyst = TIBA.

Fluorine is presented in table 21 of modified and unmodified load type chrome vanadium double active center metal oxide catalyst, unmodified phillips, the ethylene/1-hexene catalyzed polymerization activity (Example 76-1、79-1、79-2, and Comparison Example 26-1、29-1、29-2、28-1、30-1、30-2). With the increase of dosage of 1-hexene, fluorine modified load type chrome vanadium double active center metal oxide catalysts of ethylene/1-hexene copolymerization activity present a lower trend, combined with the result of ethylene homopolymerization before, showed that ethylene/1-hexene copolymerization activity were lower than the activity of ethylene homopolymerization. With the increase of dosage of 1-hexene polymer molecular weight falling.

(7) Comparison of Hydrogen

TABLE 16

Comparison of hydrogen

| Example | $H_2$ | activity (kg PE/ mol Cr h) | $T_m$ (° C.) | $M_w$ (×10$^5$) | PDI |
|---|---|---|---|---|---|
| Example 76-1 | 0 | 105.1 | 131.2 | 5.21 | 22.7 |
| Example 80-1 | 10 | 98.6 | 131.4 | 3.84 | 27.4 |
| Example 80-2 | 20 | 83.4 | 131.1 | 3.05 | 28.5 |
| Comparison Example 26-1 | 0 | 149.0 | 131.2 | 4.40 | 25.5 |
| Comparison Example 31-1 | 10 | 136.6 | 131.2 | 2.90 | 18.9 |
| Comparison Example 31-2 | 20 | 135.1 | 131.1 | 2.63 | 17.5 |
| Comparison Example 28-1 | 0 | 131.6 | 131.1 | 3.28 | 23.8 |
| Comparison Example 32-1 | 10 | 105.6 | 131.1 | 2.04 | 14.7 |
| Comparison Example 32-2 | 20 | 105.0 | 131.1 | 1.95 | 15.5 |

Polymerization conditions: ethylene pressure = 0.15 MPa; polymerization time = 1 hr; n-heptane = 70 mL; Cr = 0.5% (wt); co-catalyst = TIBA.

Fluorine of modified and unmodified load type chrome vanadium double active center metal oxide catalyst, unmodified phillips catalyst of the effects of hydrogen transfer reaction such as shown in table 22 (Example 76-1、80-1、80-2 and Comparison Example 26-1、31-1、31-2、28-1、32-1、33-2). After the visible, hydrogen fluoride modified double active load type chrome vanadium catalysts of ethylene homopolymerization activity than hydrogen does not exist under the condition of lower, and significantly lower molecular weight polyethylene, illustrate the hydrogen plays a significant role of chain transfer agent to lower molecular weight polyethylene.

The invention claimed is:

1. A supported hybrid vanadium-chromium-based catalyst, characterized in that the catalyst is supported on a porous inorganic carrier and wherein an inorganic chromium active site and vanadium active site are present on the porous inorganic carrier;

the chromium precursor and vanadium precursor are presented on the porous inorganic carrier as supported Cr/V metal oxide double active centers by one of the following processes of chemisorption or physical adsorption followed by drying and calcination at high temperature:
i) impregnating the porous inorganic carrier into a solution of the vanadium precursor, drying and calcining at 300~900° C., and
ii) impregnating the product obtained in step i) into a solution of the chromium precursor, drying and calcining at 300~900° C.;

or
i) impregnating the porous inorganic carrier into a solution of the chromium precursor, drying and calcining at 300~900° C., and
ii) impregnating the product obtained in step i) into a solution of the vanadium precursor, drying and calcining at 300~900° C.;

or
impregnating the porous inorganic carrier into a solution of the chromium and vanadium precursor, drying and calcining at 300~900° C.

2. The catalyst according to claim 1, wherein said porous inorganic carrier is modified with titanium and fluorine.

3. The catalyst according to claim 1, wherein the porous inorganic carrier is selected from the group consisting of silica, alumina, titania, zirconia, magnesia, calcium oxide and inorganic clays, and combinations thereof.

4. The catalyst according to claim 1, wherein the porous inorganic carrier has a surface area from 50 to 500 m$^2$/g.

5. The catalyst according to claim 1, wherein the porous inorganic carrier has a pore volume from 0.1 to 5.0 cm$^3$/g, and an average pore diameter of 1 to 50 nm.

6. The catalyst according to claim 1, wherein the chromium loading on the porous inorganic carrier is, based on the weight of chromium, from 0.01 to 10 wt. % of the total weight of the catalyst.

7. The catalyst according to claim 1, wherein the ratio of the vanadium loading to the chromium loading on the carrier is 0.1 to 5 based on the weight of chromium and vanadium.

8. The catalyst according to claim 1, wherein the vanadium loading on the porous inorganic carrier is, based on the weight of vanadium, from 0.01 to 10 wt. % of the total weight of the catalyst.

9. The catalyst according to claim 1, wherein the chromium precursor of the chromium active site is selected from chromium trioxide, nitric acid chromium, acetic acid chromium, chromium chloride, chromium acid ammonium sulfate, ammonium dichromate and alkali type chromium acetate and combinations thereof.

10. The catalyst according to claim 1, wherein the vanadium precursor of the V active site is selected from vanadic nitrate, vanadic phosphate, vanadic sulfate, vanadic acetate, ammonium hexafluorovanadate, vanadic acetate, vanadic nitrate, vanadyl oxalate, ammonium metavanadate, vanadyl sulfate, vanadium sulfate oxide hydrate, vanadic sulfate, vanadyl trichloride, sodium orthovanadate, sodium metavanadate, vanadyl bis (acetylacetone), vanadic triisopropoxide oxide, vanadic oxytripropoxide, vanadic acetylacetone, vanadic oxytriethoxide, vanadyl chloride, vanadic silicide, and combinations thereof.

11. The catalyst according to claim 2, wherein the titanium loading on the porous inorganic carrier is, based on the weight of chromium, from 0.01 to 30 wt. % of the total weight of the catalyst.

12. The catalyst according to claim 2, wherein the fluorine loading on the porous inorganic carrier is, based on the weight of fluorine, from 0.01 to 10 wt. % of the total weight of the catalyst.

13. The catalyst according to claim 2, wherein the titanium is selected from acetylacetone titanium oxide, titanium trichloride, titanium tetrachloride, tertiary butanol titanium, tetra-n-butyl titanate, titanium oxide sulfate, titanium sulfate, ammonium hexafluorotitanate, titanium isopropoxide, tetraethyl titanate, and soluble titanium salt combinations thereof.

14. The catalyst according to claim 2, wherein the fluorine is selected from hydrogen fluoride and fluorine gas, ammonium fluoride, ammonium fluoride, ammonium fluoride boric acid, or fluoboric acid copper, silver fluoboric acid, or fluoboric acid gold, fluosilicic acid copper, fluosilicic acid copper, silver fluosilicate, ammonium fluosilicate gold, fluoboric acid, or hexafluoride ammonium vanadate, six ammonium fluosilicate, fluoboric acid zinc, magnesium silicate fluoride, zinc fluoride silicate, sodium fluoboric acid, soluble fluoride salt or combinations thereof.

15. The catalyst according to claim 2, wherein the porous inorganic carrier is prepared by one process selected from the following four processes:

(1) an immersion method in which a titanium compound is dissolved in solvent and reacted with and inorganic carrier, dried, then under a temperature of 300 to 900° C. undergoes calcination activation, to obtain a titanium dioxide modified inorganic carrier;

(2) a coprecipitation method in which a titanium compound and a silicate compound are reacted, dried, then under a temperature of 300 to 900° C. undergoes calcination activation, to obtain a titanium dioxide modified inorganic carrier;

(3) a sol-gel application method in which a titanium compound is mixed with water and anhydrous ethanol to undergo a hydrolysis reaction, then is further reacted with an inorganic acid and an inorganic carrier, dried, then under a temperature of 300 to 900° C. undergoes calcination activation, to obtain a titanium dioxide modified inorganic carrier; and (4) a sol-gel application method in which a titanium compound is stirred in organic solvents, then is reacted with an inorganic acid in an acid reflux reaction, then is further reacted with an inorganic carrier, dried, then under a temperature of 300 to 900° C. undergoes calcination activation, to obtain a titanium dioxide modified inorganic carrier.

16. The catalyst according to claim 15, wherein the silicate compound is selected from aluminum silicate, sodium silicate, ethyl silicate, magnesium silicate and calcium silicate, soluble silica salt and combinations thereof.

* * * * *